Aug. 23, 1966 H. C. LEHDE ETAL 3,268,073

SEPARATING APPARATUS

Original Filed Feb. 15, 1960 17 Sheets-Sheet 1

INVENTORS
Henry C. Lehde
John J. Dickerman

BY Reuben J. Carlson
Attorney

Aug. 23, 1966 H. C. LEHDE ETAL 3,268,073

SEPARATING APPARATUS

Original Filed Feb. 15, 1960 17 Sheets-Sheet 2

INVENTORS
Henry C. Lehde
John J. Dickerman

BY Reuben J. Carlson

Attorney

INVENTORS
Henry C. Lehde
John J. Dickerman
BY Reuben J. Carlson
Attorney

Aug. 23, 1966 H. C. LEHDE ETAL 3,268,073

SEPARATING APPARATUS

Original Filed Feb. 15, 1960 17 Sheets-Sheet 4

INVENTORS
Henry C. Lehde
John J. Dickerman
BY Reuben J. Carlson
Attorney

INVENTORS
Henry C. Lehde
John J. Dickerman
BY Reuben J. Carlson
Attorney

INVENTORS
Henry C. Lehde
John J. Dickerman
BY Reuben J. Carlson
Attorney

SEPARATING APPARATUS

Original Filed Feb. 15, 1960 17 Sheets-Sheet 7

INVENTORS
Henry C. Lehde
John J. Dickerman
BY
Reuben J. Carlson
Attorney

INVENTORS
Henry C. Lehde
John J. Dickerman

BY Reuben J. Carlson

Attorney

INVENTORS
Henry C. Lehde
John J. Dickerman
BY Reuben J. Carlson
Attorney

INVENTORS
Henry C. Lehde
John J. Dickerman

BY Reuben J. Carlson

Attorney

INVENTORS
Henry C. Lehde
John J. Dickerman
BY
Reuben J. Carlson
Attorney

SEPARATING APPARATUS

Original Filed Feb. 15, 1960 17 Sheets-Sheet 12

INVENTOR.
Henry C. Lehde
John J. Dickerman
BY
Reuben J. Carlson
Attorney

INVENTOR.
Henry C. Lehde
John J. Dickerman

BY Reuben J. Carlson

Attorney

SEPARATING APPARATUS
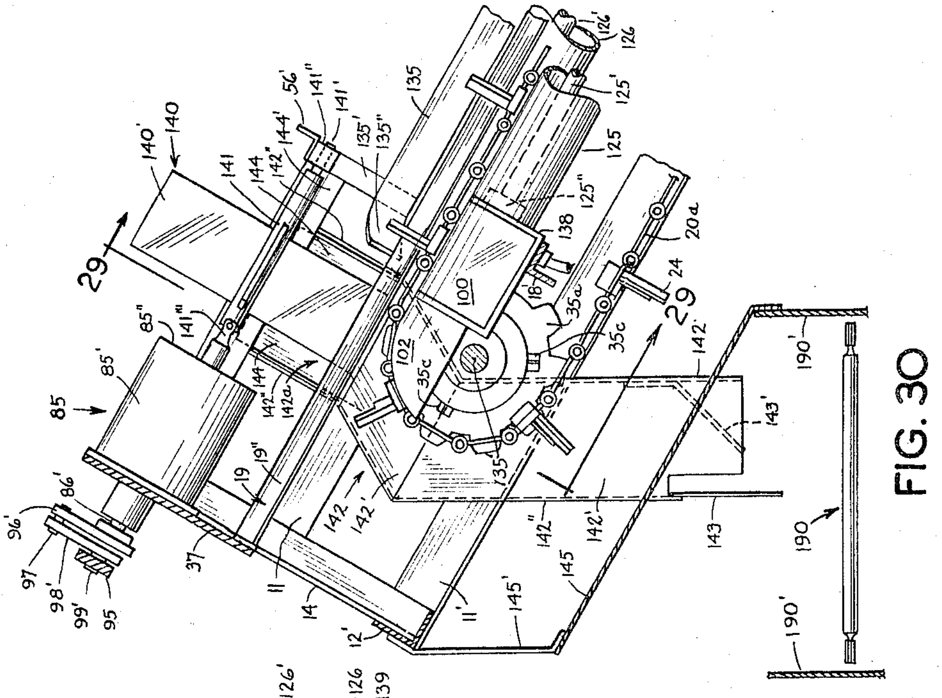
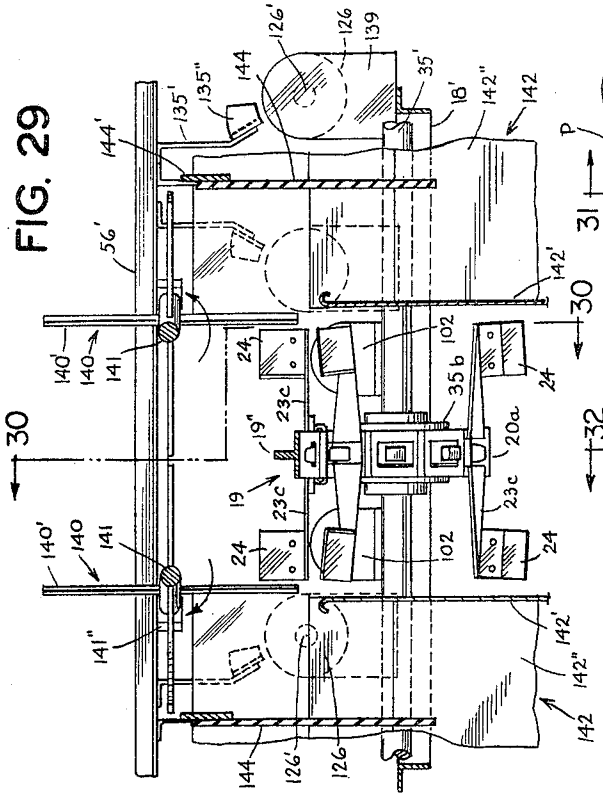
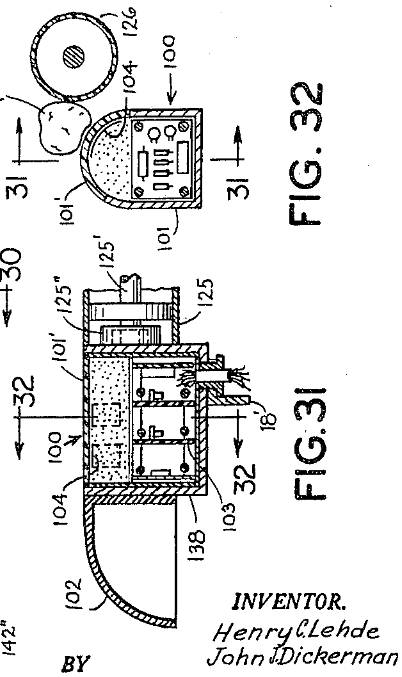
FIG. 30 FIG. 29 FIG. 31 FIG. 32
INVENTOR.
Henry C. Lehde
John J. Dickerman
BY
Reuben J. Carlson
Attorney

SEPARATING APPARATUS

Original Filed Feb. 15, 1960 17 Sheets-Sheet 15

INVENTOR.
Henry C. Lehde
John J. Dickerman
BY Reuben J. Carlson
Attorney

INVENTORS
Henry C. Lehde
John J. Dickerman
BY Reuben J. Carlson
Attorney

SEPARATING APPARATUS

Original Filed Feb. 15, 1960 17 Sheets-Sheet 17

INVENTORS
Henry C. Lehde
John J. Dickerman
BY Reuben J. Carlson
Attorney 3,268,073

SEPARATING APPARATUS

Henry C. Lehde, Northport, N.Y. (P.O. Box 415, Midway City, Calif.), and John J. Dickerman, 22 Oak St., Northport, N.Y.

Original application Feb. 15, 1960, Ser. No. 8,649. Divided and this application Feb. 25, 1963, Ser. No. 268,207
11 Claims. (Cl. 209—73)

This invention relates to separating apparatus, and more particularly to improved apparatus for separating a mixture of objects or articles of different electrical conductivity into two or more classes, and irrespective of the shape and size of the objects to be classified. This application is a division of the our copending parent application Serial No. 8,649, filed February 15, 1960, now Patent No. 3,200,888.

In the processing of various products, articles and objects it is often necessary and desirable to separate a collection or traveling mixture of objects of varied shapes and sizes and substantially different electrical conductivity into two or more predetermined groups or classes on the basis of their electrical conductivity characteristics, and without previous size or shape classification of the object mixture.

It is the purpose of this invention to provide efficient and reliable apparatus for separating a mixture of objects of widely varying shape and size, into two or more groups or classes of substantially different electrical conductivity.

A further purpose of this invention is to provide separating apparatus which includes means for marshalling and advancing a mixture of objects of varying size and shape into a column or columns of objects traveling in single file and individually spaced order into the presence of a device or devices sensitive to the electrical conductivity of the individually spaced objects, and which sensing means controls the operation of a mechanically driven deflector or deflectors which operates in synchronism with the marshalling and advancing means to selectively perform the separating operation.

A further purpose of this invention is to provide a separating apparatus adapted to classify a large volume flow of objects of varied size and shape in accordance with their electrical conductivity characteristics, and having any desired number of marshalling and classifying channels adapted to reliably operate at relatively high speed.

While the separating mechanism of this invention is uniquely adapted for the reliable separation and classification of numerous types of relatively solid organic or inorganic articles, objects and products of widely varying size and shapes in accordance with their individual electrical conductivity characteristics, this invention will be exemplified in the following description to the separation of stones, clods and sod intermixed with a root crop such as potatoes, as recovered in a harvesting operation.

The harvesting of potatoes in an economical manner by machine operation presents numerous difficult and varied problems, resulting from variable field conditions under which the mechanical harvester must operate. Many sandy and gravelly soils especially suitable for potato growing, often contain numerous stones of various sizes which are excavated with the potatoes, and which should be promptly eliminated during the harvesting, to avoid bruising damage to the harvested potatoes. When the harvesting must be performed when the soil is dry and hard, or under other unfavorable soil or climatic conditions, soil lumps and clods are often excavated with the potatoes of such hardness that they will not crumble during normal conveyor handling, and should be eliminated during the harvesting process if potato bruising is to be avoided. Many potato fields at the time of harvesting are also contaminated with tenacious sod and weed root growth, which is excavated with the potatoes and which should also be separated and discarded during the harvesting process.

While various means for the mechanical removal of stones, hard clods and sod have been proposed, no practical mechanisms have heretofore been provided for the mechanical elimination of such debris during the harvesting operation. Potato harvesters presently used are equipped with riding platforms on which four or more workers ride, and who are busily engaged in the manual removal of stones, hard clods and sod, as the potatoes and debris advance from the digging and elevating conveyor to the discharge conveyor. The labor cost involved in the manual elimination of such debris during the harvesting operation, and the extra weight and the extra power required to carry and transport the necessary number of riders, adds materially to the cost of the harvesting operation. In addition, the timely availability of capable machine riding labor during the limited harvesting season, and during those days when weather conditions are favorable to potato harvesting, is a constant and recurring problem to potato growers.

In accordance with this invention, the potato harvester may be equipped with mechanical mechanisms and devices for automatically separating and eliminating stones, hard clods and sod, during the harvesting operation, so that only clean potatoes of commercial size are loaded from the harvester into the hauling vehicle or truck. Potato harvesters which include this invention, eliminate the need for harvester riding attendants to manually eliminate stones, clods and sod from the potato stream, with resultant substantial economies in harvesting costs.

This invention is particularly adapted for mounted association with self-propelled root and potato harvesters, provided with one or more digging or excavating shovels which transfer the excavated material on to a traveling sifting conveyor which sifts out soil, stones, sod and other debris which is smaller in size than the size range of the root crop to be gathered; followed by a primary diviner for removing and stripping out above ground growth and vines from the product stream. The harvester is also desirably provided with a secondary sifting conveyor extending transversely of the harvester and operative to shift from the product stream, such stones, clods and sod which are larger than the largest size root product or object to be gathered, as disclosed in our parent application Serial No. 8,649, filed February 16, 1960, now Patent No. 3,200,888.

The product stream is discharged from the secondary sifting conveyor into a collecting area or bin, and may be composed of a mixture of potatoes and remaining debris such as stones, hard clods and sod of the same size range as the root crop to be gathered and not previously eliminated.

This invention incorporates integrated mechanism which can be mounted on the framework structure of the harvester, for conveying and marshalling the potatoes and remaining stones, clods and sods of similar size from the receiving bin to the rear end of the harvester, in a series of single file columns, and in a manner which permits the selective elimination of the remaining stones, clods and sods from the potato stream. The marshalling system includes a series of columnized advancing paddles connected to and advanced by one or more driven chains or belts. The paddles in each paddle column are arranged in linear spaced relation, and each paddle presents an object advancing face designed to positively advance only a single potato, stone or clod in an upwardly inclined longitudinal direction toward the rear end of the harvester.

One or more potato tumbling rolls are arranged in operative association with each paddle column, and which provides partial or total support for the objects advanced by the linearly spaced paddles. Each of the columnized advancing paddles operates to withdraw one or more potatoes, stones, clods or objects from the receiving bin, and advance the same in tumbling contact with the associated rotating marshalling roll or rolls. Each columnized advancing paddle is so shaped and dimensioned as to support only a single potato, stone or clod on the advancing face thereof as the paddle reaches the upper end of its travel. If more than one potato, stone or clod is initially engaged by an advancing paddle, the extra potato, stone or clod is tumbled laterally from the advancing influence of the paddle for return to the receiving bin for subsequent pick-up.

Where only a single marshalling roll is employed in association with each paddle column, the marshalling roll may be positioned directly under the line of travel of the columnized paddles to provide tumbling support for the objects advanced thereby. Alternatively, the marshalling roll may be positioned to extend along the extremity of the line of travel of the columnized paddles, to effectuate tumbling of the potatoes, with a stationary supporting plate positioned under the paddles to provide support for the paddle advanced objects. Alternatively, a pair of tumbling rolls may be associated with each paddle column to provide tumbling support for the paddle advanced objects. Longitudinally extending baffle plates may be provided to assist the channelization of the advancing objects into linearized columns. Where vines and other growth debris is so prolific that the same cannot be adequately eliminated by the primary deviner, a secondary devining roll in riding association with the tumbling roll may be provided to insure complete removal of remaining vine and growth debris.

Mechanism is provided for the selective separation and elimination of remaining stones, clods and sods from the potatoes when these objects have been arranged in spaced relationship in single file columns by the combined action of the advancing paddles and marshalling rolls. This mechanism comprises a mechanically driven potato selector and stone, clod and sod eliminating device, positioned adjacent the discharge end of each paddle column, and which device is operatively controlled by a sensing circuit.

In one form of the invention, potatoes and remaining stones and clods are individually discharged by the several columns of successive advancing paddles into corresponding drop tubes, each of which is equipped with a sensing ring containing a sensing coil which is responsive to conductive materials such as a potato dropping therethrough, but which is relatively non-sensitive to less conductive stones or earth clods. The sensing coil forms part of a sensing oscillator or detecting circuit, and the pulsations produced therein by the passage of a potato through the sensing ring, are amplified by an amplifying circuit which controls a switching circuit, and which in turn controls the operation of a clutch and brake mechanism. The clutch and brake mechanism is operative to manipulate a pivotally mounted deflecting plate which is positioned to deflect stones and clods to ground, and is also manipulated by the sensing circuit to permit the potatoes to drop from the sensing ring to a transverse potato conveyor therebelow.

In another form of this invention, the sensing circuit, the amplifying circuit, and the switching circuit are compactly contained in a casing whose upper arcuate surface forms a linear continuation of the upper end of a marshalling roll in each single file column. The successive potatoes, stones and clods are separately advanced by the marshalling paddles into proximity with the sensing device which operates to manipulate a clutch and brake device which is operatively connected to a deflecting paddle or paddle wheel adjacent the terminal end of the upper reach of the traveling object advancing paddles. This potato selecting and stone eliminating mechanism is so constructed and arranged as to either deflect the advancing potatoes into a drop tube or chute, or to deflect the advancing stones and clods into a discharge chute for discharge to ground.

The parts and components of the sensing device in both forms of this invention are constructed and designed for compact assembly in a casing of very small size and weight, and requires very little power to operate. The deflecting paddles or plates in both forms of the invention can each be effectively operated under approximately forty-five volts of input power, so that the voltage converting power source for these potato sensing and stone deflecting mechanisms may be energized by the storage battery associated with the combustion engine.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof in which:

Figures 1, 2, 2A:
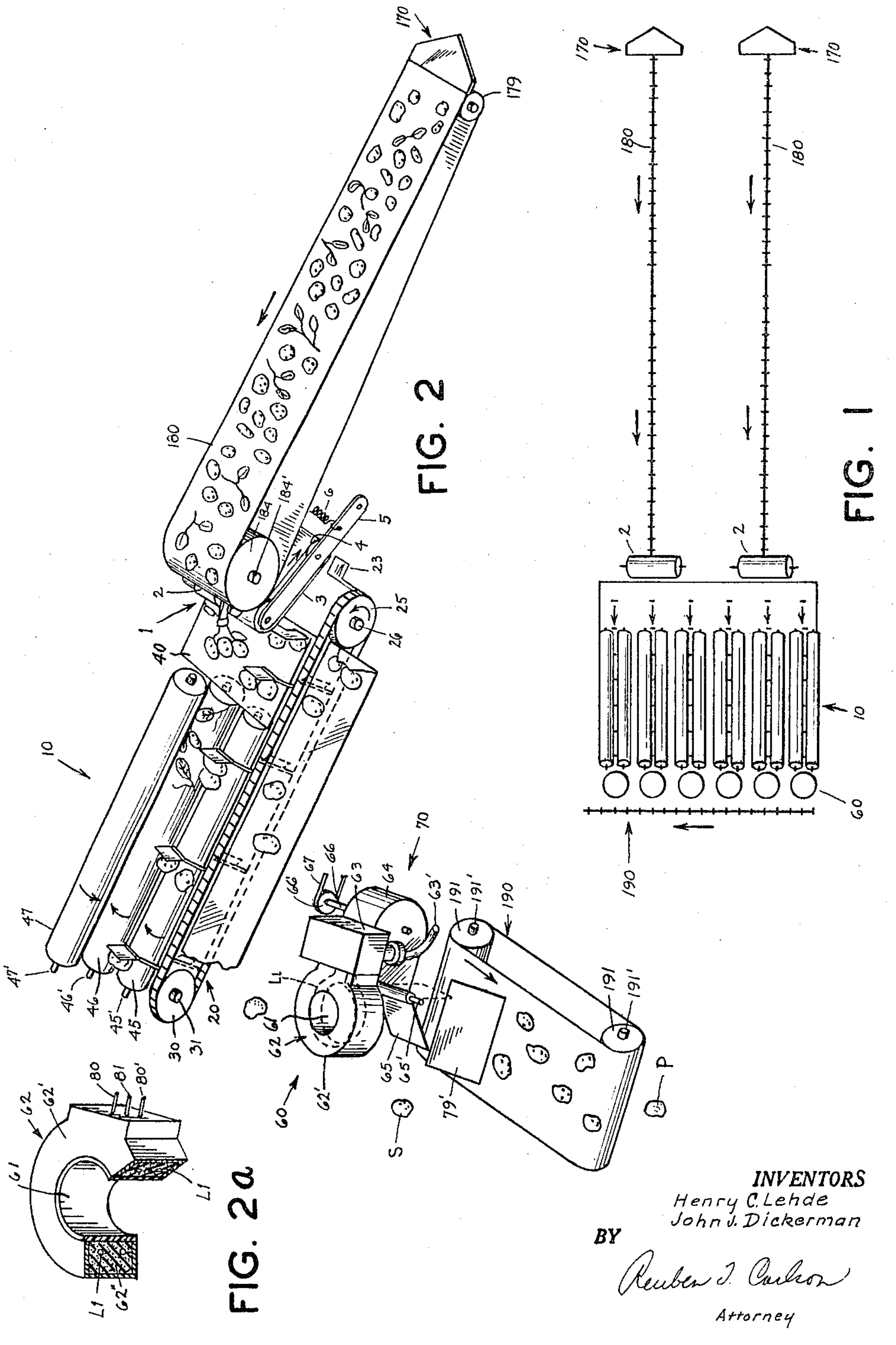
FIG. 1 is a flow diagram illustrating the direction of travel of the potatoes and debris materials processed along and through the various components of the harvester.
FIG. 2 is a diagrammatic illustration in perspective of one version of the present invention, showing the principles of the potato or object marshalling arrangement, and one form of the electrical sensing and potato selecting device, in operative association with a crop harvester.
Figure 3:
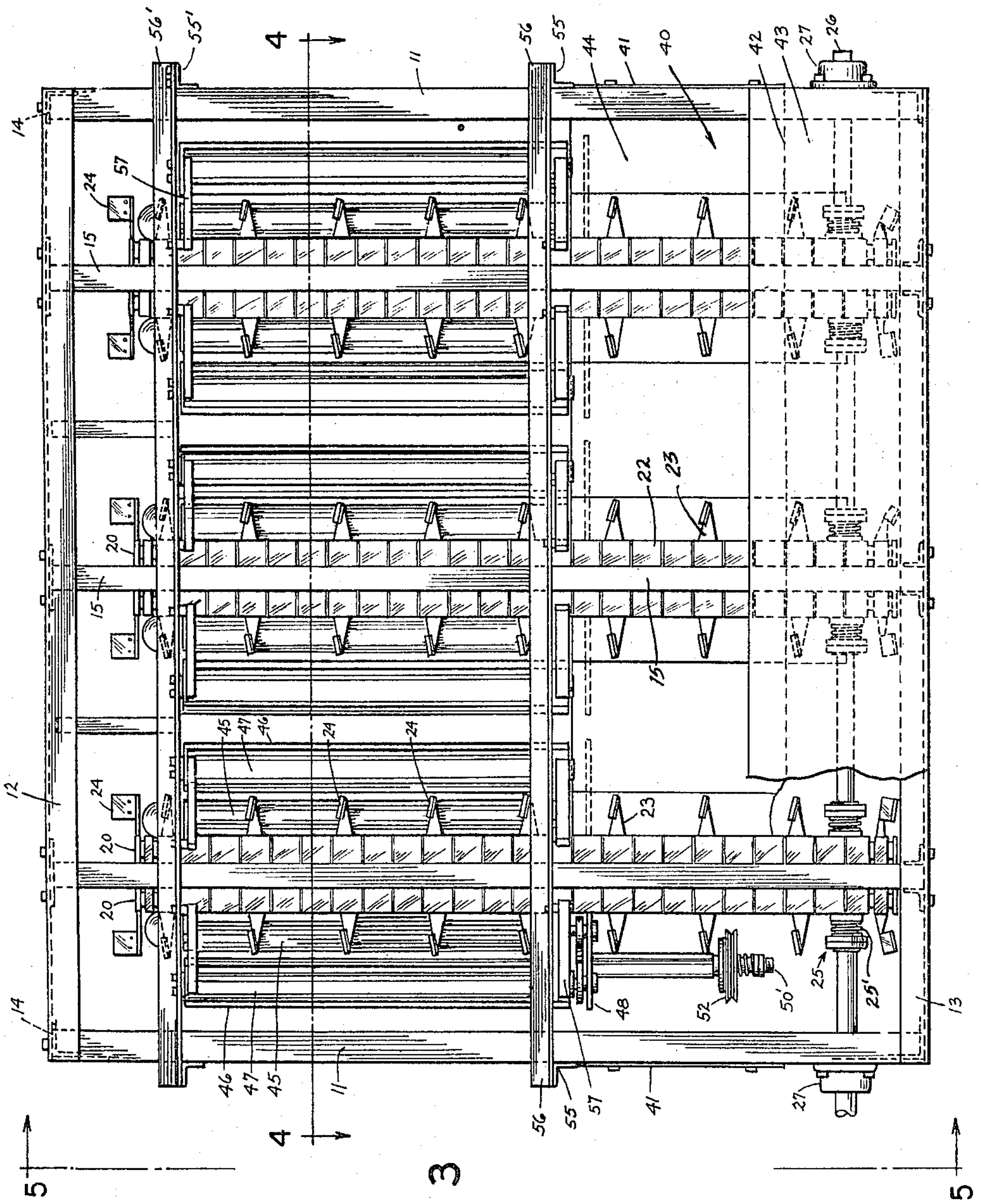
Figure 4:
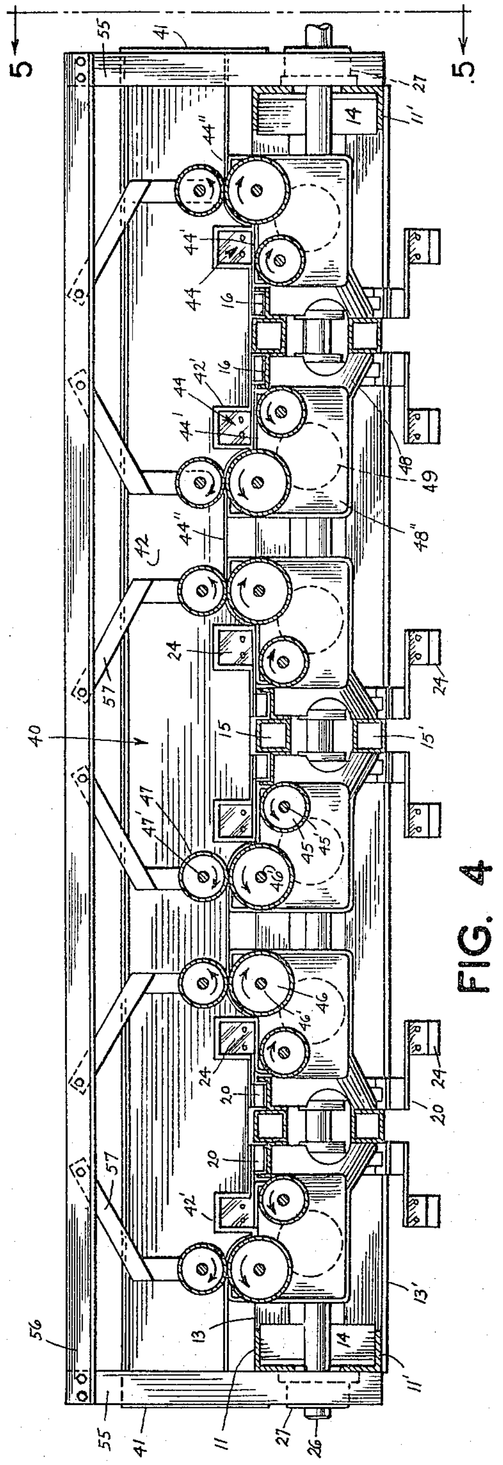
Figure 5:
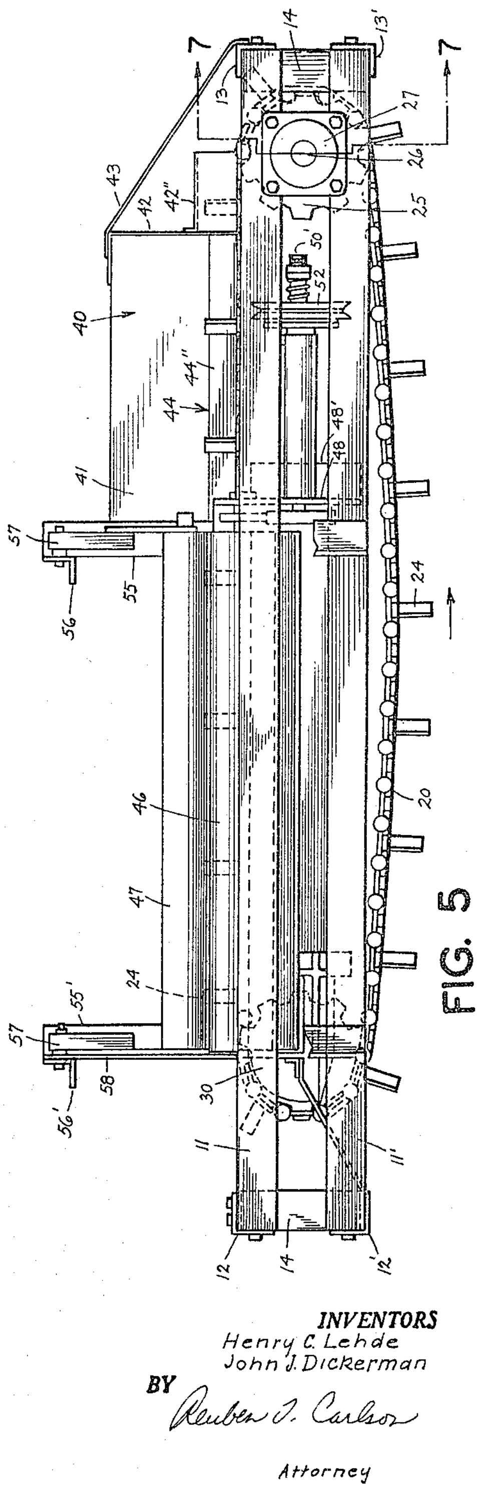
Figures 6, 7, 8, 9:
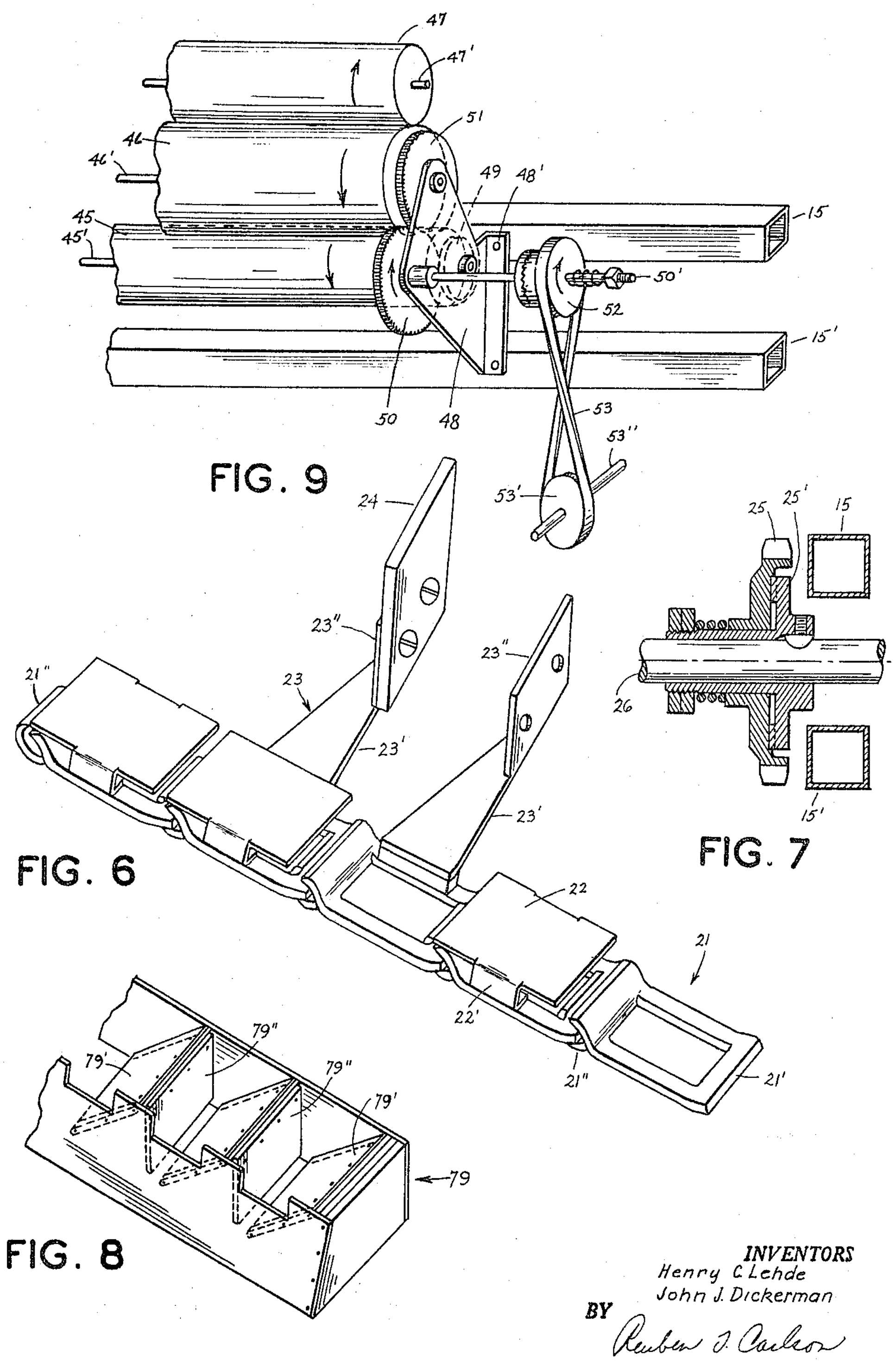
Figure 10:
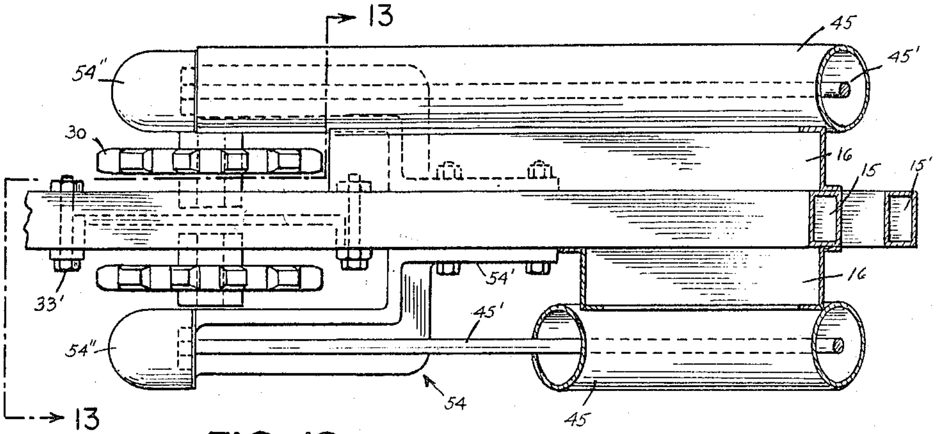
Figures 11, 12, 13:
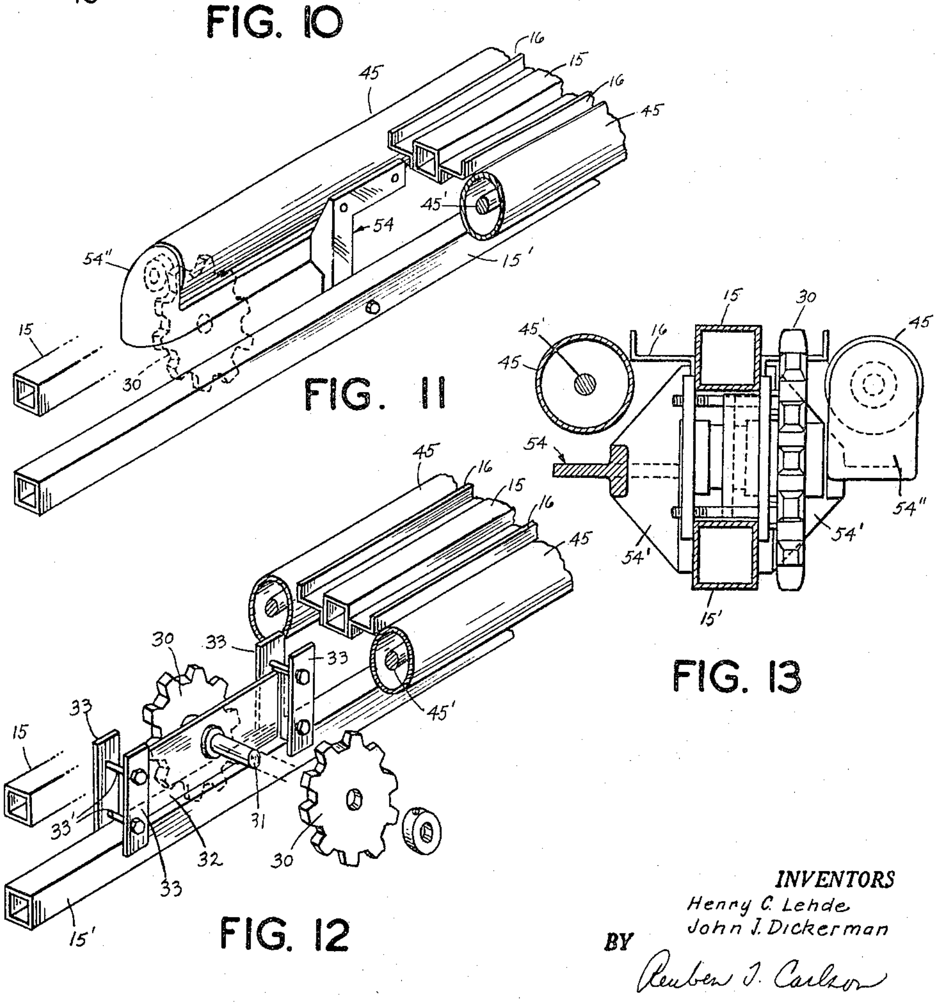
Figure 14:
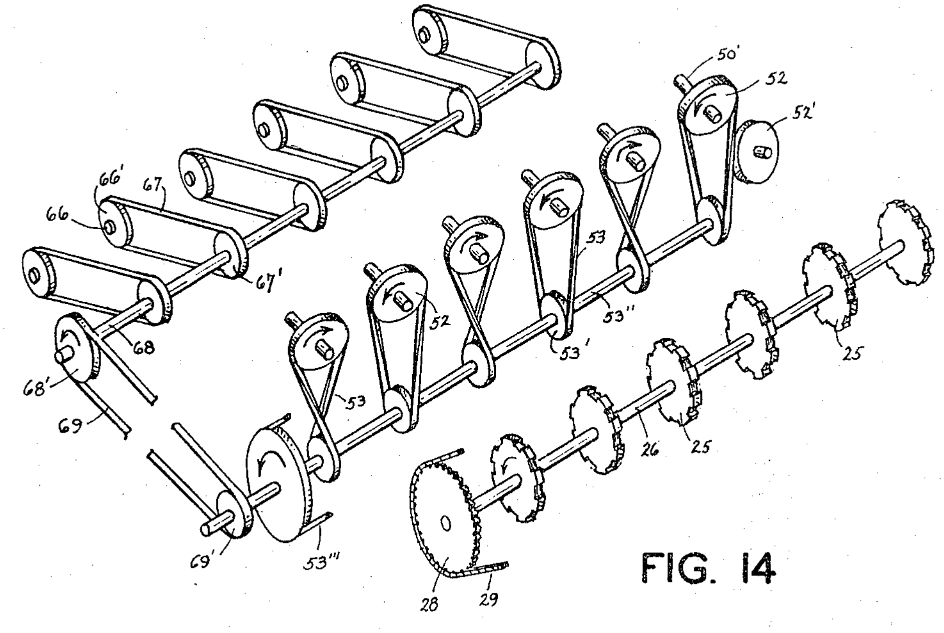
Figure 14A:
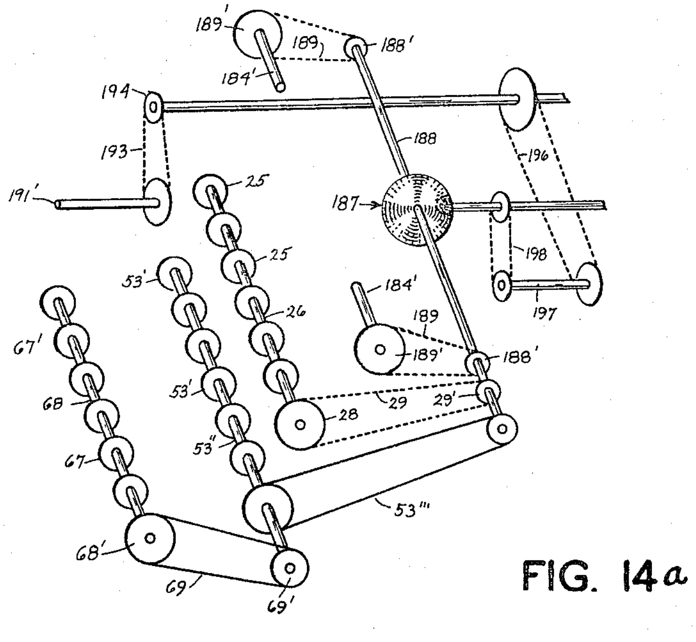
Figure 15:
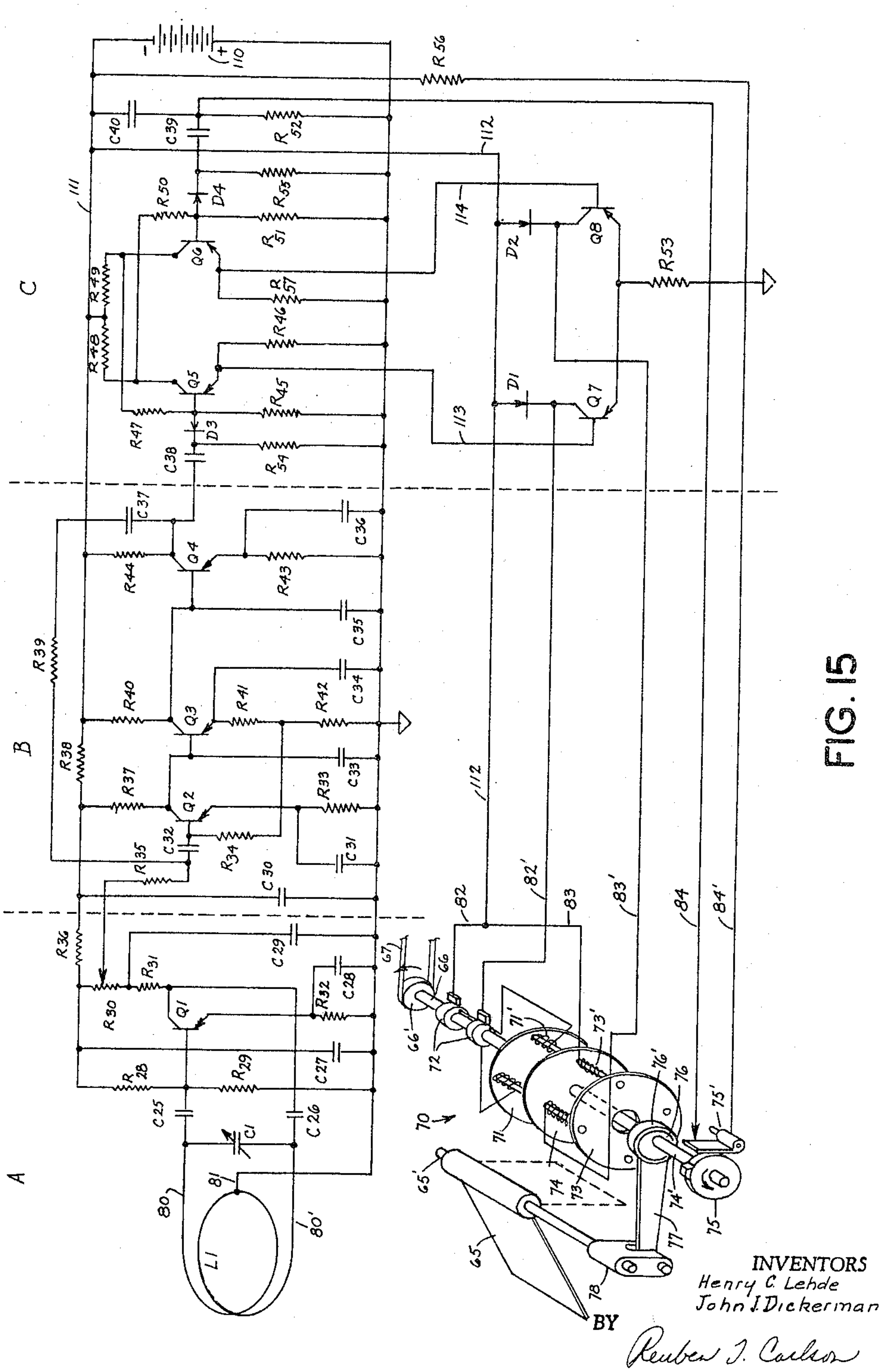
Figure 17:
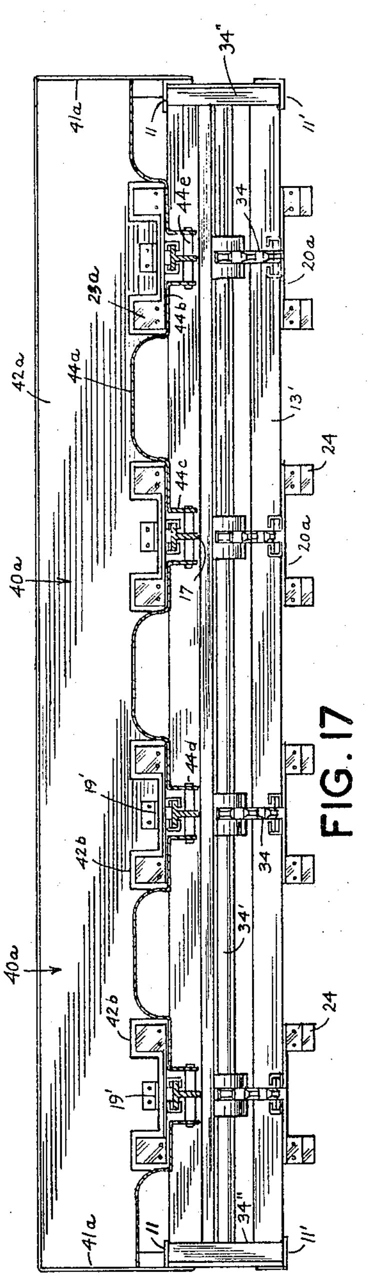
Figure 16:
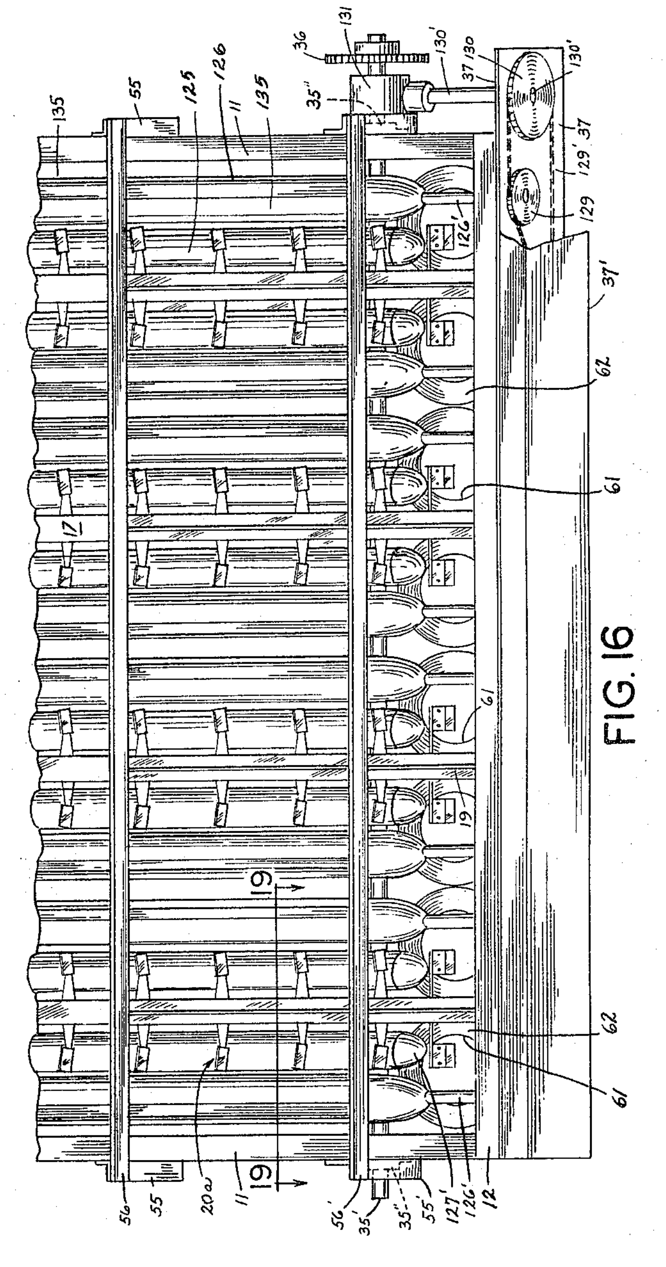
Figure 18:
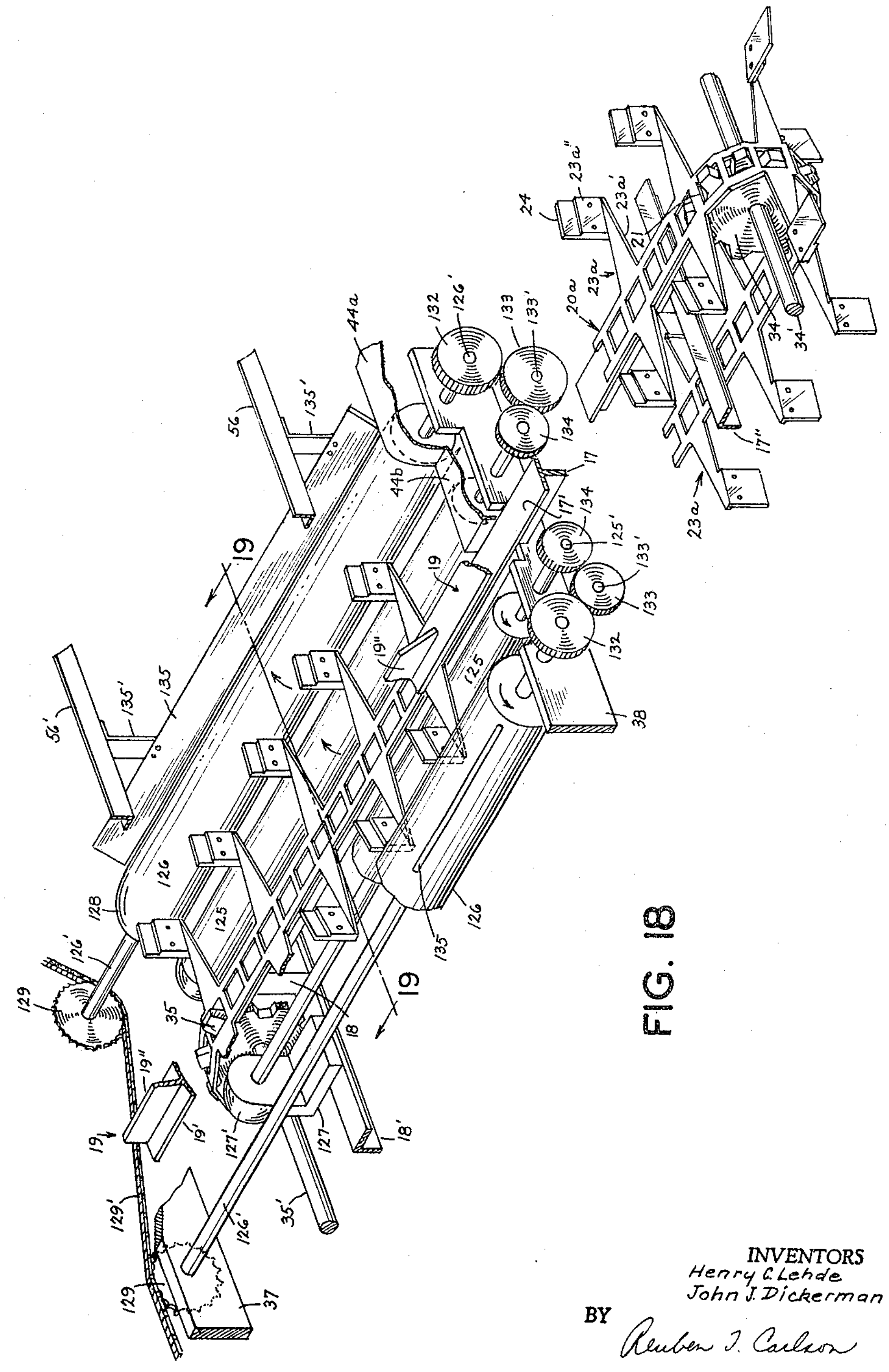
Figure 19:
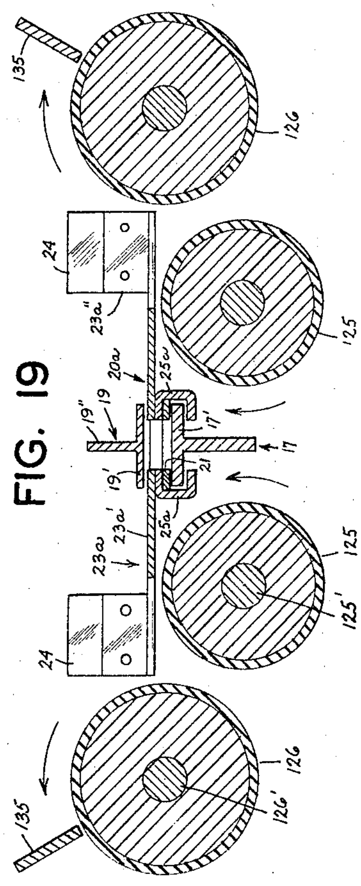
Figure 20:
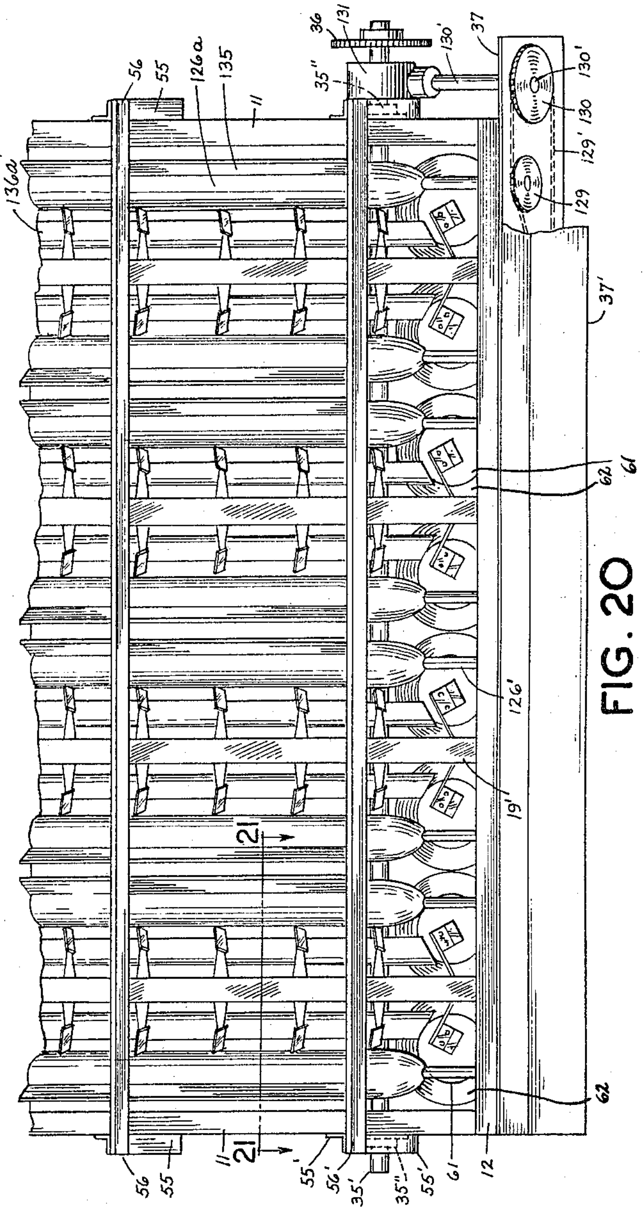
Figure 21:
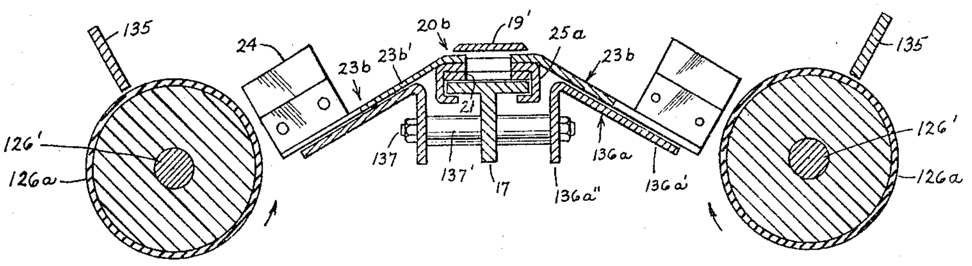
Figure 22:
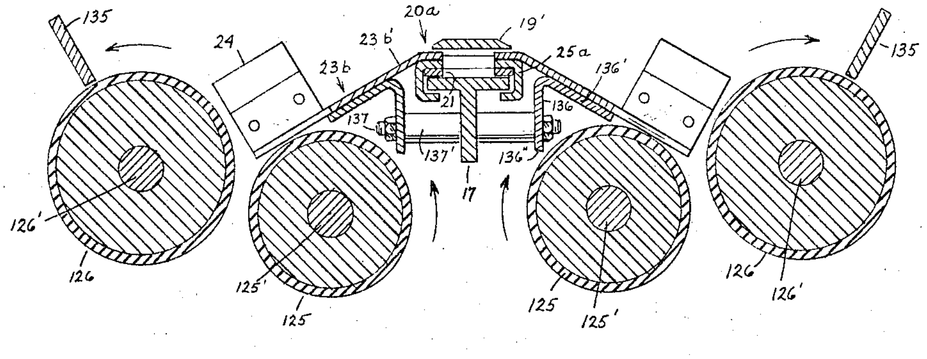
Figure 23:
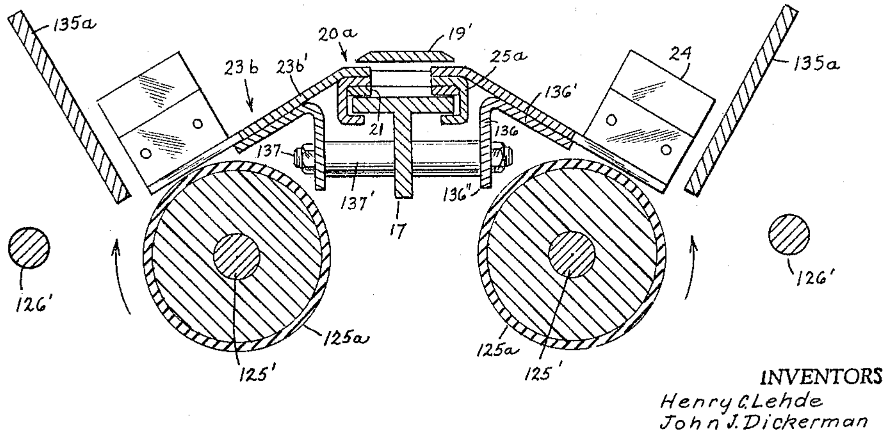
Figure 24:
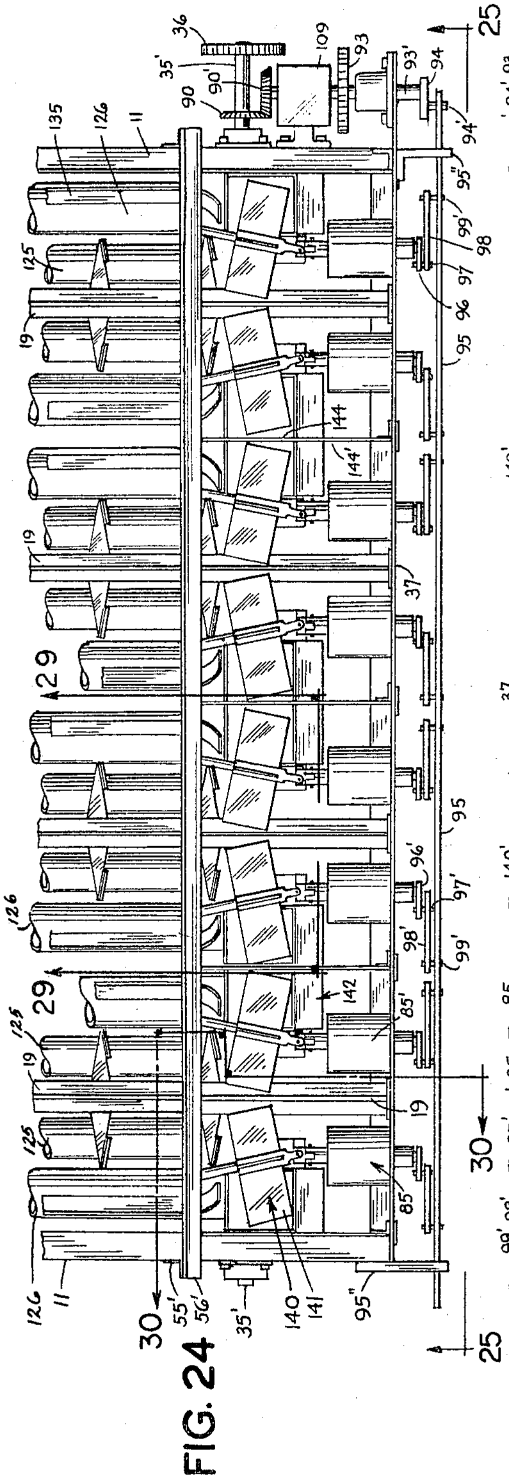
Figure 25:
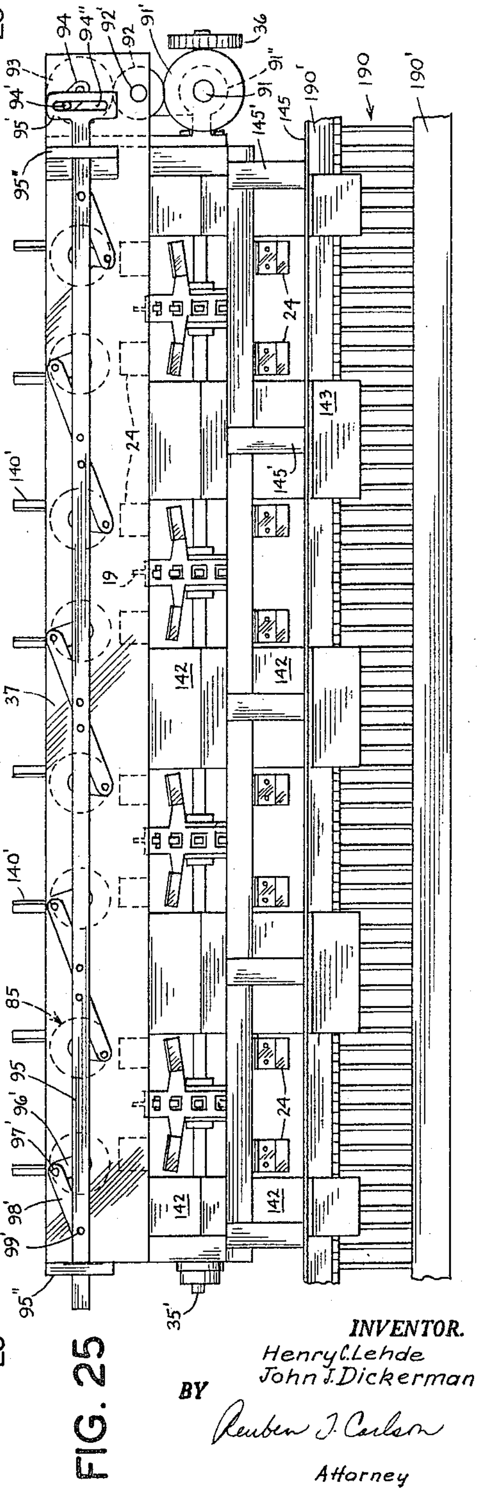
Figures 26, 27, 28:
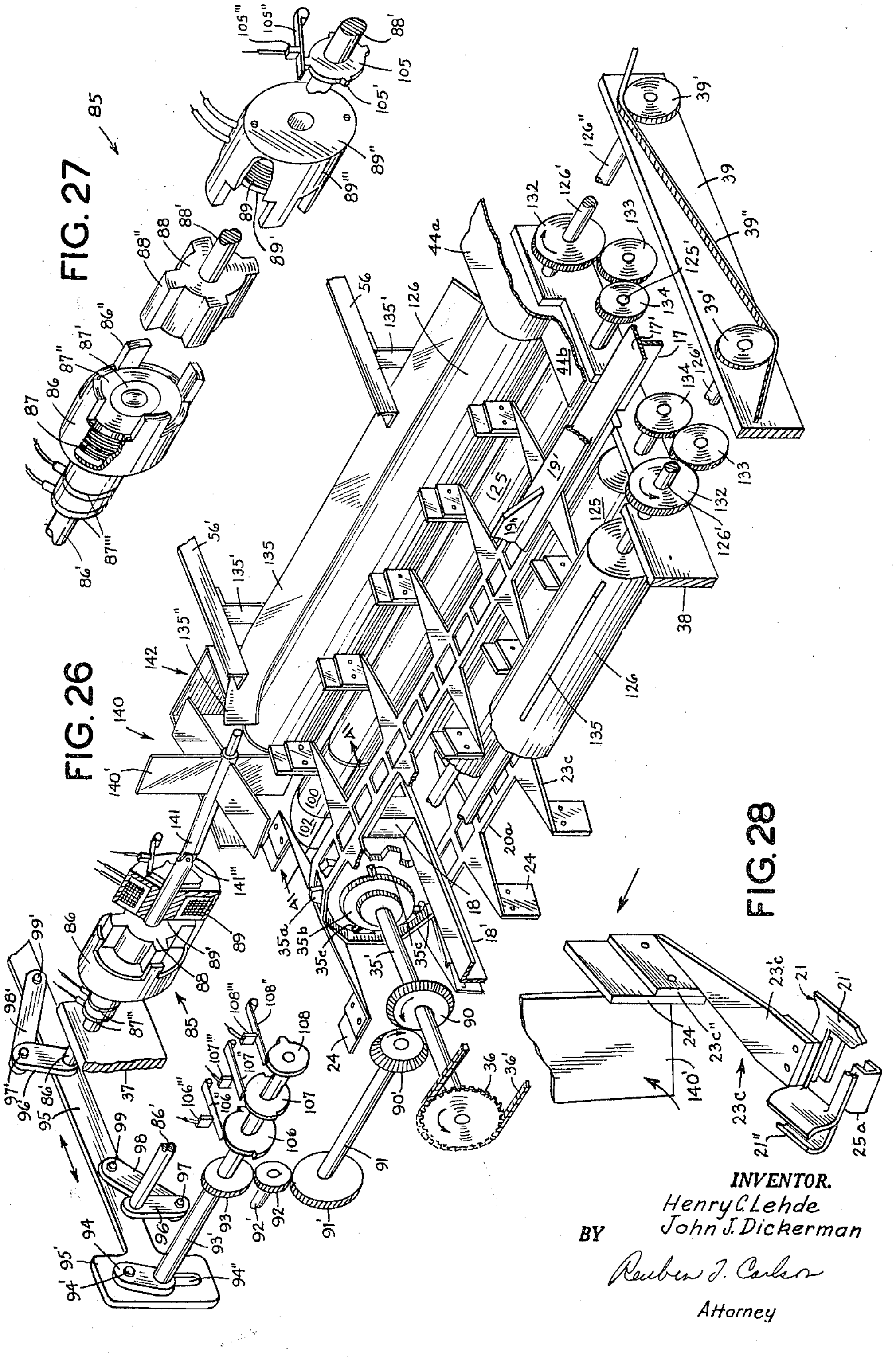
Figure 33:
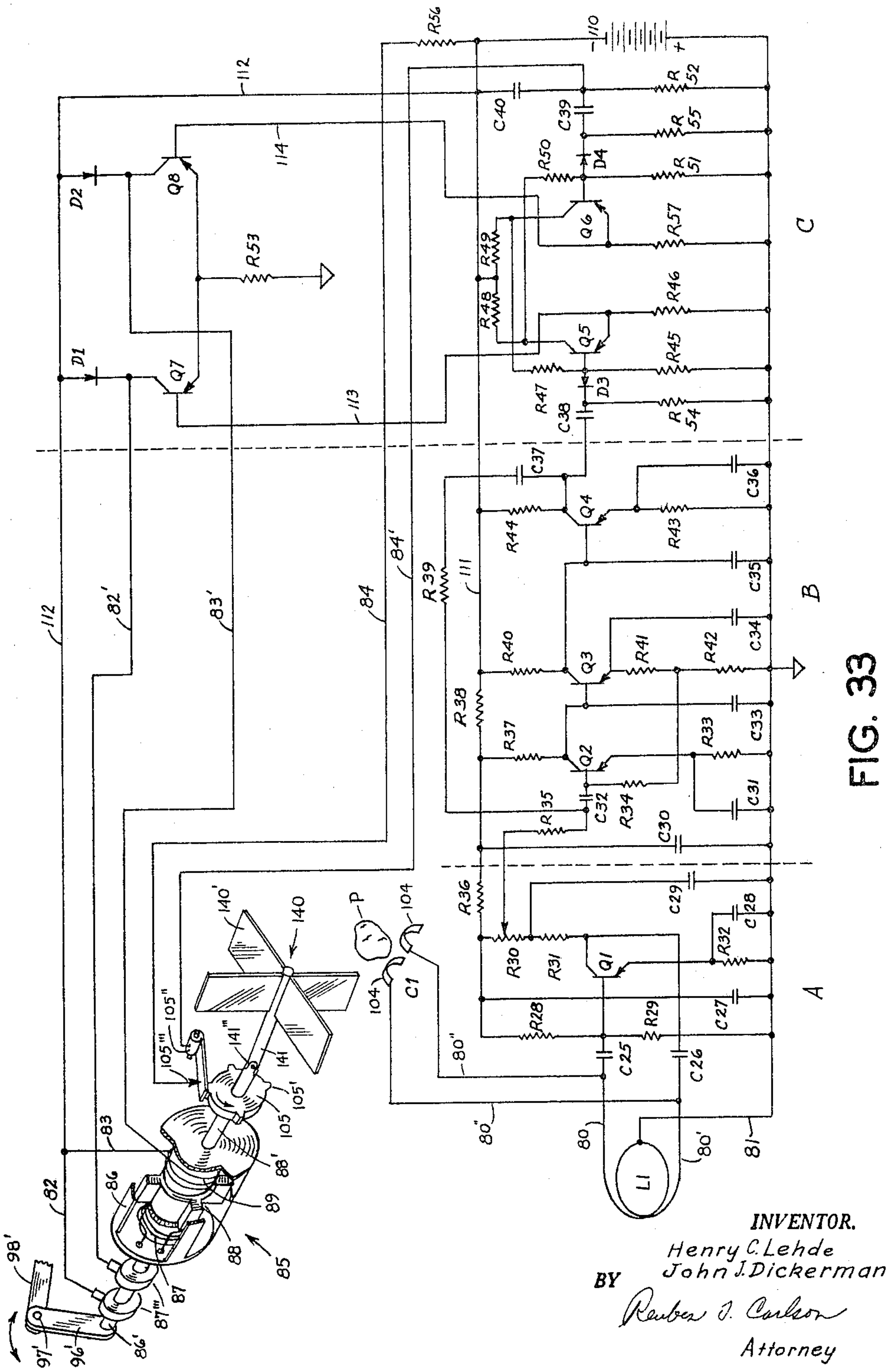
Figure 34:
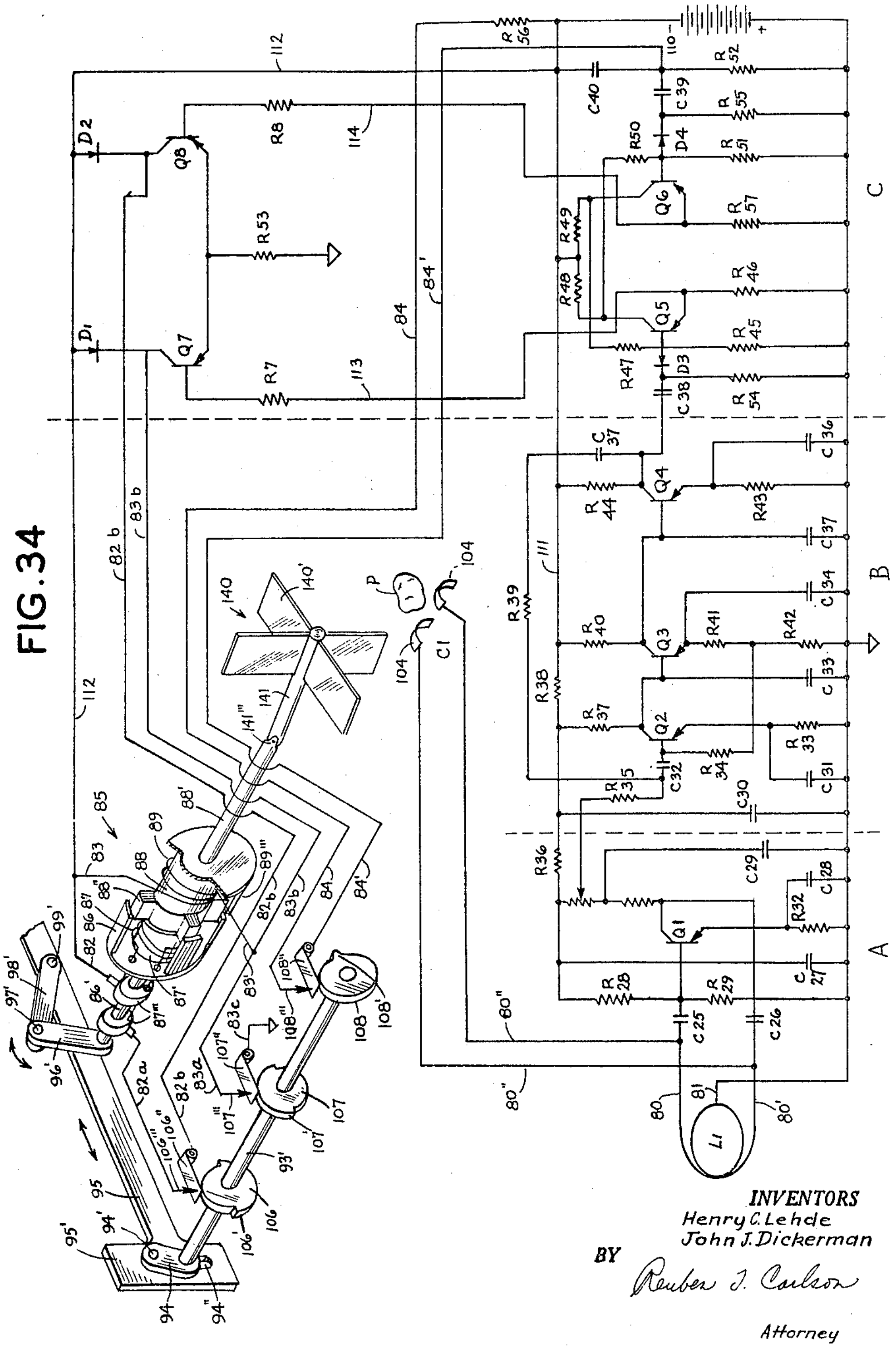
Figure 35:
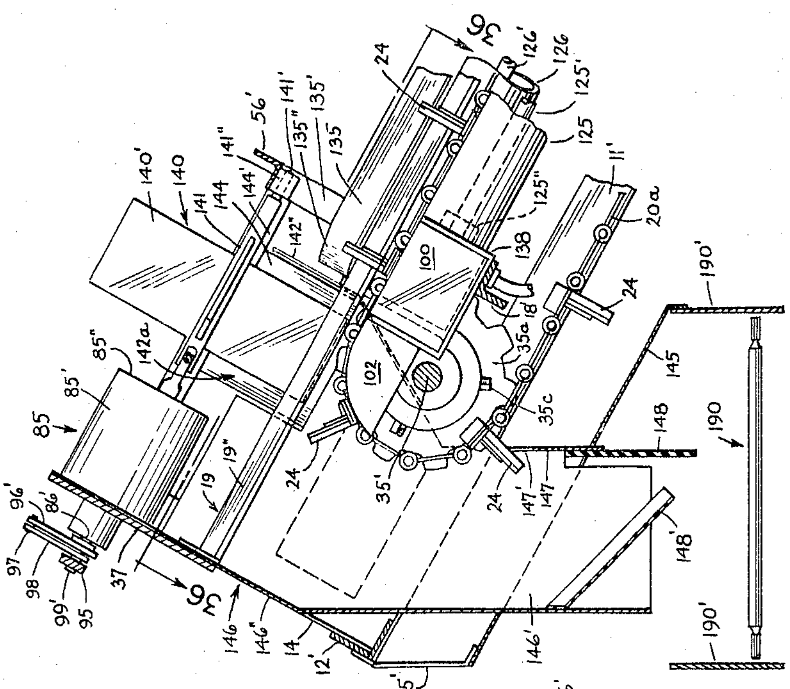
Figure 36:
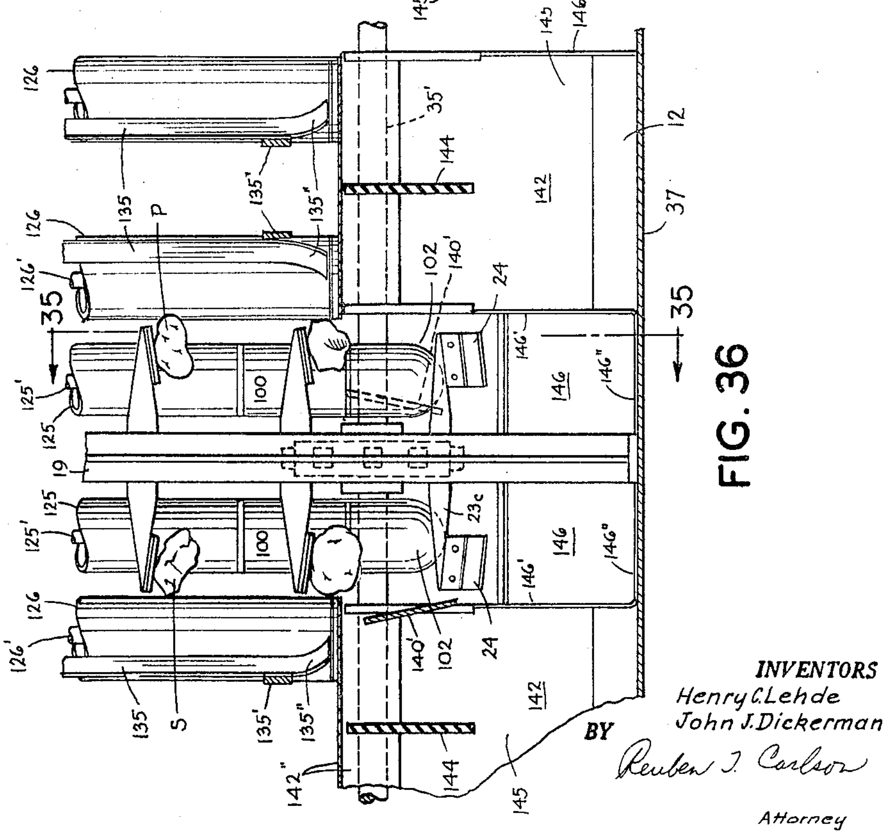

FIG. 2*a* is a fragmentary perspective view of the sensing coil containing ring associated with each of the potato selector and stone eliminator units shown in FIG. 2;

FIG. 3 is a plan view showing further details of the object marshalling and advancing assembly, certain parts being broken away to reveal further details;

FIG. 4 is a transverse section taken through the object marshalling and advancing assembly as the same would appear when viewed along line 4—4 of FIG. 3;

FIG. 5 is a side elevational view of the object marshalling and advancing assembly as the same would appear when viewed along line 5—5 of FIGS. 3 and 4;

FIG. 6 is an enlarged fragmentary perspective detail of one of the advancing chains and associated advancing paddles which form a part of the object marshalling and advancing assembly illustrated in FIG. 3;

FIG. 7 is a transverse section of the clutch sprocket associated with the shaft which drives the marshalling chains and paddles and as the same would appear when viewed along line 7—7 of FIG. 5;

FIG. 8 is a fragmentary perspective detail of the cushioning box which cushions the fall of the potatoes as dropped from the potato selector units generally shown in FIG. 2;

FIG. 9 is a fragmentary perspective view of one set of potato marshalling and secondary deviner rolls which are driven from the intermediate transverse shaft shown in FIG. 9;

FIG. 10 is a fragmentary plan view showing a part of the lower marshalling rolls and supporting framework, the paired sprockets for the marshalling chains and the roll supporting brackets;

FIG. 11 is a fragmentary perspective view showing a pair of the lower marshalling rolls, and adjacent marshalling chain supporting channels therebetewen, also one of the marshalling roll supporting brackets, and also one of the marshalling chain supporting sprockets in phantom lines;

FIG. 12 is a further fragmentary perspective view showing the lower part of marshalling rolls and marshalling chain supporting channels; this view also showing the marshalling chain supporting sprockets and connecting stationary shaft, and also the stationary shaft supporting bracket which may be adjusted to maintain the marshalling chains at proper tautness;

FIG. 13 is a transverse view, partly in section, of one pair of lower marshalling rolls and supporting brackets and framework as the same would appear when viewed along line 13—13 of FIG. 10;

FIG. 14 is a diagrammatic perspective view of the sprocket assembly which drives the marshalling chains and paddles, and adjacent thereto the pulley and V-belt assemblies which drive the potato marshalling and tumbling rolls, and also the continuously driven shafts of the selector units;

FIG. 14A is a schematic diagram, which supplements the drive diagram shown in FIG. 14, and which illustrates the driving system which may be used for driving the marshalling chains, for rotating the tumbling and spinner rolls, for driving the object selector units, and for driving the primary feed conveyor and the discharge conveyor from a single power source in operative synchronism; and FIG. 15 is a schematic diagram of one of the object selector and eliminator units and its associated transistor circuit which includes the sensing oscillator, multi-stage amplifier and switching circuit for controlling the operation of the selector and eliminator unit;

FIG. 16 is a plan view showing the upper half section of an alternative form of potato marshalling and tumbling assembly which embraces four duplex paddle equipped potato advancing chains driven from the upper ends thereof and designed to advance, marshall and tumble eight columns of potatoes between eight sets of paired marshalling and tumbling rolls which are also driven from the upper ends thereof;

FIG. 17 is a vertical transverse section of the lower end of the alternate form of marshalling and tumbling assembly shown in FIG. 16, this view showing the drop bin, the lower ends of the marshalling chains and associated potato advancing paddles, and the supporting sprockets therefor;

FIG. 18 is a fragmentary perspective view which illustrates further details of one of the similar duplex paddle equipped potato advancing chains and the two adjacent pairs of cooperating marshalling and tumbling rolls as incorporated into the assembly shown in FIGS. 16 and 17;

FIG. 19 is an enlarged transverse section taken along line 19—19 of FIGS. 16 and 18, and which shows in further detail the construction of one of the similar paddle equipped potato advancing chains and the two adjacent sets of paired marshalling and tumbling rolls which cooperate therewith;

FIG. 20 is a plan view showing the upper section of a further alternative form of potato marshalling and tumbling assembly which embraces four upwardly moving potato advancing chains driven from the upper ends thereof, each chain being equipped with two laterally spaced columns of downwardly inclined potato advancing paddles, each paddle column extending over a downwardly inclined potato supporting plate and positioned in cooperative relation to a single tumbling roll driven from the upper end thereof;

FIG. 21 is an enlarged transverse section taken along line 21—21 of FIG. 20 and showing in further detail the construction of one of the similar potato advancing chains and associated inclined paddles positioned in cooperating relation to the inclined potato supporting plates and adjacent tumbling rolls;

FIG. 22 is an enlarged transverse section showing the construction of a further modified form of paddle equipped potato advancing chain and adjacent sets of marshalling and tumbling rolls which are generally similar to that shown in FIG. 19 and designed for use in the assembly shown in FIGS. 16 and 17; except that the associated paddles of this FIG. 22 are inclined and cooperate with inclined potato supporting plates similar to that shown in FIG. 21; and except that the two sets of associated marshalling and tumbling rolls of this FIG. 22 are similar to those shown in FIG. 16 after the rolls of FIG. 16 have been adjusted in position to accommodate the adjacent inclined potato advancing paddles;

FIG. 23 is an enlarged transverse section showing the construction of a further modified form of a paddle equipped potato advancing chain and tumbling roll assembly which is generally similar to that shown in FIG. 21 and designed for use in the assembly shown in FIG. 20, the individual tumbling rolls of this FIG. 23 being similar to those shown in FIG. 20 after the rolls and baffle plates of FIG. 20 have been adjusted in position to directly support the paired potato columns, with the rolls driven in the opposite direction from that shown in FIG. 21;

FIG. 24 is a fragmentary plan view of the rear end of a potato marshalling and tumbling assembly generally similar to that shown in FIG. 16, but equipped with an alternative form of stone and clod separating mechanism, which includes a potato sensing unit located at the end of one of the marshalling rolls in each advancing column, and a paddle wheel responsive to the potato sensing unit, and operative to separate the potatoes from the stones and clods as they individually arrive at the upper end of the advancing column and to deflect the same into separate receiving chutes;

FIG. 25 is a rear elevational view of the marshalling and selector assembly as viewed in the direction of the arrows along line 25—25 of FIG. 24, this view showing the mechanism for driving the potato deflecting paddle wheels, the potato receiving chutes, and the transverse conveyor which receives the potatoes discharged from the chutes;

FIG. 26 is a fragmentary perspective view which illustrates further details of the duplex paddle equipped advancing chain shown in FIGS. 24 and 25, with two adjacent pairs of cooperating marshalling and tumbling rolls, with a potato sensing unit adjacent to the upper end of one of the paired rolls and contoured to the roll outline, and the potato deflecting paddle wheel and associated driving clutch and brake unit which is operatively responsive to the sensing unit to selectively separate the potatoes from the stones and clods;

FIG. 27 is an exploded perspective view of the electromagnetic clutch and brake unit which intermittently drives the deflecting paddle wheel in synchronism with the potato advancing paddles and in selective response to signals from the sensing unit;

FIG. 28 is a perspective view of one of the modified advancing paddles associated with the advancing chain shown in FIG. 26, and a portion of the deflecting paddle wheel, and which illustrates by arrows the relative motions of the advancing paddle and the synchronized deflecting paddle which cooperate to laterally deflect the advancing potato or stone from the end of the marshalling channel without interfering with the movement of the advancing paddle;

FIG. 29 is a fragmentary transverse section, taken along line 29—29 of FIGS. 24 and 30, this view showing the delivery end of the marshalling chain as shown in FIG. 26, its supporting sprocket, and associated duplex advancing paddles, and two of the deflecting paddle wheels, and portions of two adjacent potato receiving chutes and a stone receiving chute therebetween;

FIG. 30 is a fragmentary longitudinal section taken along line 30—30 of FIGS. 24 and 29, and showing the delivery end of the marshalling and selecting mechanism of FIG. 24, the electromagnetic clutch and brake unit which drives the deflecting paddle wheel, the potato sensing unit, the potato chute, the transverse potato conveyor, and the stone and clod deflecting cover extending over the transverse potato conveyor;

FIG. 31 is a longitudinal section of a representative form of potato sensing unit as viewed along line 31—31 of FIG. 32, and showing the general components of the sensing unit and its mounting support, the adjacent end of the potato tumbling roll and the rounded discharge nose associated therewith;

FIG. 32 is a transverse section of the potato sensing unit as viewed along line 32—32 of FIG. 31, and showing the general arrangement of its components, its contoured insulating cover, and the adjacent potato spinning roll;

FIG. 33 is a schematic diagram of the electrical connections to the magnetic clutch and brake unit which manipulates the potato deflecting paddle wheel shown in FIG. 26, and the associated sensing and transistorized control circuit;

FIG. 34 is a schematic diagram showing the electrical connections to the magnetic clutch and brake unit, arranged to operate the paddle wheel in a manner to laterally deflect stones and clods instead of the potatoes, and the associated sensing and transistorized control circuit;

FIG. 35 is a fragmentary longitudinal section taken along line 35—35 of FIG. 36, and generally similar to the section shown in FIG. 30, but modified to provide for lateral deflection of the stones and clods and straight line discharge of the potatoes into a receiving chute in line with the advancing paddles when the deflecting paddle is operated by the energy system shown in FIG. 34; and FIG. 36 is a fragmentary plan view of the rear end of the harvester as the same would appear when viewed along line 36—36 of FIG. 35, and modified to provide for lateral deflection of the stones into a lateral chute and discharge of the potatoes into a receiving chute in line with the advancing paddles.

Similar reference characters refer to similar parts throughout the several views of the drawings and specification.

The selecting apparatus of this invention can be advantageously construced as an integrated unit adapted to be stationarily positioned to form a component part of a plant or warehouse installed processing line, or mounted on the body of a traveling vehicle.

The selecting apparatus generally comprises an object marshalling and advancing assembly 10 as shown in FIGS. 3, 4 and 5, which operates to withdraw a mixture of objects of substantially different electrical conductivity from a receiving area or bin 40, marshall the withdrawn objects into one or more columns, and advance the columnized objects in individually spaced relationship and successive order into the presence of a sensing device 60 as illustrated in FIGS. 2 and 2*a*, which is sensitive to the electrical conductivity of the individually spaced objects directly adjacent thereto, and whose sensitivity is subject to adjustment.

When an object of predetermined electrical conductivity is advanced to sensing position, a feeble electrical pulse is instantaneously produced in the detecting circuit A of the sensing device 60, which is suitably amplified by an amplifier circuit B, and which in turn energizes a switching circuit C as illustrated in FIG. 15. The switching circuit controls the operation of a quick operating deflector device 70 illustrated in FIGS. 2 and 15, which functions to separate the objects of higher electrical conductivity from objects of predetermined low conductivity, in accordance with the sensitivity setting of the sensing device.

The marshalling and advancing assembly illustrated in FIGS. 2, 3, 4 and 5 embraces a series of upwardly inclined and parallel extending columnizing troughs, each composed of a longitudinally extending tumbling roll 45 and an adjacent spinner roll 46 defining a columnizing trough therebetween, and which are rotatably driven from the lower end thereof. A continuous paddle equipped object advancing and marshalling chain 20 driven from the lower end thereof, withdraws objects from the receiving area or bin 40 and advances a column of articles along the adjacent trough while the columnized objects are tumbled during advance by the rotating tumbling roll 45 and adjacent spinner roll 46, thereby serving to marshall the columnized objects in single file and individually spaced order when they reach the upper end of the trough formed by the tumbling roll 45 and adjacent spinner roll 46 for discharge into the inner tube 61 of the sensing ring 62 as shown in FIGS. 2 and 2*a*.

In the alternate form of marshalling and advancing assembly shown in FIGS. 16, 17, 18 and 19, the trough forming tumbling roll 125 and adjacent spinner roll 126 in paired arrangement are rotatably driven from the upper end thereof, and a single object advancing chain **20*a* extends therebetween, driven from the upper end thereof, and equipped with spaced object advancing paddles extending from both sides thereof. Thus a single chain 20*a* with object advancing paddles extending from both sides thereof, operates to advance two columns of objects along the paired tumbling and spinning rolls positioned on opposite sides of a single object advancing chain. When the respective columns of objects reach the upper end of the trough forming tumbling and spinner rolls 125 and 126, they are columnized in single file and individually spaced in order and are thus discharged into the inner tube 61 of the sensing device 60** positioned directly adjacent the upper end of each discharging column as indicated in FIG. 16.

In substitution for the sensing device 60 and the mechanically driven deflector unit 70, positioned directly below the upper discharge ends of the trough forming marshalling rolls as indicated in FIGS. 2, 16 and 20, an alternative form of sensing and deflector arrangement may be used, as illustrated in FIGS. 24–36. In this alternative arrangement, a modified sensing unit 100 is compactly contained within a boxlike structure 101 having a non-conductive cover part 101, which forms a linear continuation of the upper half of each tumbling roll 125, as illustrated in FIGS. 29–30 and 35–36. The sensing circuit of the sensing unit 100 may comprise a pair of spaced sensing plates 104 positioned adjacent the inner surface of the cover part 101′ of the sensing unit 100, and which are sensitive to the electrical conductivity of an object traveling thereover. The spaced sensing plates 104 are joined to a detecting circuit A, whose feeble current pulse is simplified by an amplifying circuit B, which in turn operates a switching circuit C as illustrated in FIGS. 33 or 34; all compactly contained within the sensing box 101.

The switching circuit C of the sensing unit 100, controls the energization of a magnetic clutch and brake device 85, whose driving part oscillates in synchronism with the advancing movement of the columnized and individually spaced objects as they separately arrive in sensing relation to the sensing device 100. When the clutch and brake mechanism 85 is electrically energized by the controlling influence of the sensing device, a deflecting paddle or paddle wheel 140, positioned adjacent the sensing unit 100, is manipulated to separate objects of substantial electrical conductivity from objects of appreciably lower electrical conductivity, and thereupon direct the two groups into separate discharge chutes.

As an exemplification of the flexibility in use of the sensing mechanism of this invention, this sensing mechanism may be mounted as an integral unit upon a traveling vehicle such as a harvester equipped to excavate root crops from the soil, as exemplified in FIGS. 1 and 2. Such root crop harvesters may be equipped with one or more digging shovels 170 which transfers the excavated material onto an upwardly inclined primary conveyor 180, which may comprise a continuous conveyor composed of a series of transverse bars, through which soil and other debris smaller than the root crop to be gathered, may be sifted to ground. The primary conveyor 180 may be suitably supported at the lower end thereof by an idler spool 179 and a driven spool 184 at the upper end thereof, and whose shaft 184' is operably connected to the driving mechanism of the harvester.

The root crop harvester is also preferably equipped with a primary deviner 1 as shown in FIG. 2, positioned directly adjacent the discharge end of each primary conveyor 180. The primary deviner 1 may comprise a free riding deviner roll 2, whose supporting shaft extends parallel to the adjacent drive shaft 184' of the primary conveyor 180, but preferably under and slightly to the rear of the conveyor drive shaft 184', so that the root crop to be gathered as well as vines and other debris, must drop onto the upper surface of the deviner roll 2.

The deviner roll 2 may be in the form of a rubber belt 3 having a friction or gripping surface which travels in the direction of the arrow shown in FIG. 2. A belt tensioning roll 4, extending under and spaced from the lower reach of the elevating conveyor 180, supports the lower end of the deviner belt 3. The deviner roll 2 or deviner belt 3 is flexibly supported so that its gripping surface normally makes pressure contact with the lower reach of the elevating conveyor 180 as it moves around the primary conveyor supporting spool 184. This support may be provided by a pair of spaced arms 5 as shown in FIG. 2, in which the shaft of the deviner roll 2 and lower belt guiding roll 4, are journalled. The lower ends of the supporting arms 5 are pivotally connected to suitable brackets supported from the harvester body. Resilient means such as springs 6, connecting to the supporting arms 5 and body frame of the harvester, maintain the rubber covered surface of the deviner roll 2 or deviner belt 3 in pressure contact with the lower reach of the primary conveyor 180 as it travels along the under side of the driving spool 184 of the primary conveyor.

The mixture of objects of different electrical conductivity to be separated, such as a root crop of higher electrical conductivity than stones, hard clods and sod mixed therewith, are discharged from the primary conveyor 180 into a receiving area or bin 40 as illustrated in FIG. 2, and which forms a component part of the unitized separating apparatus of this invention.

*The object marshalling and advancing assembly*

The mixture of electrically conductive and non-conductive objects, such as conductive potatoes and non-conductive stones, clods and other debris, and discharged from the primary conveyor 180, are collected in a receiving area or bin 40 of the objects marshalling and advancing assembly 10, as generally illustrated in FIG. 2.

In general structure, the object marshalling and advancing assembly 10 extending from the drop bin 40 as shown in FIGS. 3, 4 and 5, includes a series of paddle equipped object advancing and marshalling chains 20, operating in cooperative relation to a series of rolls, including a tumbling roll 45 by means of which the objects are spun or tumbled during upward advance, and an associated spinner roll 46 and floating roll 47.

The object marshalling and advancing assembly 10 also includes a suitable supporting framework which may comprise a pair of upper side frame members 11 and a pair of lower side frame members 11' extending longitudinally at an inclined angle; the upper and lower side frame members 11–11' being joined by transversely extending upper and lower head frame members 12–12' and upper and lower tail frame members 13–13', thereby providing a pair of vertically spaced frames of generally rectangular form which are joined by vertically extending corner struts 14, as shown in FIGS. 3, 4 and 5. The integrated assembly framework is rigidly supported at an angle of about 30° to the horizontal, from the floor of a processing plant or traveling harvester carriage.

The object marshalling and advancing assembly 10 as shown in FIGS. 3, 4 and 5 is equipped with six marshalling chains 20, each having a column of spaced paddles extending laterally therefrom and together providing a series of six paddle columns. However, it will be appreciated that any desired number of marshalling chains and associated object advancing paddles may be used as required. Each column of object advancing paddles is confined by a set of triple rolls which includes an object tumbling roll 45, a secondary spinner roll 46 and a cooperating floating roll 47.

The object advancing chains 20 are supported by three longitudinally extending upper tubular frame members 15 whose ends are secured to the upper head frame member 12 and the lower tail frame member 13 respectively, and by a corresponding number of lower tubular frame members 15' whose ends are respectively supported by the lower head frame member 12' and the lower tail frame member 13' as shown in FIGS. 3 and 4, each set of upper and lower tubular frame members 15–15' being in vertical alignment. Each of the upper tubular frame members 15 has a longitudinally extending bar 16 of Z-shaped cross-section secured to each side face thereof as shown in FIG. 4. Each Z bar 16 provides a supporting channel in which the upper reach of a potato marshalling chain 20 may travel.

Each of the paddle equipped object advancing chains 20 is assembled from a series of hingedly connected chain links 21 as shown in FIG. 6, which are joined together to provide a continuous chain. Each link 21 may be stamped from a generally rectangular plate of sheet metal to provide a generally rectangular link frame having a transverse leg section 21' at one end thereof, and an underslung curvilinear grip lip 21'' formed to encircle the transverse leg 21' of the next adjacent link, the curvilinear grip lip 21'' being cut from the plate which forms the link to provide a generally rectangular hole therein. Each link may be provided with a link covering platform 22 formed of sheet metal which presents wing tabs 22' secured to the longitudinal legs of the link frame as by weldments.

A series of object advancing paddles arranged in columnar alignment, are secured in uniformly spaced relation to one side of the adjacent chain links. Each paddle 23 includes a laterally extending arm section 23' secured as by weldments to the adjacent link 21, and a paddle section 23'' extending upwardly therefrom and slightly rearwardly inclined with respect to the center line of the link chain as shown in FIG. 6. Each paddle section has secured thereto a paddle plate 24 which may be made from rubber impregnated fabric of substantial thickness and stiffness, but sufficiently flexible to avoid bruising the potatoes in tumbling contact therewith.

The upper reach of each continuous object advancing chain 20 is pocketed in the guide channel formed by a Z bar 16 attached to the adjacent upper tubular frame member 15, with the upper surface of the link covering platforms 22 of the chain lying in substantially the same horizontal plane as the upper surface of the adjacent tubular frame member 15, as shown in FIG. 4. The lower end of each object advancing chain 20 is trained over a tail sprocket 25 connected to a slip clutch 25' as shown in FIGS. 3 and 7, which is connected to a transverse supporting shaft 26 as shown in FIGS 3, 5 and 7. The transverse shaft 26 on which all of the tail sprockets 25 and associated slip clutches 25' are connected, is supported at the ends thereof by bearing blocks 27 secured to the adjacent upper and lower side frame members 11–11' of the object marshalling and assembling framework, as shown in FIGS. 3, 4 and 5. A driving sprocket 28, fixed to the projecting end of the tail sprocket supporting shaft 26, is driven by a driver chain 29 as shown in FIG. 14, from a suitable power source.

The upper discharge ends of the object advancing and marshalling chains 20, are each supported by an idler sprocket 30, as shown in FIGS. 5, 10, 11, 12 and 13. The six idler sprockets 30 for the assembly shown in FIG. 7 are arranged in pairs, and positioned on opposite sides of the upper and lower tubular frame members 15–15′ positioned therebetween, with the two sprockets 30 in alignment with the respective channel formations of the chain supporting Z bars 16. Each pair of adjacent idler sprockets 30 are journaled on a short shaft 31 as shown in FIG. 12. The short shaft 31 extends through and is rigidly fixed to a vertical metal plate 32 of substantial stiffness which rests upon the adjacent lower tubular frame member 15′. The vertical metal plate 32 is supported by two pairs of clamp plates 33 secured as by clamp bolts 33′ to each end thereof, with the upper and lower ends of the paired clamp plates 33 positioned to frictionally grip the opposite sides of the upper and lower tubular frame members 15–15′ extending therebetween. By adjusting the position of the paired sprocket supporting plates 33 and fixedly securing the same to the upper and lower tubular frame members 15–15′ as by tightening the clamp bolts 33′, the object advancing chains 20 may be drawn to proper tautness.

The object mixture dropping from the primary conveyor 180 cascades into the drop bin 40 therebelow, which forms a part of the object marshalling and advancing assembly 10, as shown more particularly in FIGS. 3, 4 and 5. The drop bin 40 comprises a pair of side wall plates 41 secured to the adjacent upper frame members 11 of the assembly, and a transverse rear wall plate 42 suitably secured to the lower ends of the side wall plate 41 of the bin. The transverse rear wall plate 42 presents paddle entry cut-outs 42′ as shown in FIG. 4 through which the object advancing paddles 23 may travel when they have passed over the upper half of the tail sprockets 25 which support the lower end of the advancing chains 20.

The entry side of the paddle entry cut-outs 42′ in the transverse wall plate 42 may be provided with a vestibule housing 42″ formed of sheet metal as shown in FIG. 5, to prevent wedging of potatoes between the entry cut-outs 42′ and the paddles 23. A downwardly inclined deflection plate 43, extending over the tail sprockets 25 and associated slip clutches 25′, and secured to the upper end of the rear wall plate 42 and adjacent upper tail frame member 13′, provides protection for the chain supporting and driving mechanism therebelow.

The floor of the drop bin 40 may be formed of a series of sheet metal floor plates 44, each extending between and secured to the right and left hand Z bars 16 of adjacent potato advancing chains 20 as shown in FIGS. 3 and 4. The channel formations of the Z bars 16 and the upper face of the tubular frame member 15 extending therebetween are not covered by these floor plates 44. Each floor plate 44, comprising a pair of relatively flat floor sections 44′ and an intermediate upwardly arching section 44″, extends between the rear wall plate 42 of the bin 40 and the adjacent lower ends of the adjacent tumbling rolls 45 and spinner rolls 46. The upper ends of the arched sections 44″ of these four plates are shaped to slightly overlap the lower ends of the two spinner rolls 46 as shown in FIG. 8.

The non-conductive objects discharged into the drop bin 40, are separated and eliminated from the electrically conductive objects collected therein, by a series of electronic selector and eliminator units 60 positioned at the rear end of the marshalling framework. For more effective operation, the mixture of objects is marshalled into single file columns and in spaced order before discharge into the receiving tubes 61 of the sensing rings 62; and as separately advanced by the marshalling chains 20 and associated paddle plates 24, operating in cooperation with the tumbling rolls 45 and spinner rolls 46, which extend from the upper ends of the floor plates 44 of the drop bin 40 to a position directly above the selector units 60.

Each column of object advancing paddle plates 24, passing through the drop bin 40, picks up the objects to be classified and pushes the same into the lower ends of the troughs as defined between each tumbling roll 45 and the adjacent spinner roll 46, the rolls 45–46 being upwardly inclined at an angle of approximately thirty degrees. As shown in FIGS. 3 and 4, a tumbling roll 45 is positioned directly beneath each column of paddle plates 24, and a spinner roll 46 is positioned adjacent the outer edge of each column of paddle plates 24 at a slightly higher elevation than the tumbling roll 45 shown in FIG. 4. Each tumbling roll 45 and the adjacent spinner roll 46 are separated and thus define a trough in which the objects may travel as pushed towards the rear end of the marshalling framework by the aligned paddle plates 24. The objects advanced by the paddle plates 24 and contained in the troughs as confined between each tumbling roll 45 and adjacent spinner roll 46 are tumbled during advance by the rolls 45 and 46 which are driven in the direction indicated by the arrows shown in FIG. 4.

While two or more objects may be pushed by each paddle plate 24 from the drop bin 40, the upwardly inclined movement of each paddle plate 24, together with the rotation of the adjacent tumbling rolls 45 and 46 on which the objects are supported, results in the elimination of objects which are not directly engaged by the paddle plates 24. Two non-spherical objects tumbling in contact with each other will result in the ejection of all but one object from the advancing influence of a single paddle. Retention of a single object in contact with each of the columnized paddle plates 24 is facilitated by making the pushing faces of the columnized paddle plates 24, as shown in FIG. 3, rearwardly inclined at a slight angle from lines perpendicular to the center line of travel of the upper reach of the marshalling chain 20.

The objects not directly engaged by the columnized paddle plates 24 during upward inclined travel thereof, spill laterally onto the link covering platforms 22 of the marshalling chains 20, or onto the substantially coplanar upper surface of the adjacent upper tubular frame member 15, and then tumble by gravity back towards the drop bin 40, until again engaged by a paddle plate 24. As thus operated, a single object is carried by each paddle plate 24 for separate discharge into the adjacent drop tube 61 of the selector unit 60.

Each of the paired tumbling rolls 45 and 46 preferably has a roughened peripheral surface of soft rubber to thereby effectively spin or tumble the objects in contact therewith. The lower ends of the arched sections 44″ of the floor plates 44 provide walls which channel the objects into the troughs defined between adjacent tumbling rolls 45–46, and each roll 46 and superimposed floating roll 47 also serves to channel the objects into these troughs, and prevent their escape between adjacent floating rolls 47.

Each tumbling roll 45 as shown in FIGS. 3, 4 and 9–13 is supported on a shaft 45′ and each companion roll 46 is also supported on a shaft 46′ as shown in FIGS. 3, 4 and 9. Positioned above each companion roll 46 and normally in floating contact therewith is a floating roll 47 which is also supported on a shaft 47′. Each floating roll 47 has riding contact with the adjacent companion roll 46, is rotated thereby in the direction indicated by the arrows in FIG. 4.

As shown in FIGS. 3, 4 and 9, the lower end of each tumbling roll shaft 45′ and companion roll shaft 46′ is supported by a plate bracket 48 having an attaching flange 48′ which is secured as by bolts to the adjacent upper and lower tubular frame members 15–15′. The tumbling roll shaft 45′ carries a gear 49 which meshes with a driving gear 50 fixed to an extension 50′ of shaft 45′ and rotatably journaled on the bracket plate 48 as shown in FIG. 9. The driving gear 50 also meshes with a gear 51 fixed to the companion roll shaft 46. The gears 49–50–51 are so ratioed that the tumbling roll 45 and companion roll 46 are driven at the same peripheral speed. The gears 49–50–51 may be contained within a suitable gear housing 48″ which is fixed to and supported by the plate bracket 48 as indicated in FIG. 4.

The driving gear shaft extension 50' is driven by means of a slip clutch pulley 52, attached thereto, and which supports a drive belt 53 trained around a drive pulley 53' fixed to the transverse drive shaft 53'' as shown in FIGS. 9, 14 and 14A. Since the rolls defining adjacent marshalling troughs are positioned on opposite sides of the tubular frame members 15–15', and rotate in opposite directions, adjacent drive mechanisms of the type shown in FIG. 9 should be designed for opposite rotation. Reversal of rotation may be obtained by twisting alternate V belts 53 in opposite directions, as shown in FIG. 14. Guide pulleys such as 52' may be employed to aid in directing belts 53 from pulleys 53' to pulleys 52, and to guide belts 53 around obstructions.

The upper end of each tumbling roll shaft 45' is supported by a bracket 54 terminating in a pair of leg portions 54' which are secured as by bolts to the adjacent upper and lower tubular frame members 15–15'. Each bracket 54 terminates in a rounded section 54'' which may be shaped in a hemispherical form as shown in FIGS. 10 and 11, and which provides a cover for the upper end of the tumbling roll 45 so that the objects may slide smoothly thereover and into the drop tube 61 of the adjacent selector unit 60. Each rounded end section 54'' has an inner wall which rotatably supports the upper end of the tumbling roll shaft 45'.

The lower and upper ends of each floating roll shaft 47' are supported by an overhead structure, as shown in FIGS. 3, 4 and 5, which includes a pair of lower vertical struts 55 and a pair of upper vertical struts 55' fixed to the upper and lower side frame members 11–11' of the marshalling framework as previously described. Each pair of vertical struts 55–55' are joined by a transverse bar 56–56', as shown in FIGS. 4 and 5. Each end of the floating roll shaft 47 is pivotally suspended by means of an angular leg 57 whose upper end is pivotally connected and suspended from the adjacent transverse bars 56–56', the lower ends of each angular leg 57 providing journaled support for the adjacent projecting end of the floating roll shaft 47'. Each floating roll 47 rests by gravity weight on its associated spinner roll 46 therebelow. The upper end of each spinner roll shaft 46' is fixedly suspended from the upper cross bar 56' by means of a downward suspended strut 58 fixed thereto, the lower end of the suspension strut 58 providing journaling support for the upper end of the spinner roll shaft 46'.

In operation, the rearwardly inclined and vertically extending paddle plates 24 serve to push the objects from the floor 44 of the drop bin 40 into the troughs defined between each adjacent pair of rotating tumbling and spinner rolls 45–46. As the objects pushed into these troughs by the columnized pusher paddle plates 24, individual objects not in direct contact with a paddle plate 24 are pushed laterally onto the cover platforms 22 of the marshalling chains and roll back towards the bin 40 by gravity, until again picked up by the paddle plates 24. During upwardly inclined travel of the marshalled or columnized objects as advanced by the individualized and columnized paddle plates 24, each object is given a tumbling action which serves to remove undesired material clinging thereto. As the individual objects, each separately advanced by a paddle plate 24, reach the upper end of the tumbling rolls 45, they are separately dropped without obstruction, and one by one in rapid sequence, into the drop tubes 61 of the adjacent selector units 60. In root crop harvesting, soil build-up or wrapping of vines on the rolls 45 and 46 is prevented by the fact that the lonigtudinal movement of the paddles 24 adjacent the rotating rolls 45, 46 and 47 produces a spiral wiping action which serves to remove any accumulations from the rolls.

*The object selector and classifying units*

The marshalled and columnized objects are each separately pushed by an individual paddle plate 24 into a position to influence the operation of an electronic selector and classifier unit 60, which includes a doughnut shaped sensing or oscillator ring 62 whose tubular inner wall 61 is positioned in alignment with and adjacent the object discharging end of each paddle column, as indicated in FIGS. 16 and 20. The sensing ring 62 as shown in FIGS. 2 and 2*a* is formed by a casing 62' of U-shaped cross-section which surrounds and is sealed to the inner drop tube 61. The U-shaped casing 62' is packed with insulating material 62'' such as foam plastic in which a sensing or oscillator coil L1 is protectively imbedded. The U-shaped casing 62 may be formed of metal, while the inner drop tube 61 of the oscillator ring 62 is formed of a plastic material having low dielectric loss. The sensing or oscillator coil L1 presents two end terminals 80 and 80' and a center tap terminal 81 which emerge from the oscillator casing 62 as shown in FIG. 2*a*.

An electronic control housing 63, as shown in FIG. 2, is bolted to the sensing coil casing 62' and has a power cable connection 63' containing a number of conductor wires supplying current to the various electronic devices contained therein. The electronic control housing 63 is in turn connected to the sealed housing 64 of a magnetic clutch and brake mechanism 70. The sealed housing 64 may contain a disc type magnetic clutch and brake mechanism 70 as shown in FIG. 15, and the housing 64 presents its longitudinal axis in a substantially horizontal plane.

The housing 64 which contains the magnetic clutch and brake mechanism 70, is provided with a journal which supports a stub shaft 65' to which a deflector or kicker plate 65 is secured as indicated in FIGS. 2 and 15. Each kicker plate 65 may be normally held at an inclined angle directly under the tubular inner wall 61 of the sensing ring 62, and in this position operates to laterally deflect any object as dropped through this ring. However, the sensing coil L1 as contained within the sensing ring 62 is influenced by the electrical conductivity of the object dropping through the ring, and when an object having relatively insignificant electrical conductivity is dropped through the sensing ring 60, the kicker plate 65 is not activated but remains in the inclined position as shown in FIGS. 2 and 15. However, when an object of substantially higher electrical conductivity drops through the sensing coil L1 contained in the sensing ring 62, the sensing coil L1 promulgates an electrical impulse through a circuit hereinafter described, which in turn applies instantaneous coupling force to the clutch and brake mechanism 70, which then operates to manipulate the stub shaft 65' of the kicker plate 65 to swing the kicker plate 65 into a vertical position as shown in phantom lines in FIGS. 2 and 15, so that the conductive object dropping through the sensing coil containing ring 60 may drop downwardly past the kicker plate without deflection, for discharge onto a transverse discharge conveyor 190 as shown in FIG. 2.

In the case of conductive objects are subject to bruising, such as potatoes, a cushioning box 79 may be provided for cushioning the fall of the conductive objects dropping through the sensing rings 62. The cushioning box 79, constructed as shown in FIG. 8, is positioned directly above the transverse conveyor 190, and may be equipped with a series of inclined rebound baffles 79' made of loosely stretched gum rubber or like cushioning material and positioned directly under the respective sensing rings 62 as indicated in FIG. 2.

Each disc type magnetic clutch and brake assembly 70 as shown in FIG. 15, presents a rotor 71 having a horizontal shaft 66 and drive pulley 66' affixed thereto, and which is continuously driven as by a V belt 67 trained around a drive pulley 67' fixed to a primary transverse shaft 68 which drives all the magnetic rotor shafts 66 in synchronism, as illustrated in FIG. 14. The transverse shaft 68 has a main drive pulley 68' fixed thereto which drives a V belt 69 trained around a drive pulley 69' fixed to a secondary transverse shaft 53'' as shown in FIGS. 14 and 14A. It will be noted that the secondary transverse shaft 53″ is equipped with spaced pulleys 53′, whose driving belts 53 are trained around pulleys 52 which rotate the tumbling and spinner rolls 45 and 46 as shown in FIGS. 9 and 14.

As previously explained, a third transverse shaft 26 supports the drive sprockets 25 of the paddle advancing chains 20. The third transverse shaft 26 is provided with a drive sprocket 28 whose drive chain 29 is trained around the driving sprocket 29′ of a main transverse drive shaft 188, as shown in FIGS. 14 and 14A. The drive belt 53‴ which drives the secondary shaft 53″ is also trained around a pulley of the main transverse drive shaft 188 as shown in FIG. 14A. Thus, a series of integrated drives are provided, all driven from a main transverse drive shaft 188 and so that the rotor shafts 66 of the deflector operating clutch and brake mechanisms 70 are rotated in synchronism with the advance movement of the paddle equipped object advancing chains 20.

The clutch and brake mechanism 70, as diagrammatically illustrated in FIG. 15, may be made relatively small in size and may be sealed within a compact housing 64 as shown in FIG. 2. The control circuits associated with the sensing ring 62, and which operate the clutch and brake mechanism 70, may also be compactly contained within a sealed box housing 63 as shown in FIG. 2. The sensing ring 62, control circuit box 63 and associated clutch and brake housing 64 together occupy only a small cubic volume adjacent the sensing ring 62.

As generally illustrated in FIG. 15, the continuously driven disc type rotor 71 of the clutch and brake mechanism 70 carries a series of direct current electromagnets 71′ whose current lead wires are connected to slip rings 72 mounted on its rotor shaft 66. Flowable magnetic fluid particles are contained within the housing 64 of the clutch and brake mechanism, and in surrounding relation to the intermediate clutch disc 74. Energization of the electromagnets 71′ of the disc type rotor 71 serves to magnetize the magnetic particles positioned in the gap between the disc type rotor 71 and an adjacent clutch disc 74, so that the clutch disc 74 is driven by the continuously driven disc type rotor 71 when its electromagnets 71′ are energized. A series of braking electromagnets 73′ are mounted on a normally stationary braking disc 73 positioned on the opposite side of the clutch disc 74. Energization of the braking magnets 73′ serves to magnetize the magnetic particles in the gap space between the clutch disc 74 and the brake disc 73 to thereby apply an instantaneous braking force to the clutch disc 74 when the clutching electromagnets 71′ of the disc rotor 71 are de-energized.

The clutch disc 74 has a stub shaft 74′ extending therefrom to which a switch cam 75 is fixed as shown in FIG. 15. The switch cam 75 operates a switch element 75′, closing an electrical contact in the control circuit as hereinafter described, with each revolution of the switch cam 75. The disc clutch shaft 74′ also has an eccentric 76 fixed thereto which is surrounded by an eccentric bearing 76′ which is fixed to a lever arm extension 77 and which is in turn connected to a secondary lever arm 78 directly attached to the stub shaft 65′ which supports the kicker plate 65. The kicker or deflector plate 65 is thus activated to make a downswing and an upswing to the inclined position with each rotation of the clutch disc 74.

The disc type clutch and brake mechanism 70 as diagrammatically illustrated in FIG. 15 and above generally described, provides highly effective means for manipulating the kicker plate or object deflector 65, and may be used in association with a transistor circuit as diagrammatically illustrated in FIG. 15. The clutch and brake mechanism 70 is characterized by a very low moment of inertia of the clutch disc 74, extremely rapid and smooth clutching and braking action, and smooth absorption of load shocks without wear or damage of the brake and clutch mechanism. The clutch and brake mechanism 70 is completely sealed within the sealed housing 64 to provide an integral unit which may be readily detached from the marshalling framework and a replacement clutch and brake unit quickly installed in event such replacement is required.

The kicker plate manipulating clutch and brake mechanism 70 is very efficient in regard to consumption of electric and mechanical power. Average consumption of mechanical power supplied to the rotor shaft 66 of the mechanism 70 is about one-sixth horsepower, while the electrical power consumption in the brake and clutch electromagnets is about twenty watts only. While at the beginning of the movement of the kicker plate 65, some slight amount of energy may be lost by clutch disc slippage, substantially no energy is lost during reversal of the movement of the kicker plate 65 to a normally inclined position, since the kinetic energy stored in the kicker plate during its return to normal inclined position, is returned to the rotor shaft 66.

The clutch and brake mechanism 70 is substantially superior in performance, reliability, power economy, speed of operation and efficiency over kicker plates manipulating means which are hydraulically or pneumatically operated, and which do not return any of the kinetic energy of the kicker plate to the power system. The kicker plates 65 should be made sufficiently strong to withstand the impact of objects weighing up to several pounds and falling about three feet.

*Electronic control circuits*

An electronic control circuit is provided to instantaneously energize and de-energize the clutching and braking electromagnets of the clutch and brake mechanism 70 so that the clutch and brake mechanism operates to manipulate the kicker plates 65 in a manner to kick out relatively non-conductive objects as successively dropped through the sensing ring 62, but permits the more conductive objects to drop into the cushioning box 79 without obstruction by the kicker plates 65.

The electronic control circuit is activated by the sensing coil L1 contained in the sensing ring 62 as previously described. The sensing coil L1 carries a high frequency alternating current, of the order of approximately twenty-five megacycles, whose amplitude is instantaneously reduced by the presence of a conducting object passing therethrough. A reduction of the amplitude of the high frequency alternating current in the sensing coil L1, is reflected by an increase in the direct current supply to an oscillator circuit. The direct current pulse in the oscillator circuit is amplified to a voltage sufficient to operate a switching circuit which controls the clutching and braking magnets of the clutch and brake mechanism. It is thus seen that the electronic control circuit fundamentally comprises a sensing oscillator or detector circuit A, an amplifying circuit B, for substantially amplifying the pulse of the detector circuit, and a switching circuit C which controls the operation of the clutch and brake mechanism.

The electronic control circuit may comprise a transistor type circuit as shown in FIG. 15, which may be connected in circuit with the disc type clutch and brake mechanism 70. The disc type clutch and brake mechanism 70 shown in FIG. 15 presents a pair of wire leads 82–82′ extending from its slip rings 72 which supply direct current to the electromagnets 71′ of its rotor disc 71. The disc type clutch and brake mechanism 70 presents a pair of series connected wire leads 83–83′ which supply direct current to the braking electromagnets 73′ of its disc brake member 73. In addition, the disc type clutch and brake mechanism 70 presents a pair of wire leads 84–84′ in association with the switch element 75′ which is manipulated by the switch cam 75 fixed to the shaft of the clutch disc 74. The direct current leads 82–82′ and 83–83′ and the contact leads 84–84′ are connected at the output end of the sensing and control circuit which at the input end is in circuit with the end terminals 80–80′ and tap terminal 81 of the sensing coil L1.

The transistor type of control circuit as illustrated in FIG. 15, is made practical by the development of reliable transistors of relatively low cost, and may be used in preference to conventional vacuum tube circuits. The advantages of transistor type circuits include a single low voltage supply instead of a multi-voltage supply, lower power consumption, a substantial reduction in size and weight, instantaneous response without warm-up time and substantial freedom from the effects of shock.

The transistor control circuit as shown in FIG. 15 comprises an assembly of junction transistors, capacitors, resistors and diodes of relatively miniature size connected in circuit by fine wires. The transistor circuit per se can be operated on only two to three watts of input power, and the clutch and brake mechanism controlled thereby can be operated on only approximately twenty watts of input power. The sensing oscillator circuit A for the transistor control circuit includes a sensing coil L1 whose end terminals 80–80′ are supplied with high frequency alternating current. The sensing oscillator circuit A may be the Hartley type in which the sensing coil terminals 80–80′ are connected to a shunt tuning capacitor C1 to provide a high Q tank circuit, tuned to a high frequency by the capacitor C1. The sensing coil terminals 80–80′ are also connected to a base coupling capacitor C25 and a collector coupling capacitor C26 to provide base and collector stabilization for the oscillator and to block the D.C. voltage from the tuned tank circuit.

Collector voltage for the first oscillator transistor Q1 is supplied by the minus 45 volt supply 110 through the lead wire 111 and filter resistors R38 and R36. Filtering capacitors C27 and C30 are connected from resistors R36 and R38 to ground, to furnish additional filtering and de-coupling for the collector voltage. Resistors R28 and R29 are connected in series to provide a voltage divider across the minus 45 volt supply 110, and are proportioned so that their junction with the base of the first transistor Q1 will establish the proper operating potential at the base of the transistor. In conjunction with an emitter resistor R32, the voltage divider resistors R28 and R29 operate to establish the current level for the operation of the first transistor Q1. A capacitor C28 provides a high frequency by-pass for resistor R32.

Oscillation of the circuit A of FIG. 15 is produced by collector to base coupling through the collector coupling capacitor C26, sensing coil L1 and base coupling capacitor C25. Any random voltage variation on the collector of the transistor Q1 is applied with reversed polarity to the base of transistor Q1, by transformer action of the sensing coil L1, thus creating the condition required for oscillation. The frequency of oscillation, which may be about twenty-five megacycles, will depend on the adjusted value of the tuning capacitor C1, as well as on the inductance of the sensing coil L1.

The direct current flowing in resistors R30 and R31 will increase as the amplitude of the high frequency oscillation decreases. The capacitor C29 is used to by-pass the high frequency to ground, so that direct current alone will pass through resistor R30. Thus a change in the amplitude of the high frequency will cause a change in the direct current voltage drop across the tapped resistor R30.

The two turn center tapped sensing coil L1 is located within the shielding ring structure 62 of FIG. 2*a* as previously described. The electromagnetic field generated by sensing coil L1 is confined by its shielding ring 62 to the cylindrical volume within the outer wall and the end planes of the ring. As previously explained, the objects are marshalled in single file and dropped separately at spaced intervals through the sensing ring 62. When an electrical conductive object such as a potato is dropped through coil L1, it lowers the Q if the tank circuit, comprising the sensing coil L1 and tuning capacitor C1, to thereby reduce the amplitude of oscillation and causing the collector voltage to become less negative and the collector direct current to increase. The increased collector current, which results from passage of the conductive object through the sensing ring 62, causes a potential change or pulse at the junction of resistors R30 and R31. After the conductive object has dropped through the sensing coil L1, the oscillator circuit A returns to normal, resulting in a higher negative collector potential. The adjustable tap on resistor R30 provides a means for adjusting the amplitude of the output pulse transmitted to resistor R35.

The pulse thus created, is applied to the pulse amplifying circuit B through resistor R35 and capacitor C32 connected between the sensing oscillator circuit A and the amplifying circuit B. The junction of resistor R35 and capacitor C32 is connected to a feed back resistor R39. Capacitor C32 is also connected to the base of a second transistor Q2 and a resistor R34. The collector voltage for the second transistor Q2 is supplied from the minus 45 volt supply 110 by lead wire 111 through the filter combination of resistor R38 and capacitor C30. The operating point of transistor Q2 is determined by the combination of resistors R34, R41, R42 in conjunction with third transistor Q3 and resistors R37 and R40. The direct current feed back through resistor R34 stabilizes the direct current operating point of the second transistor Q2. The resistor R33 in the emitter circuit of second transistor Q2 further stabilizes the direct current operating point of this stage of amplification, by direct current degeneration. A capacitor C31 connected in parallel with resistor R33 serves to adjust the amount of alternating current degeneration in the emitter circuit of second transistor Q2. The current pulse applied to the base of second transistor Q2 through capacitor C32 is amplified by the combination of second transistor Q2, capacitor C31 and resistors R33 and R37. The output voltage pulse across resistor R37 is coupled directly to the base of the third transistor Q3. A by-pass capacitor C33 by-passes the unwanted higher frequencies to ground.

The third transistor Q3 and resistors R40, R41, R42 and capacitor C34 provide the second stage of amplification. The pulse at the base of the third transistor Q3 causes an amplified current to flow through the resistor R40 which is located in the collector circuit of the third transistor Q3. Resistors R41 and R42 stabilize the direct current operation of transistor Q3 by direct current degeneration while capacitor C34 adjusts the alternating current degeneration. The collector voltage is obtained from the minus 45 volt supply 110 through lead wire 111. The signal pulse appearing across resistor R40 is directly coupled to the base of a fourth transistor Q4. A by-pass capacitor C35 by-passes the unwanted higher frequencies to ground.

The signal pulse is further amplified by the combination of the fourth transistor Q4, resistors R43 and R44 and capacitor C36. Resistor R43 stabilizes the direct current operation of transistor Q4 by direct current degeneration, and condenser C36 adjusts the alternating current degeneration. The pulse at the base of the fourth transistor Q4 causes an amplified current to flow through resistor R44. Resistor R39 and capacitor C37 combine to feed-back a portion of the output pulse to the base of the second transistor Q2 through capacitor C32. The feed-back reduces the amplification and stabilizes the operation of the amplifier circuit B and makes it substantially independent of changes in transistor gain.

The amplified pulse that appears at the junction of capacitor C38 and resistor R54 is a negative pulse which passes through the diode D3 to the base of a fifth transistor Q5. The diode D3 serves to prevent any positive pulse from reaching the base of transistor Q5 by diverting it to ground through resistor R54. The fifth and sixth transistors Q5 and Q6 and the resistors R45, R46, R47, R48, R49, R50, R51 and R57 are connected in the switching circuit C known as a flip-flop. This circuit is employed to control the power transistors Q7 and Q8, which in turn switch energizing current to either the clutch coils 71' or the brake coils 73'. When the fifth transistor Q5 is in the "Off" or non-conducting state, and the sixth transistor Q6 is "On" or conducting, then the junction of resistor R57, the emitter of transistor Q6, and the base of the power transistor Q8 are at a high negative potential, whereas the junction of resistor R46, the emitter of the transistor Q5, and the base of the power transistor Q7, are at a low negative potential. When the base of transistor Q8 is at a high negative potential, the transistor Q8 is in the full "On" position, and current flows from ground through resistor R53, transistor Q8, lead wire 83', and the brake coils 73', and returns to the minus side of the storage battery 110 through lead wire 83 and the common negative lead wire 112. At the same time, the base of power transistor Q7 is at a low negative potential, and the voltage drop across resistor R53 raises the potential of the emitter of power transistor Q7 to a higher negative value than its base, so that transistor Q7 is non-conducting and will not send current through the clutch coils 71'.

When a negative pulse appears at the capacitor C38, it passes through diode D3 to the junction of resistors R45, R47, and the base of transistor Q5, and then switches transistor Q5 to "On" position. The resulting current which flows from ground through resistor R46, transistor Q5 and resistor R48 will cause a negative voltage drop at the junction of resistors R48 and R50, and the collector of transistor Q5, which voltage drop is applied through resistor R50 to thereby switch the transistor Q6 to the "Off" position. When the transistor Q6 is in the "Off" position, there is little current flow through the emitter resistor R57 and it is at a low negative voltage, and since the base of power transistor Q8 is connected by lead wire 114 to the emitter of transistor Q6, power transistor Q8 will also be switched to the "Off" position, and will stop current flow through the brake coils 73' and the brake of the magnetic clutch and brake mechanism 70 is released. A high negative potential is simultaneously produced at the junction of resistor R46 and at the emitter of transistor Q5 when transistor Q5 is switched on. This junction is connected by lead wire 113 to the base of power transistor Q7, so that thereby the power transistor Q7 is switched on and current flows through resistor R53, transistor Q7, lead wire 82', clutch coils 71', lead wire 82 and the common negative lead wire 112.

When the clutch coils 71' are energized, the clutch shaft 74' of the clutch and brake mechanism 70 is rotated until the switch cam 75 closes the switch element 75'. Capacitor C40, which is normally charged through resistor R58 to the full voltage of the battery 110, will now partially discharge through resistor R56, lead wires 84–84', and switch element 75', causing a rise in negative potential. This rise in negative potential at the junction of resistors R52 and R56 and capacitors C39 and C40, is conducted through diode D4 to the junction of resistors R50 and R51 and the base of transistor Q6. This negative pulse switches transistor Q6 to the "On" state, and this action in turn switches transistor Q5 to the "Off" state, and transistors Q7 and Q8 exchange conducting states, as explained above, so that the clutch coils 71' are de-energized and the brake coils 73' are energized. The positive pulse which appears when the switch element 75' opens, is blocked by diode D4 and conducted to ground through resistor R55, and will therefore have no effect on the circuit operation.

The diodes D1 and D2 are respectively connected across clutch coils 71' and brake coils 73', and protect transistors Q7 and Q8 from reverse voltage surges caused by the collapse of the inductive fields in the clutch coils 71' and the brake coils 73'.

A transistor circuit as illustrated in FIG. 15 and above described, is provided for each clutch and brake mechanism 70 and for each object selector and eliminator unit 60 of the selecting apparatus, except that a common power source 110 may be provided for all of the individual transistor circuits. While a storage battery source of power as indicated in FIG. 15 can be used, it is more convenient to produce the circuit power by means of a dynamotor or other voltage converter capable of delivering approximately forty-five volts. When powering the transistor circuits by means of a dynamotor, the dynamotor would be supplied with six volts from a conventional storage battery and generator arrangement. Each transistor circuit and associated clutch and brake mechanism 70 and sensing coil L1 requires approximately twenty-five to thirty watts of electrical power.

Each of the transistor circuits may be fully contained and sealed within its control housing 63, and since the transistor circuit is adapted for compact assembly, its sealed housing 63 may be made relatively small in size. By the use of the disc type clutch and brake mechanism 70, which can also be compacted in a small space, its housing 64 can also be made relatively small and compact in size. Thus by the use of compactly sized transistor circuits and compactly sized disc type clutch and brake mechanisms 70, the instrument containing electronic control housings 63 and the clutch and brake mechanism housings 64 can be made very compact and light in weight.

The transistor type control circuit above described, coupled to a sensing coil or other sensing device and a disc type magnetic clutch and brake mechanism, is very sensitive and responsive to the electrical conductivity of various objects, and will respond to current pulses whose duration is a small fraction of a second, being substantially in excess of the speed of operation required to detect a falling conducting object. Thus, the element or device to be manipulated, such as the kicker plates 65, can be manipulated in a fraction of a second.

Adjustment of the tapped resistor R30 of FIG. 15, provides a mean for controlling the sensitivity. Thus, the sensing coil and its associated circuits can be readily set to any desired sensitivity, to thereby operate the object deflector or kicker plate only when an object such as a potato of a desired minimum size passes through the coil. All objects smaller than this minimum will be discarded.

It will also be appreciated that while the sensing coil L1 and the electronic circuits above described will respond to effect manipulation of the object deflector or kicker plate 65 only when a conducting object passes through coil L1, various other deflecting means and arrangements may be employed in place of the kicker plate 65 normally held in an inclined position when no signal pulse is received. Other deflecting elements or media may be used, or the deflecting means may be employed to deflect the conducting object, as for example, by adjusting the kicker plate 65 so that it is normally in a stationary vertical position and moves to an inclined position when a signal pulse is received.

As shown in FIGS. 14, 14A and 15, the transverse drive shaft 188, which drives the clutch and brake rotors 71 in synchronism with the paddle chain advancing sprockets 25 as previously described, may also drive the shafts 184' of the primary conveyors 180 through sprockets 189'–188' and drive chain 189. Also, as shown in FIGS. 2 and 14A, the transverse shaft 188 may be driven by gearing 187 from a longitudinal shaft which drives the shaft 191' of the discharge belt 190 through drive chain 193, sprocket 194, drive chain 196, transfer shaft 197 and drive chain 198.

*Alternative object advancing and marshalling assemblies*

Within the purview of this invention, various modifications can be made to the object advancing and marshalling structure illustrated in FIGS. 3, 4 and 5 and previously described. For example, it is possible to advance a greater number of columnar rows of objects to be classified through the advancing and marshalling assembly by providing each advancing chain with two columnized series of advancing paddles extending from opposite sides of each advancing chain.

There is illustrated in FIGS. 16–24 various alternative forms of potato advancing and marshalling assemblies whose drives are provided at the rear end thereof. In the modification shown in FIGS. 16–19 a series of four paddle equipped advancing and marshalling chains 20*a* are provided, each of which may be formed by a hingedly connected series of stamped metal chain links 21 similar to the links 21 shown in FIG. 6 and previously described.

Each of the paddle equipped advancing chains 20*a* is supported by a lower idler sprocket 34 as shown in FIGS. 17 and 18; all sprockets 34 being mounted to freely rotate on a common transverse shaft 34' whose ends are attached to support plates 34'' which may be fixed to the lower ends of the adjacent upper and lower side frame members 11–11' of the assembly framework previously described. The upper ends of each advancing and marshalling chain 20*a* are supported by a driving sprocket 35; all of the driving sprockets 35 being fixed by means of a slip clutch 25', as shown in FIG. 7, to a common sprocket shaft 35' supported by suitable bearing plates 35'' fixed to the upper ends of the adjacent side frame members 11–11' of the assembly framework as indicated in FIGS. 16 and 20. The driving shaft 35' for the paddle equipped advancing and marshalling chains 20*a* is provided with a driving sprocket 36 fixed to one end thereof as shown in FIGS. 16 and 26, which supports a drive chain 36' trained around a driving sprocket which may be fixed to the main transverse shaft 188 of the marshalling assembly as shown in FIG. 14A.

Each of the advancing chains 20*a* is equipped with a series longitudinally spaced potato and stone advancing paddles 23*a* extending from each side thereof as shown in FIGS. 16, 18 and 19. Each paddle 23*a* presents a laterally extending arm section 23*a'* which may be welded to or otherwise secured to an adjacent chain link 21 of the advancing chain 20*a* and terminates in an upwardly extending paddle section 23*a''* which may be formed integral with the arm section 23*a'*, and which carries a relatively soft facing section 24 made from rubber impregnated fabric or the like. Each facing section 24 is so mounted as to incline rearwardly with respect to a line which is perpendicular to the longitudinal axis of the paddle supporting chain 20*a* as shown in FIG. 18. It is thus evident that each advancing chain 20*a*, equipped with a series of spaced advancing paddles 23*a* extending laterally from each side thereof, is operative to advance two columnar rows of potatoes and stones in an upwardly inclined direction. Each columnar row of potatoes may be supported during tumbling and spinning advance by a tumbling roll 125 or 125*a*, and/or a spinner roll 126 or 126*a* as hereafter more fully described.

To support the upper run of the respective advancing chains 20*a*, a longitudinally extending T-shaped supporting bar 17 is provided, whose flat section 17' is positioned directly under the upper run of its associated advancing chain 20*a* so as to provide a supporting slide surface therefor. The lower end of the support bar 17 is secured to a transverse angle shaped supporting member 17'' as shown in FIG. 18 which extends through the lower loop portion of all of the advancing chains 20*a*, and whose ends are suitably secured to the side frame members 11–11' of the framework assembly. The upper end of each T-shaped bar 17 is supported by pedestal bracket 18 as shown in FIG. 18 which seats upon a transverse angle member 18' which extends through the upper loop portion of all of the advancing chains 20*a* and whose ends are suitably secured to the upper ends of the adjacent side frame member 11 of the framework assembly.

It is desirable to maintain the upper run of each advancing chain 20*a* in smooth sliding contact with the face section 17' of the T-bar 17 therebelow. As shown in FIGS. 17 and 19, each chain link 21 may be provided with a U-shaped guide clip 25*a* on each side thereof and which respectively telescope over the free side edges of the flat section 17' of the T-bar 17 and maintain sliding contact therewith. These paired guide clips 25*a* prevent lateral slipping of the upper run of the chain 20*a*, or tipping of the chain 20*a*, due to stresses imposed thereon by unbalanced loading of the advancing paddle plates 24.

The upper face of the upper run of each of the advancing chains 20*a* is covered by the flat section 19' of an upper T-shaped member 19 whose lower end may be secured to the back wall plate 42*a* of the adjacent drop bin 40*a* as shown in FIG. 17. The upwardly extending leg 19'' of the upper T-shaped member 19 provides a dividing partition which laterally channels the potatoes and stones into advancing engagement with the paired paddles 23*a* on each side of the advancing chain 20*a*. It will be noted that the lower end of the upwardly extending leg 19'' terminates short of the drop bin 40*a* as indicated in FIG. 18. The upper end of each of the T-shaped members 19 is fixed to a transverse bearing plate 37 at the upper end of the marshalling framework as shown in FIG. 18, with the bearing plate 37 fixed to the upper and lower headframe members 12–12' thereof.

The floor of the receiving bin 40*a* is positioned at the level of the upper runs of the advancing chains 20*a* as shown in FIG. 25. The drop bin 40*a* presents a pair of side wall plates 41*a* joined to an inclined back wall plate 42*a* as shown in FIG. 17. Each drop bin 40*a* is provided with a floor which is composed of a series of floor sections as shown in FIG. 17, each section comprising an arched floor portion 44*a* extending between the line of travel of an adjacent pair of paddle plates 24, and presenting a pair of laterally extending flat floor portions 44*b* which terminate in a pair of downwardly extending flange portions 44*c*. The downwardly extending flange portions 44*c* are secured as by means of securing bolts 44*d* and associated spacing collars 44*e* to the vertical leg of the adjacent T-bar 17, as shown in FIG. 17.

It will be noted that the flat section 19' of each upper T-shaped member 19 also provides a stationary floor portion within the drop bin 40*a* and directly over the lower end of the lower T-bar 17, and these floor portions in combination with the arched portions 44*a* and horizontally extending floor portions 44*b* above described provide a complete floor for the drop bin 40*a*. The back wall plate 42*a* of the drop bin 40*a* is provided with suitable paddle entry cut-outs 42*b* through which the paddle sections 24 may advance as shown in FIG. 17.

In the modifications shown in FIGS. 16 to 23, it will be noted that four advancing chains 20*a* are provided, each equipped with a pair of horizontally extending aligned rows of advancing paddles 23*a* as shown in FIG. 19, or paired rows of laterally extending and downwardly bent paddles 23*b* as shown in FIGS. 21, 22 and 23. The eight rows of advancing paddles 23*a* or 23*b*, associated with the object advancing and marshalling assemblies shown in FIGS. 16 and 20, serve to marshall objects into eight columns for discharge in single file and spaced order into the drop tubes 61 of the sensing rings 62.

Object supporting and tumbling means are associated with each row of advancing paddles 23*a* which extend from the discharge edge of the floor of the drop bin 40 or 40*a* to the upper end of the marshalling frame, and which serve to tumble the objects during their upward inclined advance by the adjacent row of advancing paddles 23*a*. In the form of the invention illustrated in FIGS. 16, 17, 18 and 19, the supporting and tumbling means comprises a rubber covered tumbling roll 125 which is positioned directly under the spaced arm sections 23*a'* of each row of advancing paddles 23*a*. When objects such as a mixture of potatoes and stones are to be processed, each tumbling roll 125 may be approximately two and one-half to three and one-half inches in diameter, with a preferred diameter of approximately three inches, with the lower end thereof extending slightly under the adjacent flat floor portion **44*b*** of the drop bin floor as indicated in FIG. 18.

Each tumbling roll 125 is fixed to a longitudinally extending supporting shaft 125' whose lower end is journaled in a bearing plate 38 extending transversely of the assembly framework, with the ends thereof secured to the lower ends of the upper and lower side frame members 11–11' thereof. The upper end of each tumbling roll shaft 125' is journaled in the vertical leg of an angular supporting bracket 127 whose horizontal leg may be secured to the transverse angle member 18', which also supports the upper end of the T-shaped bar 17 extending under the upper run of the advancing chain **20*a*, as previously described and as shown in FIG. 18. The angular shaft supporting bracket 127 presents a hemispherical or dome-shaped section 127' fixed thereto which provides an end cover for the tubular roll 125, and terminates directly adjacent the upper end of the inner drop tube 61 of the sensing ring 62**, as shown in FIG. 16.

In the modifications shown in FIGS. 16, 17, 18 and 19, a spinner roll 126 is positioned adjacent to and in operative association with each tumbling roll 125. The spinner roll 126 in this modification is preferably covered with rubber or like gripping material, is positioned at a slightly higher elevation than its associated tumbling roll 125. When a mixture of potatoes and stones are to be processed, the spinner roll may have a diameter in the order of three to four inches, with a preferred diameter of approximately three and one-half inches, and each spinner roll 126 may be spaced from its associated tumbling roll 125 for a distance of approximately one-half to one inch, and are both rotated in the same direction, with the upper peripheries thereof rotating in a direction away from the adjacent paddle supporting advancing chain **20*a*** as indicated in FIG. 18.

Each spinning roll 126 is fixed to a longitudinally extending supporting shaft 126' whose lower end is rotatably journaled in the lower bearing plate 38. The terminal end of the adjacent arched floor portion **44*a* of the drop bin 40*a*, slightly overlaps the lower end of the adjacent spinning roll 126, as indicated in FIG. 18. The upper end of each spinning roll 126 terminates in a rounded end section 128, through which the shaft 126' extends, and is rotatably supported by a suitable bearing mounted on the upper transverse bearing plate 37, to which the upper end of the upper T-shaped guide member 19** is also fixed as previously described.

Means are provided for positively rotating each of the spinning rolls 126 and adjacent cooperating tumbling rolls 125, so that they are all rotated in unison in the direction indicated in FIG. 18, and at substantially the same peripheral speed. This driving means may comprise a sprocket 129 which is fixed to the upper terminal end of each spinner roll shaft 126' as shown in FIGS. 16 and 18. One run of a continuous drive chain 129' is looped around all of the eight driving sprockets 129 in the manner indicated in FIG. 18 to thereby drive the spinner roll shafts 126' in the directions indicated. The continuous sprocket chain 129' is looped around an end driving sprocket 130 whose stub shaft 130' is rotatably journaled in an end extension of the upper bearing plate 37 as shown in FIG. 16. The other end of the stub shaft 130' is connected to a bevel gear assembly 131 as shown in FIG. 16, which is driven by the upper sprocket shaft 35' to which the upper drive sprockets 35 which support the advancing chains **20*a* are secured, as previously described. The continuous sprocket chain 129' and its associated sprockets are enclosed in a shield 37'**, shown partly cut away in FIG. 16.

The lower end of each spinner roll shaft 126' has a driving gear 132 fixed thereto, as shown in FIG. 18, which meshes with an idler gear 133 whose stub shaft 133' is supported by the lower transverse bearing plate 38. The idler gear 133 meshes with a driven gear 134 fixed to the lower end of the adjacent tumbling roll shaft 125'. Thus the driving chain 129', as driven by the transverse sprocket supporting shaft 35' of the marshalling assembly, operates to rotate all of the spinner rolls 126 and associated tumbling rolls 125 in unison.

The mixture of objects deposited on the floor of the drop bin **40*a*, are engaged by the respective advancing paddles 23*a* and pushed in an upwardly inclined direction from the discharge edge of the bin floor, and onto the lower ends of the tumbling rolls 125. The vertical leg 19'' of the stationary upper T-shaped member 19 serves to divide the flow of upwardly advancing objects and push them laterally into supporting contact with the upper periphery of the adjacent rotating tumbling rolls 125, whose upper peripheries rotate in a direction away from the adjacent partition forming vertical leg 19''** of the stationary T-shaped divider.

The rotative movement of each tumbling roll 125, rolls the objects into contact with the upper surface of the adjacent spinner roll 126, which further aids in spinning the objects during their upwardly inclined advance. Where more than one object is engaged by the facing section 24 of each advancing paddle **23*a*, the rotating action of the tumbling roll 125 and the adjacent spinning roll 126 serves to effect discard of excess objects, so that only one object is engaged by the facing section 24 of each advancing paddle 23*a* as it arrives at the upper end of the drop tube 61. Thus each row of upwardly advancing paddles 23*a*, in cooperative association with its tumbling roll 125 and spinning roll 126, serve to marshall and align the objects in spaced successive order and in a single column before they are discharged into the drop tube 61 of the sensing ring 62. In the case of a potato and stone mixture, the tumbling and spinning agitation of the potatoes and stones during their upwardly inclined advance by the advancing paddles 23*a*, also serves to rub off clinging soil from the potatoes and stones and to pulverize hard clods of soil so that this debris may drop to ground between the paired tumbling and spinner rolls 125–126**.

A baffle plate 135, as shown in FIG. 18, extending substantially the full length of each spinning roll 126, and whose lower edge is substantially in contact therewith may be provided to prevent any objects from hurdling the spinner rolls 126. Each inclined baffle plate 135 may be supported by a pair of suspension struts 135' fixed to the transverse bars 56–56' of the framework assembly as indicated in FIG. 18.

It will be noted that the arm sections **23*a*' of the advancing paddles 23*a* in the modification shown in FIGS. 18 and 19, extend substantially in a horizontal plane, and that the tumbling rolls 125 are positioned directly under each set of horizontally extending arm sections 23*a*'. However, it will be appreciated that advancing paddles 23*b* which feature downwardly bent arm sections 23*b*' may be employed as shown in FIG. 22, in which case the adjacent tumbling rolls 125 and spinner rolls 126 would be arranged as shown in this figure. Where downwardly bent arm sections 23*b*' are employed, it is desirable to provide a floor member 136 positioned between the advancing chain 20*a* and the adjacent tumbling roll 125. The floor member 136 extends from the discharge end of the floor of the drop bin 40*a* to a point over the drop tube 61 of the sensing ring 62. As shown in FIG. 22, this supporting floor member 136 may take the form of an inverted V-member having an inclined floor forming leg 136' positioned directly under each row of inclined paddle arms 23*b*'. Each V-shaped floor forming member 136 has a vertical attaching leg 136'' which may be secured by spaced bolts 137 and associated spacing collars 137' to the depending vertical leg of the adjacent T-shaped support bar 17**.

In the arrangement shown in FIG. 22, each tumbling roll 125 and its supporting shaft 125', and its associated spinner roll 126 and its supporting shaft 126', are adjusted in position and elevation to provide a potato advancing trough therebetween, and to efficiently cooperate with its row of advancing paddles **23*b*, but would otherwise be mounted and driven in the same manner as the modification shown in FIGS. 18 and 19. In the modification shown in FIG. 22, the objects driven from the drop bin 40*a* by the inclined advancing paddles 23*b*, tumble laterally down the inclined legs 136′ of the V-shaped floor member 136 and then tumble and spin in the space between the adjacent tumbling roll 125 and associated spinner roll 126. If more than one object is engaged by the facing section 24 of each advancing paddle 23*b*, the excess objects would be driven laterally over the downwardly inclined leg 136′ of the V-shaped floor member 136, or roll downwardly over the spinner roll 126, toward the bin 40*a* until again re-engaged by an advancing paddle, and so that each inclined advancing paddle 23*b* discharges only one object in successive spaced order into the drop tube 61 of the sensing ring 62. A cooperating floating roll 47, may be associated with each of the spinner rolls 126 shown in FIG. 22, or alternatively, the baffle plate 135 suspended from the transverse bars 56–56′ previously described may be associated with each spinner roll 126** as shown in FIG. 22.

In the modification shown in FIG. 23, the respective arm sections **23*b*′ of the advancing paddles 23*b* are also arranged in a downwardly inclined position, with each row of inclined arm sections 23*b*′ advancing over the inclined leg 136′ of the inverted V-shaped floor member 136 constructed and supported as shown in FIG. 22 and previously described. In the modification shown in FIG. 23, only a tumbling roll 125*a* is provided for each row of advancing paddles 23*b*, and when processing a mixture of potatoes and stones, the tumbling roll 125*a* of this modification may have a diameter of three to five inches, is centered directly under the facing sections 24 of each row of advancing paddles 23*b*′. Each of the tumbling rolls 125*a* of the modification shown in FIG. 23, rotate in the direction of the arrow indicated thereon, and which rotation assists in the elimination of excess objects, so that only one object is advanced by the facing section 24 of each advancing paddle 23*b* as it arrives at the upper end of the drop tube 61. In this modification, only the shaft 126′, without a spinner roll mounted thereon, would be provided as the driving medium for each tumbling roll 125*a*. Each tumbling roll 125*a* would be otherwise constructed and mounted in the same manner as the tumbling roll 125 previously described, but is driven in the opposite direction with the upper periphery thereof moving toward the V-shaped floor member 136. An inclined baffle plate 135*a*, positioned as shown in FIG. 23 and suspended by suspension struts 135′ from the transverse bars 56–56′ of the framework assembly, is provided to maintain the advancing colume of objects in supported position on the adjacent tumbling roll 125*a* and in tumbling contact with the adjacent baffle plate 135*a***.

To reduce the number of rolls required for the object advancing and marshalling assembly, and to eliminate gears 132–134 of FIG. 18 and thereby correspondingly reduce the cost thereof, the assembly shown in FIGS. 20 and 21 may be employed, and is fully operative to perform its intended functions when the tumbling rolls are eliminated and only a single spinner roll is used in association with each row of advancing paddles **23*b*. In this modification, four paddle supporting chains 20*a* are employed, each equipped with a paired series of spaced and longitudinally aligned advancing paddles 23*b* whose downwardly inclined arm sections 23*b*′ are secured to and extend laterally from opposite sides of each advancing chain 20*a*, as shown in FIG. 21. The paddle advancing chains 20*a*, their sprocket drives, and the assembly framework is otherwise generally similar to that shown in FIGS. 16–18, as is evident by referring to FIG. 20. The modification shown in FIGS. 20 and 21 is also equipped with a drop bin 40*a*, and eight potato selector and stone eliminator units 60**, as previously described.

In the modification shown in FIGS. 20 and 21, each T-shaped bar 17 supports a pair of inverted V-shaped floor forming members **136*a*, each presenting an inclined floor forming leg 136*a*′ which is somewhat wider than the inclined floor forming leg 136′ previously described, and has a width sufficient to extend under substantially the entire length of the downwardly inclined paddle arm sections 23*b*′ as shown in FIG. 21. These inclined floor forming legs 136*a*′ in conjunction with the adjacent spinner rolls 126*a* provide support for the objects as advanced by the row of advancing paddles 23*b* positioned directly thereabove, and are sufficiently inclined to cause a tumbling movement of the objects as supported thereon and as advanced in an upwardly inclined direction superimposed by the row of advancing paddles 23*b***.

A single spinner roll **126*a* is positioned adjacent the outer edge of each row of advancing paddles 23*b*, and spaced sufficiently therefrom to leave a gap between its periphery and the adjacent side edge of the inclined floor forming leg 136*a*′ of the adjacent inverted V-shaped member 136*a*. Each spinner roll 126*a*′ is covered with rubber or like gripping material, and when a mixture of potatoes and stones is to be processed, may be made approximately three to five inches in diameter, with a preferred diameter of approximately four inches. The supporting shaft 126′ of each spinning roll 126*a* is positioned in approximately the same inclined plane as the side edge of the adjacent inclined floor forming leg 136*a*′, and is rotated in the direction indicated in FIG. 2. The supporting shaft 126′ of each spinner roll 126*a* is supported by a suitable journal attached to the upper transverse bearing plate 37 as shown in FIG. 16, with the upper end of the shaft 126′ provided with a driving sprocket 129 driven by a drive chain 129′ as previously described. The lower end of the supporting shaft 126′ of each spinner roll 126*a* is journaled shaft 126′ of each spinner roll 126*a* is journaled in the lower bearing plate 38**.

Since no tumbling rolls are used in this modification, the lower end of the spinner roll shaft 126′ does not require a driving gear to provide a drive for an adjacent tumbling roll. It will also be noted that the modification shown in FIG. 21, is substantially similar to the modification shown in FIG. 22 when the tumbling rolls 125 are eliminated from the modification shown in FIG. 22.

Each spinner roll **126*a* may be provided with a baffle plate 135, each of which is supported by a pair of suspension struts 135′ extending from the overhead transverse bars 56–56′ of the framework assembly. The lower edge of each baffle plate 135 is suspended in close proximity to the periphery of its spinner roll 126*a*, and prevents objects being tumbled between the spinner roll 126*a* and the adjacent inclined floor forming leg 136*a*′, from hurdling the spinner roll 126*a***.

The objects to be classified are pulled from the floor of the drop bin **40*a* by the inclined advancing paddles 23*b* and pushed on to the lower end of the inclined floor forming leg 136*a*′. As the objects are advanced by the facing sections 24 of each row of advancing paddles 23*b*, excess objects will tumble laterally beyond the reach of the facing sections 24 of the advancing paddles 23*b*, and rolled downwardly towards the drop bin 40*a*, to again be picked up by the advancing paddles, and so that each paddle 23*b* advances only a single object to dropping position into the drop tube 61 of the sensing ring 62**.

The modifications illustrated in FIGS. 16, 17, 18 and 19, the modifications illustrated in FIGS. 22 and 23, and the modifications illustrated in FIGS. 20 and 21, are all highly effective in marshalling objects into single file rows, with each object advanced in columnized spaced relation for discharge into the inner tubes 61 of the sensing rings 62, in a manner so that the selector and eliminator units 60 will effectively operate to separate the electrical conductive objects from the non-conductive objects.

*Alternative selector and eliminator units*

FIGS. 24–36 illustrate an alternative form of selector and eliminator device which may be used in substitution for the selector and eliminator unit illustrated in FIGS. 2, 2*a* and 15 heretofore described. As illustrated more particularly in FIG. 26, the alternative selector and eliminator device is positioned adjacent the upper run of each column of object advancing paddles and adjacent the upper end of the associated marshalling rolls 125 and 126, and embraces mechanism operative to deflect the conductive and non-conductive objects in different directions as they arrive in columnized order at the upper end of the marshalling rolls, and thus effectively classify the objects at this point. The alternative selector and eliminator devices may be positioned at the upper end of any one of the advancing and marshalling assemblies shown in FIGS. 16 through 23 and previously described, but for the purpose of illustration, is shown in FIG. 26 as associated with the advancing and marshalling assembly of the type illustrated in FIGS. 18 and 19.

The advancing and marshalling assembly as shown in FIGS. 24, 25 and 26 may comprise a series of four continuous advancing chains 20*a* composed of links 21 as heretofore described. The lower end of each advancing chain 20*a* is trained over sprocket 34 rotatably mounted on a stationary idler shaft 34′ as shown in FIG. 18. The upper end of each continuous advancing chain 20*a* is trained over a sprocket 35*a* as shown in FIG. 26, and all four upper sprockets 35*a* are fixed to a common driven shaft 35′ which has a drive sprocket 36 fixed to one end thereof and driven by chain 36′ from the main transverse shaft 188 of the marshalling assembly. Each sprocket 35*a* is connected to shaft 35′ by a grooved or toothed slip clutch 35*b* which is equipped with laterally extending lugs 35*c* as shown in FIG. 26, and which are designed to slip into appropriate sockets formed in the side wall of the adjacent sprocket 35*a* to thereby drive the sprocket, but which will slip out of the sockets when an undue load strain is placed on the sprocket 35*a* by the marshalling chain 20*a*.

The upper run of each advancing chain 20*a* is supported by the T-shaped bar 17 as shown in FIG. 26, whose upper end is supported by block 18 fixed to the cross bar 18′ of the marshalling assembly, and whose lower end is supported by a cross plate 38 associated with the framework of the marshalling assembly, as shown in FIGS. 18 and 26. An inverted T-shaped deflector 19 having lateral legs 19′ and a vertical leg 19″ is suspended over the upper run of each advancing chain 20. The upper end of the T-shaped deflector 19 is secured to the transverse support plate 37 of the marshalling assembly as shown in FIGS. 30 and 35, and its lower end is secured to the rear wall 42*a* of the receiving bin 40*a*, as shown in FIG. 17. The vertical leg 19″ of the T-shaped deflector 19 terminates short of the advanced edge of the bin floor 44*a* as shown in FIG. 26, and the remaining lateral legs 19″ thereof are contoured to form a part of the floor of the bin 40*a* as heretofore explained.

The sensing unit 100 of each alternative selector device is positioned at the upper end of each tumbling roll 125. Since each sensing device is influenced by any electrical conductive object passing thereover, the columnized advancing paddles extending laterally from the opposite sides of each advancing chain 20*a*, should be made of non-conductive material such as nylon or like plastic. As shown in FIG. 28, each advancing paddle 23*c* is composed of a non-conductive laterally extending arm 23*c′* suitably fixed to the adjacent link 21 of the chain 20*a* as by bolts or rivets, and its advancing face 23*c″* supports a soft and non-conductive advancing plate 24 made from rubber or the like. The laterally extending advancing paddles 23*c* travel through holes

42*b* in the rear wall 42*a* of the collecting bin 40*a*, as shown in FIG. 17, and push out the objects forwardly from the bottom wall 44*a* and 44*b* of the bin, a fragment of which is shown in FIG. 26. In the event any advancing paddle 23*c* of the columnized paddles associated with the marshalling chain 20*a*, is blocked in its advance by an object or other obstruction, the lugs 35*c* of the slip clutch 35*b* will slip from the sockets of the sprockets 35*a*, but will remesh with the sprocket when the paddle jamming has been cleared. The sprocket engaging lugs 35*c* of the slip clutch 35*b* are so spaced as to drive the marshalling chain 20*a* and associated paddles 23*c* in advancing synchronism with the rotative movement of the deflecting paddles 140′ of the adjacent selector and eliminator unit as hereinafter described.

As shown in FIGS. 24 and 26, a set of marshalling rolls comprising a tumbling roll 125 and a spinner roll 126 positioned at slightly higher elevation, are associated with each column of advancing paddles 23*c*. The tumbling roll 125 and the associating spinner roll 126 are covered with resilient and non-conductive material such as rubber. The lower end of the shaft 126′ which supports the spinner roll 126 and the lower end of the shaft 125′ which supports the tumbling roll 125, are suitably journaled in the lower cross plate 38 of the marshalling framework as shown in FIG. 26. The tumbling roll shaft 125′ and the spinner roll shaft 126′ are driven in unison by a gear 132 fixed to the tumbling roll shaft 125′ and a gear 134 fixed to the spinner roll shaft 126′, joined together in driving assembly by an idler gear 133. Each spinner roll shaft 126′ has an end extension 126″ which extends through and is supported by a journal associated with a secondary cross plate 39 forming a part of the marshalling framework. A driving sprocket 39′ is secured to each spinner roll shaft extension 126″; the sprockets 39′ being driven by a drive chain 39″ which may be driven by any suitable connection to the main drive of the marshalling assembly.

The upper end of each tumbling roll shaft 125′ is supported by a suitable journal 125″ fixed to one leg of a U-shaped bracket 138 supported by the angular cross bar 18′ of the marshalling framework, as shown more particularly in FIGS. 30 and 31. Each U-shaped bracket 138 also supports the sensing unit 100 which contains the sending circuit as shown in FIGS. 33 and 34 as hereafter described. The upper end of each spinner roll shaft 126′ is supported by a suitable journal fixed to a support bracket 139 which seats on and is secured to the angular cross bar 18′ of the marshalling framework as shown in FIG. 29. The objects removed from the collecting bin 40*a* by the non-conductive advancing paddles 23*c* are advanced thereby in columnized order along the adjacent tumbling roll 125 and spinner roll 126,, so that each columnized advancing paddle 23*c* will forward advance only a single object over the upper arcuate surface of the sensing unit 100 positioned at the upper end of each tumbling roll 125.

The sensing circuit of each sensing unit 100 is contained within a box-like structure as shown in FIGS. 31 and 32 having a lower box part 101 made of metal or like conductive material, and having a cover part 101′ made of non-conductive material and which is arcuately shaped in contour conformity with the upper arcuate face of the tumbling roll 125 with which it is associated. It will thus be appreciated that the individually spaced and columnized objects as shown in FIG. 32, are separately advanced by the successive advancing paddles 23*c* directly over and in contact with the non-conductive arcuate cover part 101′ of the box which contains the sensing circuit, and which functions to control the operation of a magnetic clutch and brake device 85 as shown in FIGS. 26 and 27. As shown in FIGS. 26, 29 and 31, the upper end of the arcuate covered part 101′ merges into a contoured drop nose 102 preferably made of non-conductive material, and which may be molded to present a quarter-sphere surface over which objects as advanced by the paddles 23*c* may drop. The contoured drop nose 102 is fixed to the adjacent leg of the channel shaped bracket 138 which supports the sensing unit 100.

Each magnetic clutch and brake device 85 operates to rotate an object deflecting paddle wheel 140 which is positioned adjacent the upper end of each spinner roll 126, and when rotated through a prescribed arc, operates to deflect either the conductive or non-conductive object into an adjacent receiving chute 142, as the sensing circuit may indicate. To prevent the columnized objects from hurdling the spinner roll 126, a guide plate 135 as shown in FIG. 26 may be supported over each spinner roll 126 by the upwardly projecting struts 135' of the marshalling framework. The upper end of the deflecting plate, 135 has an inwardly curved end 135'' as shown in FIG. 26, to baffle any jumping movement of the spaced and columnized objects, and to direct them into sensing relation to the non-conductive arcuate cover 101' of the sensing unit 100.

The object deflecting paddle wheel 140, as shown in FIGS. 24, 26, 29 and 30, is composed of two or more radial extending blades 140' fixed to a paddle wheel shaft 141. The projecting end 141' of the paddle wheel shaft 141 is supported in a bearing block 141'' which is fixed to the angular shaped transverse framing bar 56' of the marshalling assembly, as shown in FIG. 30. The paddle wheel shaft 141 is so positioned and oriented that the paddles 140' associated therewith will successively sweep across the drop nose 102 adjacent to the sensing unit 100, at a tilted angle with respect to the cushioning faces 24 of the advancing paddles as shown in FIGS. 26 and 28, when the paddle wheel shaft 141 is rotated.

The mouth end of each receiving chute 142 is positioned directly adjacent the upper end of each spinner roll 126, as shown in FIGS. 24, 25, 26, 29 and 30, and is designed to receive the conductive objects which are deflected into the mouth thereof by the deflecting paddles 140'. The receiving chute 142 is shaped in the form of a tube of rectangular cross-section, and presents a side wall 142' which is directly adjacent the arcuate cover part 101' of the sensing unit 100. The upper end of the side wall 142' has a rectangular port opening 142*a* whose width is only slightly greater than the width of the deflecting paddle 140'. The clutch and brake device 85 which drives the paddle wheel shaft 141, is so constructed and operated as to normally maintain one of the paddles 140' of the paddle wheel 140 in position to substantially close the port opening 142*a* of the receiving chute 142, and thus block the entry of objects into the mouth end of the receiving chute. However, when the clutch and brake device 85 is energized to rotate the paddle wheel shaft 141 through an angular segment corresponding to the number of the deflecting paddles 140' which constitute the paddle wheel 140, the deflecting paddle blocking the opening 142*a* will be swung inwardly across the mouth of the chute 142, and the next succeeding deflecting paddle 140' will sweep across the drop nose 102 adjacent the sensing unit 100 and come to rest in a position to block the entry port 142*a*.

In addition to the side wall 142' which has the port opening 142*a* at the upper end thereof, each conductive object receiving chute 142 also presents additional side walls 142'' whose upper ends extend substantially above the adjacent spinner roll 126 as shown in FIG. 30, and join with the side wall 142' to provide a chute of rectangular cross section which is bent around the sprocket shaft 35' or other obstructions and terminates directly above the transverse object conveyor 190. Where objects are to be deflected into the chute 142, the interior of the chute may be provided with resilient rubber cushioning and deflecting baffles 143 and 143' as shown in FIG. 30, and which are secured to the side walls 142' and 142'' of the chute, and which serve to cushion the fall of the objects dropping onto the transverse conveyor 190.

In the structure shown in FIGS. 24 and 25, a total of eight spinner rolls 126 are employed, with two of the spinner rolls 126 positioned adjacent the opposite longitudinal frame members 11–11' of the marshalling framework, and with the remaining spinner rolls 126 arranged in pairs therebetween. A total of five receiving chutes 142 are required, two of which are positioned adjacent the longitudinal side frame members 11–11'. The other three receiving chutes 142 may be duplex chutes positioned at the ends of the adjacently paired spinner rolls 126. Each duplex receiving chute 142 would present opposite side walls 142' each having a port opening 142*a* at the mouth end thereof, and its mouth end would be divided into two compartments by a rubber cushioning baffle 144 as shown in FIGS. 24 and 29, which serves to prevent an object deflected by the paddles 140' at one port hole 142*a* from being thrown through the opposite port hole 142*a* of the duplex receiving chute. Each vertically extending rubber baffle 144 may be fixedly suspended from a suitable suspension bar 144' secured to the angular cross frame members 56' of the marshalling assembly.

In the modifications shown in FIGS. 29 and 30, the conductive objects are deflected by the deflecting paddle wheel 140 into the offside receiving chutes 142. The nonconductive objects which are not deflected, roll off the drop nose 102 and drop downwardly to ground. The nonconductive objects fall onto an inclined cover plate 145, extending over the transverse conveyor 190 as shown in FIG. 30, and thence deflected to ground and away from the transverse conveyor 190. The inclined cover plate 145 may be supported at the lower end thereof by the side wall 190' of the transverse conveyor 190, and its upper end may be secured to vertically extending straps 145' which are fixed to the lower transverse frame member 12' of the marshalling framework. Each of the chutes 142 which receive conductive objects extends through a conforming hole in the inclined cover plate 145 as shown in FIG. 30 and conducts the conductive objects contained therein directly to the transverse conveyor 190.

Where the object mixture to be processed, yields a relatively minor number of nonconductive objects to be separated from the conductive objects by the selector and eliminator devices, it may be advantageous to manipulate the deflecting paddle wheel 140 to deflect the nonconductive objects into the adjacent receiving chutes 142, and to permit the conductive objects to roll off the drop nose 102 at the end of the tumbling roll 125. To provide for such operation, it is necessary to provide a conductive object receiving chute 146 forwardly of each drop nose 102 to conduct the conductive objects to the transverse conveyor 190, as shown in FIGS. 35 and 36. While the magnetic clutch and brake unit 85 which drives the paddle wheel 140 remains the same in both cases, a slight modification to the circuit system as shown in FIG. 34 and hereafter described, is required, and which is operative to manipulate the deflecting paddle wheel 140 to deflect nonconductive objects into the side receiving chute 142, and block the entry of conductive objects into the receiving chute 142 and direct the selected conductive objects across the drop nose 102.

Where the nonconductive objects are to be deflected into the side receiving chute 142, one of the deflecting blades 140' of the deflecting paddle wheel 140 is held stationary to block the port opening 142*a* therein when a conductive object moves across the arcuate cover 101' of the sensing unit 100. However, when a nonconductive object is moved over the arcuate cover 101' of the sensing unit 100, the deflecting paddle 140' which blocks the port entry 142*a*, is swung inwardly across the mouth of the chute 142, and the next succeeding deflecting paddle 140' is swung across the drop nose 102 adjacent the sensing unit to push the nonconductive object into the receiving chute 142, and then come to rest in port blocking position.

Where the nonconductive objects are to be deflected laterally into the offside receiving chute 142, each receiving chute 142 may be constructed as previously described, except that the lower end thereof terminates directly below the transverse sprocket shaft 35' so that the nonconductive objects will drop onto the inclined cover plate 145, and thence slide off therefrom to ground. To conduct the selected conductive objects which fall off the drop nose 102 onto the transverse conveyor 190, a conductive object receiving chute 146 is positioned in advance of each drop nose 102. Each receiving chute 146 presents a pair of side plates 146', joined to a rear wall plate 146'' which together provide a U-shaped enclosure which extends through the inclined cover plate 145 as shown in FIG. 35. The rear wall plate 146'' may be secured to and supported by plate 37 of the mashalling framework, as shown in FIG. 35. A front plate 147 as shown in FIG. 35 completes the chute 146, the front plate 147 having openings 147' cut therein for the passage of the lower reach of the adjacent object marshalling chain 20a and associated paddles 23c therethrough. Each conductive object receiving chute 146 may be provided with a series of soft rubber baffles 148 and 148' suitably arranged to baffle the fall of conductive objects falling from the drop nose 102 onto the transverse conveyor 190.

A magnetic clutch and brake device 85 is operatively connected to the shaft 141' of each deflecting paddle wheel 140 and functions to intermittently rotate the paddle wheel 140 in successive stages under the control of the sensing unit 100. Each clutch and brake device 85 is contained within a non-magnetic tubular housing 85' which may be fixedly secured against rotation to the adjacent transverse framing plate 37 of the marshalling assembly as shown in FIG. 24.

As shown in FIGS. 24–27, each clutch and brake device 85 includes a cylindrical drive cup 86 formed of magnetic material and designed to rotate within the stationary tubular casing 85', and has a mechanically oscillated shaft 86' extending from the bottom wall thereof. The drive cup shaft 86' extends through the transverse frame plate 37 of the marshalling assembly and is rotatably journaled thereon. The clutch and brake device 85 also includes a clutch rotor 88 formed of magnetic material, and has a clutch shaft 88' extending therefrom which is connected as by a universal joint 141''' to the adjacent end of the paddle wheel shaft 141', as shown more particularly in FIGS. 26 and 30. The clutch rotor 88 is provided with a series of radially extending lug segments 88'' whose outer ends have an end area corresponding to the inner face area of lug sections 86'' extending from the drive cup 86. The lug segments 88'' correspond in number and spacing to the number and angular spacing of the deflecting paddles 140' associated with the paddle wheel 140, and fit within the inner circumference defined by the corresponding lug sections 86'' of the drive cup 86. Thus, when the drive cup 86 is magnetized and mechanically oscillated, the lug sections 86'' thereof will grip the lug segments 88'' of the clutch rotor 88 to thereby correspondingly rotate the clutch rotor 88 and the paddle wheel 140.

As shown in FIGS. 26 and 27, the drive cup 86 contains a magnetic clutch coil 87 wound on a spool 87'' which is placed on a magnetic core 87'. The magnetic clutch core 87' may be formed as an integral part of the bottom wall of the drive cup 86 and oscillates therewith. The lead wires from the clutch coil 87 may be connected to external slip rings 87''' which encircle the drive cup shaft 86'. The slip rings 87''' are connected to direct current input lines whose current flow is controlled by the sensing unit 100 as hereafter described. When the clutch coil 87 contained in the mechanically oscillated drive cup 86 is energized, the drive cup lug sections 86'' will grip the corresponding lug segments 88'' of the rotor 88 to rotate the rotor 88 and paddle wheel 140 in one direction only and in successive stages.

The clutch cup 86 is continuously oscillated clockwise and counterclockwise through a prescribed angle by mechanical means hereafter described. The angular extent of these oscillations is determined by the number of deflecting paddles 140' associated with the deflecting paddle wheel, and where the paddle wheel 140 is equipped with four deflecting paddles 140' as shown in FIG. 26, the drive cup 86 will be oscillated back and forth through an angle of ninety degrees. The magnetic clutch coil 87 is energized and de-energized in accordance with the controlled impulses received from the sensing unit 100, and when the drive cup 86 is thereby magnetized during one cycle of oscillation, it will operate to rotate the deflecting paddle wheel 140 through an angle of ninety degrees, with resultant sweep of one of its deflecting paddles 140' across the drop nose 102 adjacent to the sensing unit 100 and into fixed residence position at the port opening 142a of the chute 142, and thus block the entry of objects into the chute 142.

To rigidly maintain one of the deflecting paddles 140' in port blocking position so that the object advanced by the pusher paddle 24 is not deflected but is pushed onto the drop nose 102, a magnetic brake coil 89 is telescoped over the clutch shaft 88', as shown more particularly in FIGS. 26 and 27. The magnetic brake coil 89 has a magnetic core 89' in which the clutch shaft 88' freely rotates. The brake coil 89 is contained within a brake cup having a bottom wall 89'' and a cylindrical body wall 89'''. The magnetic core 89' may be formed integral with the bottom wall 89'' of the brake cup, and the brake cup and the magnetic brake coil 89 contained therein is held against rotation as by screws which secure the end wall of the fixed tubular casing 85 to the bottom wall 89'' of the brake cup. When the brake coil 89 is energized, a braking effect is exerted on the clutch shaft 88' which operates to lock the deflecting paddle wheel 140 against rotation, and maintains one of its deflecting paddles 140' in position to block the adjacent port hole 142a of the chute 142.

The clutch coil 87 contained in the drive cup 86, and the brake coil 89 contained in the surrounding brake cup wall 89''', are alternately energized and de-energized under the control of the sensing unit 100, so that when the mechanically oscillated drive cup 86 is coupled to the clutch rotor 88 by the energization of its clutch coil 87, the four bladed paddle wheel 140 is rotated through an angle of ninety degrees; and upon de-energization of the clutch coil 87 and simultaneous energization of the brake coil 89, the brake wall 89''' will magnetically lock to the rotor lugs 88'' and thus lock the deflecting paddle wheel 140 against further rotative movement.

As shown in FIGS. 24 and 26, the drive cup 86 is mechanically oscillated through a drive system which may be directly connected to the sprocket shaft 35' by means of which the marshalling chain sprockets 35a are driven through the slip clutch 35b. The driven sprocket shaft 35' has a beveled gear 90 fixed thereto which meshes with the companion bevel gear 90' fixed to a relatively short longitudinally extending shaft 91 having a driven gear 91' fixed thereto. The short shaft 91 is supported by a suitable bracket or gear box 91'' fixed to the adjacent side frame member 11 of the marshalling frame as shown in FIG. 25. A transfer gear 92 supported by suitable stub shaft 92' meshes with the driven gear 91' and with a driven gear 93 fixed to a secondary shaft 93'. One end of the secondary shaft 93' is fixed to a cam arm 94 which has a camming stud 94' projecting therefrom. The cam stud 94' is designed to extend into a vertical slot 94'' formed in the enlarged head section 95' of a horizontally reciprocating bar 95 extending across the rear end of the marshalling assembly as shown in FIGS. 24 and 25, and is supported by suitable guide blocks 95'' fixed to the adjacent transverse framing plate 37 of the marshalling framework.

The drive cup 86 of each clutch and brake device 85 is oscillated by the reciprocating bar 95 through an angle corresponding to the angular spacing of the deflecting paddles 140' of the paddle wheel 140 driven thereby. Where the deflecting paddle wheel 140 has four radially spaced deflecting blades or paddles 140', spaced ninety degrees apart, as shown in FIGS. 24, 29, 30 and 35, the driving cup 86 would be oscillated through an angle of ninety degrees. It will also be noted that alternate paddle wheels 140 are segmentally rotated in the same clockwise direction to push objects into the receiving chute 142 positioned at the right side thereof, while the intermediate deflecting paddle wheels 140 are rotated in a counter-clockwise direction to deflect objects into the rear receiving chute 142 positioned on the left hand side thereof. Therefore, the driving connections between the mechanically oscillated shafts 86' of the alternate drive cups 86, and the shafts 86' of the intermediate drive cups 86, are so connected to the reciprocating bar 95 to accomplish this result.

As shown in FIGS. 24, 25 and 26, the alternate drive cups 86 which segmentally rotate the paddle wheel 140 connected thereto in a clockwise direction, present a lever arm 96 fixed to the terminal end of its drive cup shaft 86' which extends downwardly as shown at the left hand side of FIG. 26, with the lower end thereof connected by hinge pin 97 to the lower end of an upwardly inclined connecting link 98 whose upper end is pivotally connected by hinge pin 99 to the reciprocating bar 95. The shaft 86' of each intermediate driving cup 86 which rotates its paddle wheel 140 in a counter-clockwise direction as shown in the right hand side of FIG. 26, has an upwardly extending lever arm 96' fixed to its terminal end which is connected by hinge pin 97' to one end of a downwardly inclined connecting link 98' whose opposite end is connected by hinge pin 99' to the reciprocating bar 95.

The lever arms 96–96' and the connecting links 98–98' are of such length as to oscillate the respective drive cup shafts 86' through an angle of ninety degrees where four paddles 140' are associated with the paddle wheel 140. It will be appreciated that where the paddle wheel 140 is provided with only two paddle blades 140' spaced 180 degrees apart, or three paddle blades 140' spaced 120 degrees apart, the lever arms 96–96' and associated connecting links 98–98' would be correspondingly modified to oscillate the drive cups 96 and correspondingly rotate the paddle wheels 140 through 180 degrees or 120 degree segments.

The speed of segmental rotation of the paddle wheels 140 is so synchronized with the advanced movement of the rubber facing plates 24 of the columnized paddles **23*c* so as not to interfere with the advance movement of the deflecting paddle 140' across the adjacent drop nose 102. The paddle wheel 140 is segmentally rotated with a quick movement, and so that the wheel blade 140' operating to deflect the conductive object, is progressively swept across the face of the rearwardly inclined resilient facing section 24 of the advancing paddles 23*c* the moment the advancing paddle has positioned the object adjacent the inner end of the drop nose 102. Striking contact between the wheel blade 140' engaged in deflecting the object, and the paddle face section 24 of the adjacent advancing paddle 23*c*, is avoided by the rearward inclination of the paddle facing section 24 and the tilted position of the paddle wheel shaft 141** as illustrated in FIGS. 26 and 28.

Rotative synchronization of the paddle wheel 140 and advancing blades **23*c* is accomplished by proper proportional sizing of the beveled gears 90–90' and the driving and transfer gears 91', 92 and 93. This synchronization of movement is further assured by the provision of the slip clutch 35*b* associated with each chain driving sprocket 35*a* which operates to advance the advancing paddles 23*c* in synchronization with the segmental rotation of the paddle wheels 140. It will be noted that the slip clutch 35*b* is free to slip in the event any jamming of one of the columnized advancing paddles 23*c* should occur, but whose sprocket driving lugs 35*c* are angularly spaced in conformity with the lineal spacing of the advancing paddles 23*c***.

The marshalling assembly illustrated in FIG. 26 and above described, suggests horizontal advancing paddles **23*c*, each column of which cooperates with a tumbling roll 125 and an adjacent spinning roll 126. It will be appreciated, however, that the advancing paddles 23*c* formed of non-conducting material, may be inclined downwardly as well as rearwardly, as in the case of the downwardly inclined advancing paddles 23*b* shown in FIG. 22, and wherein the tumbling roll 125 and associated spinning roll 126 would be adjusted in elevation as shown in FIG. 22. In this modification, the sensing unit 100 and associated drop nose 102 would be positioned at the upper end of each depressed tumbling roll 125** as heretofore explained, and without change in the driving or manipulating mechanisms shown in FIG. 26.

It will be appreciated also that the advancing paddles **23*c* shown in FIG. 26 may be bent downwardly and rearwardly to correspond with the advancing paddles 23*b* shown in FIG. 23, and employing only a tumbling roll 125*a* associated with the downwardly inclined column of advancing paddles 23*c*. In this modification, the sensing unit 100 and associated drop nose 102 would be positioned at the upper end of the tumbling roll 125*a*** as heretofore explained, without material change in the driving and manipulating mechanisms shown in FIG. 26.

As a further alternative, the columnized advancing paddles **23*c* shown in FIG. 26 may also be downwardly as well as rearwardly inclined as shown in FIG. 21, and use only a spinner roll 126*a* associated with each column of downwardly inclined advancing paddles 23*c*. In this modification, the sensing unit would have a sloped cover in conformity with the slope of the inclined leg 136*a*' of the V-shaped member 136*a* over which the objects are driven by the downwardly sloped advancing paddles 23*c*, and with a drop nose 102 extending therefrom. In this modification, using only a spinner roll 126*a* with each column of downwardly inclined paddles 23*c*, the spinner roll 126*a*** would be driven from the lower end thereof as indicated in FIG. 26.

It is thus evident that various arrangements of tumbling rolls 125 or **125*a* and/or spinner rolls 126 or 126*a*, and/or inclined tumbling plates 136 or 136*a* may be provided in association with a sensing unit 100 and drop nose 102 positioned at the upper end of one of the rolls or tumbling plates, and that the non-conductive advancing paddles 23*c*** may be downwardly inclined in accordance with the requirements of these modifications and within the purview of this invention.

*Electronic circuit for alternate sensing devices*

The circuit shown in FIG. 33 is designed to segmentally rotate the paddle deflecting wheel 140 through an angle of ninety degrees, when a conductive object has been advanced over the cover part 101' of the sensing unit 100, to thereby deflect the conductive object laterally into the receiving chute 142, and then lock one of the paddle wheel blades 140' in position to block the port opening **142*a* and prevent the entry of any non-conductive object into the chute 142, but nevertheless permit the non-conductive object to complete its journey across the drop nose 102** to ground.

The sensing unit positioned adjacent the upper end of the tumbling roll 125, or tumbling roll **125*a*, or spinner roll 126*a*, or inclined leg 136' of the floor member 136, as previously described, contains a sensing circuit A, an amplifying circuit B and a switching circuit C as diagrammatically indicated in FIG. 33, and which are connected in circuit with each other. The switching circuit C is also electrically connected to the clutch coil 87 and brake coil 89 of the magnetic clutch and brake device 85, and is also connected to a cam switch assembly associated with the clutch shaft 88' of the clutch and brake device 85. Direct current, under control of the switching circuit C may be supplied to the clutch coil 87 and brake coil 89 by a storage battery 110** of relatively low voltage such as approximately forty-five volts.

The sensing unit 100 has a cover part 101' whose outer surface forms a substantially uninterrupted continuation of the upper end of the tumbling roll 125, or tumbling roll 125*a*, or spinner roll 126 or spinner roll 126*a*, or inclined lower leg 136' of the floor member 136, so that the objects to be classified make smooth transition across the outer surface of the cover part 101' of the sensing unit 100. As previously explained, the cover part 101' of the sensing unit 100 is formed of non-conducting material such as "Teflon," to insure proper operation of the sensing unit. The sensing unit 100 may contain two or more partitions or non-conducting plates 103 as shown in FIG. 31 on which the elements and components of the sensing circuit A, amplifying circuit B and switching circuit C may be conveniently mounted.

The sensing unit 100 also contains a pair of spaced condenser plates 104, which are positioned directly adjacent the inner face of the cover part 101' of the sensing unit, as shown more particularly in FIGS. 31 and 32, and which are desirably contoured in conformity with the inner surface of the cover part 101'. The spaced condenser plates 104 provide the capacitor portion of a tuned oscillator tank circuit which comprises the combination of an inductance coil L1 which may be of miniature size and a capacitor C1 as represented by the condenser plates 104. The spaced condenser plates 104 provide an equivalent for the capacitor C1 of the circuit illustrated in FIG. 15 and heretofore described, and are similarly connected as by lead wires 80'' to the coil terminals 80–80' of the tank circuit inductance coil L1. The sensing circuit A, amplifying circuit B and switching circuit C of the control circuit illustrated in FIG. 33, is substantially identical and equivalent to the corresponding circuits A, B and C associated with the control circuit shown in FIG. 15 and heretofore described.

The clutch and brake device 85 as previously described may be the operating equivalent of the magnetic clutch and brake device illustrated in FIG. 15 and previously described, except that the magnetic clutch and brake device shown in FIG. 15 operates through magnetic fluid, whereas the clutch and brake device 85 shown in FIG. 33 is a salient pole type of clutch and brake. As a further modification, the salient pole clutch and brake device shown in FIG. 33, is equipped with a switch operating cam 105 fixed to the clutch shaft 88' which presents two or more equally spaced and radially extending cam lugs 105', equal in number to the paddle blades 140' associated with the deflecting paddle wheel 140. The cam lugs 105' are designed to manipulate the cam plate 105'' during segmental rotation of the switch operating cam 105, to thereby make and break contact with a contact point 105'''.

The slip rings 87''' mounted on the mechanically oscillated shaft 86' of the drive cup 86 are connected to the terminals of the clutch coil 87 and to lead lines 82 and 82' respectively which supply direct current to the clutch coil 87. One of the lead wires 83 to the brake coil 89 shown in FIG. 33 may be connected to a common lead wire 112 to which the clutch lead wire 82 is joined. The other lead 83' from the brake coil 89, as well as the clutch lead line 82', and common clutch and brake lead line 112, are all supplied with direct current from the battery 110 under the control of a flip-flop switch forming a part of the switching circuit C. The direct current leads 82–82' and 83–83' and the contact leads 84–84' are also connected to the output end of the sensing and control circuits A and C, which at the input end are in circuit with the end terminals 80–80' of the inductance coil L1 and the condenser end terminals 80'' of the plate capacitor C1, and the tap terminal 81 of the inductance coil L1.

The transistor control circuit as shown in FIG. 33, is similar to the control circuit shown in FIG. 15, and comprises an assembly of junction transistors, capacitors, resistors and diodes of relatively miniature size connected in circuit by fine wires. The transistor circuit per se can be operated on only two to three watts of input power, and the clutch and brake device 85 controlled thereby can be operated on only approximately twenty watts of input power. The sensing oscillator circuit A for the transistor control circuit includes a tuned oscillator tank circuit comprising the combination of the plate capacitor C1 and inductance coil L1 whose end terminals 80–80' are supplied with high frequency alternating current. The sensing oscillator circuit A may be the Hartley type in which the condenser plates 104 serve as a shunt tuning capacitor C1 to provide a high Q tank circuit, tuned to a high frequency. The sensing coil terminals 80–80' are also connected to a base coupling capacitor C25 and a collector coupling capacitor C26 to provide base and collector stabilization for the oscillator and to block the D.C. voltage from the tuned tank circuit.

Collector voltage for the first oscillator transistor Q1 is supplied by the minus 45 volt supply 110 through the lead wire 111 and filter resistors R36 and R38. Filtering capacitors C27 and C30 are connected from resistors R36 and R38 to ground, to furnish additional filtering and de-coupling for the collector voltage. Resistors R28 and R29 are connected in series to provide a voltage divider across the minus 45 volt supply 110, and are proportioned so that their junction with the base of the first transistor Q1 will establish the proper operating potential at the base of the transistor. In conjunction with an emitter resistor R32, the voltage divider resistors R28 and R29 operate to establish the current level for the operation of the first transistor Q1. A capacitor C28 provides a high frequency by-pass for resistor R32.

Oscillation of the circuit A of FIG. 33 is produced by collector to base coupling through the collector coupling capacitor C26, inductance coil L1 and base coupling capacitor C25. Any random voltage variation on the collector of the transistor Q1 is applied with reversed polarity to the base of transistor Q1, by transformer action of the inductance coil L1, thus creating the condition required for oscillation. The frequency of oscillation, which may be about twenty-five megacycles, will depend on the value of the tuning capacitor C1, as established by the size, shape and spacing of the condenser plates 104, as well as on the inductance of the coil L1.

The direct current flowing in resistors R30 and R31 will increase as the amplitude of the high frequency oscillation decreases. The capacitor C29 is used to by-pass the high frequency to ground, so that direct current alone will pass through resistor R30. Thus a change in the amplitude of the high frequency will cause a change in the direct current voltage drop across the tapped resistor R30.

The sensing and control circuit shown in FIG. 33 employs a tuned oscillator tank circuit comprising the combination of the coil L1 and the capacitor C1 represented by the condenser plates 104, and either the coil L1 or the capacitor C1 may be employed as the sensing element. When coil L1 is used, a conducting object passed in sensing relation thereto will produce a loading effect on the circuit by reducing the Q of the circuit. Alternatively, the presence of a conducting object adjacent the condenser plates 104 will greatly increase the capacitance between plates and produce a similar loading effect. When the condenser plates 104 are employed as the sensing element, the coil L1 may be a very small radio frequency choke coil, not visible in FIGS. 31 and 32. A somewhat larger coil L1, located in the area where condenser plates 104 are positioned, may be alternatively used as the sensing element. It is not necessary for a conducting object to pass through the sensing coil L1 to produce a loading effect on the coil, since a loading effect is also produced when a conducting object passes over a non-conductive covering extending over the coil L1.

When an electrical conductor such as a potato is passed in sensing relation to the condenser plates 104, the Q of the tank circuit comprising the inductance coil L1 and capacitor C1 is thereby lowered, resulting in a reduction in the amplitude of oscillation, and causing the collector voltage to become less negative and the collector direct current to increase. The increased collector current, which results from passage of the conductive object across the condenser plates 104, causes a potential change or pulse at the junction of resistors R30 and R31. After the conductive object has passed beyond the condenser plates 104, the oscillator circuit A returns to normal, resulting in a higher negative collector potential. The adjustable tap on resistor R30 provides a means for adjusting the amplitude of the output pulse transmitted to resistor R35.

The pulse thus created, is applied to the pulse amplifying circuit B through resistor R35 and capacitor C32 connected between the sensing oscillator circuit A and the amplifying circuit B. The junction of resistor R35 and capacitor C32 is connected to a feed-back resistor R39. Capacitor C32 is also connected to the base of a second transistor Q2 and a resistor R34. The collector voltage for the second transistor Q2 is supplied from the minus 45 volt supply 110 by lead wire 111 through the filter combination of resistor R38 and capacitor C30. The operating point of transistor Q2 is determined by the combination of resistors R34, R41, R42 in conjunction with third transistor Q3 and resistors R37 and R40. The direct current feed-back through resistor R34 stabilizes the direct current operating point of the second transistor Q2. The resistor R33 in the emitter circuit of second transistor Q2 further stabilizes the direct current operating point of this stage of amplification, by direct current degeneration. A capacitor C31 connected in parallel with resistor R33 serves to adjust the amount of alternating current degeneration in the emitter circuit of second transistor Q2. The current pulse applied to the base of second transistor Q2 through capacitor C32 is amplified by the combination of second transistor Q2, capacitor C31 and resistors R33 and R37. The output voltage pulse across resistor R37 is coupled directly to the base of the third transistor Q3. A by-pass capacitor C33 by-passes the unwanted higher frequencies to ground.

The third transistor Q3 and resistors R40, R41, R42 and capacitor C34 provide the second stage of amplification. The pulse at the base of the third transistor Q3 causes an amplified current to flow through the resistor R40 which is located in the collector circuit of the third transistor Q3. Resistors R41 and R42 stabilize the direct current operation of transistor Q3 by direct current degeneration while capacitor C34 adjusts the alternating current degeneration. The collector voltage is obtained from the minus 45 volt supply 110 through lead wire 111. The signal pulse appearing across resistor R40 is directly coupled to the base of a fourth transistor Q4. A by-pass capacitor C35 by-passes the unwanted higher frequencies to ground.

The signal pulse is further amplified by the combination of the fourth transistor Q4, resistors R43 and R44 and capacitor C36. Resistor R43 stabilizes the direct current operation of transistor Q4 by direct current degeneration, and condenser C36 adjusts the alternating current degeneration. The pulse at the base of the fourth transistor Q4 causes an amplified current to flow through resistor R44. Resistor R39 and capacitor C37 combine to feed-back a portion of the output pulse to the base of the second transistor Q2 through capacitor C32. The feed-back reduces the amplification and stabilizes the operation of the amplifier circuit B and makes it substantially independent of changes in transistor gain.

The amplified pulse that appears at the junction of capacitor C38 and resistor R54 is a negative pulse which passes through the diode D3 to the base of a fifth transistor Q5. The diode D3 serves to prevent any positive pulse from reaching the base of transistor Q5 by diverting it to ground through resistor R54. The fifth and sixth transistors Q5 and Q6 and the resistors R45, R46, R47, R48, R49, R50, R51 and R57 are connected in the switching circuit C known as a flip-flop. This circuit is employed to control the power transistors Q7 and Q8, which in turn switch energizing current to either the clutch coil 87 or the brake coil 89. When the fifth transistor Q5 is in the "Off" or non-conducting state, and the sixth transistor Q6 is "On" or conducting, then the junction of resistor R57, the emitter of transistor Q6, and the base of the power transistor Q8 are at a high negative potential, whereas the junction of resistor R46, the emitter of the transistor Q5, and the base of the power transistor Q7, are at a low negative potential. When the base of transistor Q8 is at a high negative potential this transistor Q8 is in the full "On" position, and current flows from ground through resistor R53, transistor Q8, lead wire 83', and the brake coil 89 and returns to the minus side of the storage battery 110 through lead wire 83 and the common negative lead wire 112. At the same time, the base of power transistor Q7 is at a low negative potential, and the voltage drop across resistor R53 raises the potential of the emitter of power transistor Q7 to a higher negative value than its base, so that transistor Q7 is non-conducting and will not send current through the clutch coil 87.

When a negative pulse appears at the capacitor C38, it passes through diode D3 to the junction of resistors R45, R47, and the base of transistor Q5, and then switches transistor Q5 to the "On" position. The resulting current which flows from ground through resistor R46, transistor Q5 and resistor R48 will cause a negative voltage drop at the junction of resistors R48 and R50, and the collector of transistor Q5, which voltage drop is applied through resistor R50 to thereby switch the transistor Q6 to the "Off" position. When the transistor Q6 is in the "Off" position, there is little current flow through the emitter resistor R57 and it is at a low negative voltage, and since the base of power transistor Q8 is connected by lead wire 114 to the emitter of transistor Q6, power transistor Q8 will also be switched to "Off" position, and will stop current flow through the brake coil 89 and the brake of the magnetic clutch and brake device 85 is released. A high negative potential is simultaneously produced at the junction of resistor R46 and at the emitter of transistor Q5 when transistor Q5 is switched on. This junction is connected by lead wire 113 to the base of power transistor Q7, so that thereby the power transistor Q7 is switched on and current flows through resistor R53, transistor Q7, lead wire 82', clutch coil 87, lead wire 82 and the common negative lead wire 112.

When the clutch coil 87 is energized, the clutch shaft 88' of the clutch and brake device 85 is rotated until the switch cam 105 closes the switch element 105'''. Capacitor C40, which is normally charged through resistor R52 to the full voltage of the battery 110, will now partially discharge through resistor R56, lead wires 84–84', and switch element 105''', causing a rise in negative potential. This rise in negative potential at the junction of resistors R52 and R56 and capacitors C39 and C40, is conducted through diode D4 to the junction of resistors R50 and R51 and the base of transistor Q6. This negative pulse switches transistor Q6 to the "On" state, and this action in turn switches transistor Q5 to the "Off" state, and transistors Q7 and Q8 exchange conducting states, as explained above, so that the clutch coil 87 is de-energized and the brake coil 89 is energized. The positive pulse which appears when the switch element 105''' opens, is blocked by diode D4 and conducted to ground through resistor R55, and will therefore have no effect on the circuit operation.

The diodes D1 and D2 are respectively connected across clutch coil 87 and brake coil 89, and protect transistors Q7 and Q8 from reverse voltage surges caused by the collapse of the inductive fields in the clutch coil 87 and the brake coil 89.

A transistor circuit as illustrated in FIG. 33 and above described, is provided for each clutch and brake device 85, except that a common power source 110 may be provided for all of the individual transistor circuits. While a storage battery source of power as indicated in FIG. 33 can be used, it may be more convenient to produce the circuit power by means of a dynamotor or other voltage converter capable of delivering approximately forty-five volts when driven by a suitable power source. When powering the transistor circuits by means of a dynamotor, the dynamotor would be supplied with six volts from a conventional storage battery and generator arrangement. Each transistor circuit and associated clutch and brake device 85 requires approximately only twenty watts of electrical power.

Each of the transistor circuits may be fully contained and sealed within the box part 101 and cover part 101′ of the sensing unit 100, and since the transistor circuit is adapted for compact assembly, its sealed housing 101–101′ may be made relatively small in size. By the use of the salient pole type of clutch and brake device 85, which can also be compacted in a small space, their housings 85′ can also be made relatively small and compact in size. Thus by the use of compactly sized transistor circuits and compactly sized salient pole type clutch and brake device 85, the instrument containing electronic control housings 101–101′ and the clutch and brake device housing 85′ can be made very compact and light in weight.

When a conductive object passes over the cover part 101′ of the sensing unit 100, the energizing current to the brake coil 89 is cut off, and current is switched to the clutch coil 87. The de-energized brake coil 89 thus releases the clutch rotor 88 with resultant rotation of the paddle wheel 140 in synchronism with the upwardly advancing paddles **23*b*, to thereby push the conductive object laterally from the cover part 101 or drop nose 102 into the receiving chute 142. At the termination of the ninety degree movement, the four lobed cam 105 fixed to the clutch shaft 88′ closes contact 105‴ to operate the control circuit to switch current from the clutch coil 87 to the brake coil 89, which then holds the paddle wheel 140** stationary until another conductive object signal is received.

If a non-conducting object is advanced over the cover part 101′ of the sensing unit, no signal is received, and the paddle 140 remains locked in stationary position, so that the port blocking paddle 140′ directs the non-conductive object to ground discharge over the drop nose 102. Any object travelling along the upper surface of the tumbling roll 125 or **125*a* or the spinner roll 126 or 126*a*, and in contact with the barrier 135, will be pushed by the curved end 135″ of the barrier into sensing proximity to the cover part 101′ of the sensing unit 100**.

Synchronizing adjustments may be made so that the paddle blades 140′ of the paddle wheel 140 are segmentally rotated in timed relation to the advancing movement of the marshalling paddles **23*b*, and so that the deflecting paddle blades 140′ swing into deflecting engagement with the conductive object when the advancing paddle 23*b* has moved the conductive object beyond the cover part 101′ of the sensing unit. As shown in FIG. 28, it will be noted that the backward slant of the advancing paddle 23*b* will reduce the effective rate of approach of its advancing paddle face 24 with respect to the adjacent edge of the deflecting paddle blade 140′, as they continue their respective motions. Since the paddle wheel shaft 141′ is set at an inclined angle with respect to the advance movement of the paddle 23*b*, so that the paddle wheel blades 140′ have a component of motion in the direction of conductive object movement, constant clearance is obtained between the rotating paddle wheel blade 140′ and the adjacent advancing paddle face 24**.

It will also be noted by referring to FIGS. 26, 27 and 33, that the drive cup 86 of the magnetic clutch and brake device 85 is provided with four lug sections 86″ which are selectively energized by the clutch coil. The clutch cup 86 oscillates back and forth through an angle of ninety degrees in synchronism with the advance movement of each advancing paddle **23*b*. When the lug sections 86″ of the drive cup 86 are magnetized by the clutch coil 87, the lug sections 86″ are magnetically coupled to the lug segments 88″ of the clutch rotor 88, which is thereby segmentally rotated in one direction only. Such coupling can only take place when the lug sections 86″ and lug segments 88″ are in alignment. When the clutch coil 87 is demagnetized, the brake coil 89 is magnetized to maintain the paddle wheel 140 locked in fixed port blocking position. When the clutch coil 87 is magnetized, the brake coil 89 is demagnetized, the clutch shaft 88′ and the paddle wheel shaft 141 conncted thereto are rotated in one direction only. Backward tilt of the advancing paddle face 24, and the skewed position of the paddle wheel shaft 141, may be relatively adjusted so that sufficient clearance is maintained between the advancing paddle face 24 and the adjacent deflecting paddle 140′ during their relative movements. Each advancing paddle 23*b* as shown in FIG. 28 is made of insulating material such as nylon or other tough plastic, so that it has no influence on the sensing unit 100** when passing thereover.

By making minor changes and additions to optional control switches associated with the clutch and brake device 85, positioned exterior to the sensing unit 100, the deflecting paddle wheel 140 may be operated and manipulated to deflect non-conductive objects into the side receiving chute 142, and to block the port opening **142*a* therein when a conductive object arrives in sensing position and so that the conductive object continues its travel across the drop nose 102 for discharge into the receiving chute 146**.

The control circuit for this arrangement is illustrated in FIG. 34. This control circuit operates to energize the clutch coil 87 so that the mechanically oscillated drive cup 86 segmentally rotates the clutch rotor 88 and the clutch paddle wheel 140 as a normal condition of operation, and to thereby deflect successive objects advanced to the drop nose 102 into the side receiving chute 142, unless further controlled. This further control is provided by means for de-energizing the clutch coil 87 and energizing the brake coil 89 when a conductive object is sensed by the sensing unit 100 and arrives at the drop nose 102, and which condition results in a locking of the paddle blades 140′ in a position to block the opening **142*a* in the side chute 142, with the result that the conductive object continues its travel across the drop nose 102 and into the product receiving chute 146. In this circuit diagram shown in FIG. 34, the same sensing unit 100 may be used as is employed in connection with the control circuit shown in FIG. 33, and contains an identically similar sensing circuit A, amplifying circuit B and switching circuit C, including the spaced condenser plates 104 connected by fine lead wires 80″ to the outer terminals 80–80′ of the inductance coil L1. The same salient pole clutch and brake device 85** is also employed in both switching circuits shown in FIGS. 34 and 33.

In the circuit shown in FIG. 34, as in the circuit shown in FIG. 33, the salient pole clutch and brake device 85 of the control circuit shown in FIG. 34 presents a pair of slip rings 87‴ connected to the terminal ends of its clutch coil 87, and one of its slip rings 87‴ is supplied with direct current by current line 82 connected to a common current line 112 which is connected to the negative side of the battery 110. One of the end terminals of the brake coil 89 is also connected by lead line 83 to the common lead wire 112 joined to the negative side of the battery 110.

However, in the control circuit shown in FIG. 34 the other terminal of its clutch coil 87 is connected to a lead line 82$a$ joined to the contact point 106''' of a cam switch which includes a cam disc 106 which is fixed to the continuously driven shaft 93' or an extension thereof, as shown in FIGS. 26 and 34. The continuously rotating clutch control cam 106 has a raised track section 106' of approximately 180 degrees in length, which is designed to manipulate a switch plate 106'' into conducting contact with the contact point 106''' to which the clutch lead wire 82$a$ is connected. The circuit is completed by a lead line 82$b$ connected to the switch plate 106'' and which leads to the transistor Q8, which in this case serves as the clutch control transistor of the associated flip-flop switch.

As a further modification, the lead line 83' from the other terminal of the brake coil 89 is connected to a two-way current line comprising current wires 83$a$ and 83$b$ extending in opposite directions. Current wire 83$a$ leads to the switch point 107''' of a brake switch, which includes a continuously rotated brake control cam disc 107 fixed to the continuously rotating shaft 93' or an extension thereof. The brake switching cam 107 also has a raised cam track 107' which is approximately 180 degrees in arcuate extent, and designed to manipulate a brake switch plate 107'' grounded as at 83$c$ and positioned to make closed circuit contact with the brake switch point 107'''. The other part of brake current line 83$b$ extending from brake lead line 83' leads to the transistor Q7, which then provides the brake control transistor of the flip-flop switch. It will be here noted that the continuously rotated brake cam disc 107 presents its raised track section 107' in out-of-phase relation to the raised cam track 106' of the clutch control cam 106. Thus, when the raised track section 106' of the clutch cam 106 closes the circuit between the clutch leads 82$a$ and 82$b$, the brake contact point 107''' is open and the brake coil 89 is de-energized, and no braking action is exerted on the paddle wheel 140.

As a further modification, the continuously rotated shaft 93' or an extension thereof, has a switching cam 108 secured thereto which presents a raised track lug 108' on the periphery thereof, designed to move its switch plate 108'' into circuit closing contact with the switch contact point 108'''. The contact point 108''' and the contact plate 108'' are connected to lead lines 84 and 84' which lead to the switching circuit C contained in the sensing unit 100 which operates in a manner similar to the switching circuit C associated with contact point 105''' and contact plate 105 in the control circuit shown in FIG. 33. It will be noted, however, that the switch cam 108 has a contact lug 108' of relatively short arcuate length, so that current flow in lead lines 84 and 84' occurs during only a short instant during each complete rotation of the switch cam 108.

The clutch control switch comprising the continuously rotated cam disc 106 and associated contact plate 106'' and contact point 106'''; the brake control switch comprising the continuously rotated brake control cam disc 107 and its contact plate 107'', contact point 107'''; and the main control switch comprising the continuously rotating cam disc 108 and associated cam plate 108'' and contact point 108''', may all be grouped together in relatively small space, and contained and protected within a suitable switch housing 109 which may be conveniently mounted on one of the side frame members 11 of the marshalling assembly, as indicated in FIG. 24.

It is apparent that when the control circuit illustrated in FIG. 34 is used, the deflecting paddle wheel 140 continues to segmentally rotate in the same direction and through successive angles of ninety degrees, when a non-conductive object is delivered to the drop nose 102, or when no object is delivered by the adjacent advancing paddle face 24 to the drop nose. However, when a conductive object is delivered by the advancing paddle face 24 to the drop nose 102, the control circuit shown in FIG. 34 operates to de-energize the clutch coil 87 so that the drive cup 86 continues to oscillate without driving engagement with the rotor 88, and simultaneously operates to energize the brake coil 89 so as to lock one of the deflecting paddle blades 140' in position to block the port opening 142$a$ in the side chute 142, and so that the conductive object continues its travel over the drop nose 102 and into the product receiving chute 146.

When a conductive object is individually advanced in sensing relation to the spaced condenser plates 104 of the capacitor C1 as shown in FIG. 34, a surge is thereby produced in the oscillator circuit A which is applied to the amplifier circuit B contained in the sensing unit 100. After amplification, the resulting negative pulse is applied to the switching circuit C, causing the transistor Q5 to switch from a non-conducting to a conducting state, and simultaneously causing the transistor Q6 to switch from a conducting to a non-conducting state. Since the emitter of transistor Q5 becomes more negative when it is conducting, the increase in negative potential is applied to the base of transistor Q7 through the protective resistor R7, causing transistor Q7 to become conductive. Transistor Q7 is connected in parallel with the contact plate 107'' and contact point 107''' of the brake switching cam 107. When transistor Q7 is conducting, current will flow from the battery 110 through lead wires 112 and 83, brake coil 89, lead wires 83' and 83$b$, transistor Q7 and resistor R53 to ground. At the same time, the emitter of transistor Q6 becomes less negative when it is switched to a non-conducting state, and the drop in negative potential is applied to the base of transistor Q8 through the protective resistor R8, causing transistor Q8 to become non-conducting. When the transistor Q8 is non-conducting, no current can flow through the clutch coil 87. Thus a signal emanating from the capacitor C1 will energize the brake coil 89 and lock the deflecting paddle wheel 140 against rotation, and the transistor Q8 will simultaneously open the clutch circuit and de-energize the clutch coil 87.

The single lobed switch cam 108, fixed to the secondary shaft 93' and under continuous rotation, is adjusted so that its contact plate 108'' and contact point 108''' are momentarily brought into circuit closing position once during every revolution of shaft 93'. When a conductive object signal is received, the paddle wheel 140 is locked against rotation, so that the conductive object may proceed from the drop nose into the product chute 146. Adjustments are made so that the switching circuit between contact plate 108'' and contact point 108''' is momentarily closed after the conductive object is discharged into chute 146. This partially discharges condenser C40 through resistor R56, causing a negative pulse to be applied to the base of the transistor Q6 through condenser C39 and diode D4. Transistor Q6 is thereby switched to a conducting state and transistor Q5 to a non-conducting state, causing transistor Q8 to become conducting and transistor Q7 non-conducting. This will reset the switching circuit C, allowing the clutch switch elements 106'' and 106''' to control the clutch circuit and the brake switch elements 107'' and 107''' to control the brake circuit, thereby producing continuous segmental rotation of the deflecting paddle wheel 140, as previously described, until another conductive body is advanced in sensing relation to the sensing unit 100.

From the above description it is evident that, with very little change and by adding control switches exterior to the sensing unit 100, and by substituting interchangeable leads 82', 83', 84 and 84' shown in FIG. 33, for the leads 82$b$, 83$b$, 84 and 84' shown in FIG. 34, the salient pole type clutch and brake devices associated with each column of advancing paddles of the marshalling assembly may be simply adjusted or modified to operate the deflecting paddle wheels 140 to deflect either conductive objects as in the circuit shown in FIG. 33, or non-conductive objects as in the circuit illustrated in FIG. 34. For both deflecting systems, the sensing unit 100 and the salient pole type clutch and brake devices 85 may be similar in construction and design and provide standard replacement components. The sensing units 100, compactly contained in a sealed housing, occupy minimum space and can be constructed and assembled at relatively low cost.

The marshalling system of this invention is highly effective in assuring lineally spaced and columnized advance of individual objects to a position for classification at the rear end thereof. In principle, the marshalling system provides a series of grooves or channels along which the objects are lineally advanced and columnized in singularizing spaced relation, by the cooperating action of the advancing paddle faces 24 operating in conjunction with the tumbling and/or spinners rolls, and/or the inclined floor members as illustrated in FIGS. 19, 21, 22 and 23. This marshalling assembly will effectively and positively advance the objects in columnized order and in singularized and uniformly spaced relation, for positive classification at the terminal end of the marshalling assembly.

It will also be noted that the entire marshalling assembly, including the marshalling chains 20 or 20*a* and associated paddles 23, 23*a*, 23*b* or 23*c*, the tumbling rolls 45, 125 or 125*a*, the spinner rolls 46, 126 or 126*a*, the floating rolls 47 or deflecting plates 135, and all drives therefor, are assembled as a unit on a rectangular shaped marshalling frame comprising the side bars 11–11′, the end bars 12–12′ and 13–13′ and associated vertical struts 14–14′. The entire marshalling assembly may therefore be independently manufactured and assembled as an integrated unit, and in a manner to facilitate both manufacture, installation, replacement and repair.

The selector and eliminator mechanisms can also be manufactured and assembled as integrated units, and then applied to the marshalling framework. The deflecting paddle 65 below the sensing ring 62, as shown in FIG. 2, may be mechanically manipulated by means of a magnetic fluid clutch and brake mechanism 70, or a salient pole type clutch and brake device 85 as heretofore described; each of which operates under the control of its own sensing circuit. Similarly, the paddle wheel 140 may be manipulated by either a magnetic fluid clutch and brake mechanism 70 or a salient pole clutch and brake device 85, as preferred. It will also be appreciated, however, that within the purview of this invention, the deflecting paddle 65 shown in FIG. 2, or the deflecting paddle wheel 140 shown in FIGS. 26, 33 and 34, may be mechanically manipulated by other types of clutches; as for example, a friction type clutch which includes a mechanically driven clutch disc equipped with a clutching electromagnet, and an adjacent friction disc equipped with a braking electromagnet, both under the control of a sensing circuit. It will also be appreciated that compressed air or hydraulic fluid may provide the mechanical means for manipulating the deflecting paddle 65 or for segmentally rotating the deflecting paddle wheel 140, in which case the flow of compressed air or hydraulic fluid to the air or fluid clutch would be controlled by electromagnetic valves, each sensitively controlled by a sensing circuit as heretofore described.

The marshalling assemblies, and selector and classifying mechanisms of this invention, are adapted for use in the classification of numerous objects, products or articles, as will be evident to those skilled in the art.

While certain novel features of this invention have been disclosed herein and are pointed out in the claims, it will be understood that various omissions, substitutions and changes may be made by those skilled in the art, without departing from the teachings of this invention.

What is claimed is:

1. Apparatus for separating a mixture of objects into two classes of different electrical conductivity which includes, a receiving area to which said objects are supplied, sensing means responsive to objects of higher conductivity but unresponsive to objects of substantially lesser conductivity, object deflecting means positioned adjacent said sensing means, a single file column of spaced object advancing paddles extending in an upwardly inclined direction from said receiving area to said object sensing means, means for advancing said column of paddles from the receiving area to said object sensing means, an upwardly inclined object conducting passage positioned along the line of travel of said column of paddles and providing support for the objects advanced by the adjacent column of paddles, means for tumbling the advancing objects to thereby eject all but one of the objects from the advancing influence of each paddle as the successive paddles arrive in proximity to said sensing means, means for returning ejected objects to said receiving area for recycle, and driving means under the control of said object sensing means, and operating in synchronism with the movement of said advancing paddles, for activating said deflecting means when said object engaging paddles have respectively advanced to a predetermined position with respect to said deflecting means, and whereby objects of higher conductivity are deflected in one direction and objects of lesser conductivity are deflected in another direction.

2. Apparatus for separating a mixture of objects into two classes of different electrical conductivity which includes, a receiving area to which said objects are supplied, sensing means responsive to objects of higher conductivity but unresponsive to objects of substantially lesser conductivity, object deflecting means positioned adjacent said sensing means, a column of lineally spaced object advancing paddles extending in an upwardly inclined direction from said receiving area to said object sensing means, means for advancing said column of paddles from the receiving area to said object sensing means, an upwardly inclined tumbling roll positioned adjacent the line of travel of said column of paddles and providing support for the objects advanced by the adjacent column of paddles, means for rotating said tumbling roll to thereby tumble the advancing objects in contact therewith and eject all but one of the objects from the advancing influence of each paddle, means for returning ejected objects to said receiving area for recycle, driving means under the control of said object sensing means, and operating in synchronism with the movement of said advancing paddles, for activating said deflecting means when said object engaging elements have respectively advanced to a predetermined position with respect to said deflecting means, and whereby objects of higher conductivity are deflected in one direction and objects of lesser conductivity are deflected in another direction.

3. In a potato harvester, apparatus for separating and recovering potatoes from an object mixture of potatoes, stones and hard earthy lumps which includes; a receiving area to which the object mixture of potatoes, stones and hard earthy lumps is supplied, a flexible drive member extending longitudinally from the receiving area in an upwardly inclined direction, a series of spaced object advancing paddles fixed to and extending laterally from said flexible drive member, and an upwardly inclined and rotatably driven tumbling roll extending along the line of travel of said spaced paddles and along which some of the potatoes, stones and hard earthy lumps as withdrawn from said receiving area are columnized by the respective advancing paddles into a single file and in spaced order and the remainder laterally ejected from the advancing influence if the respective paddles and returned to the receiving area for recycle; an oscillator circuit which includes a sensing element which is electrically sensitive to the higher electrical conductivity of potatoes but relatively non-sensitive to the lower conductivity of stones and hard earthy lumps, a non-conductive and protective shield extending over one side of said sensing element and a conductive and protective shield enclosing the other sides of said sensing element, an amplifying circuit connected to said oscillator circuit and operative to amplify the electrical pulsations produced in the oscillator circuit, and a switching circuit connected to said amplifying circuit and electrically responsive to the amplified pulsations of said amplifying circuit; said non-conductive shield being arcuately contoured to provide an upper end extension of said tumbling roll and which is positioned to extend along the path of advance of the single file column of individually spaced potatoes, stones and hard earthy lumps and whereby said spaced objects are successively scanned by the electrical field established by the energized sensing element, deflecting means adjacent to the path of progressive advance of the single file column of individually spaced potatoes, stones and hard earthy lumps, and means connected to and controlled by said switching circuit for manipulating said deflecting means to thereby direct the potatoes into one path of movement and the stones and hard earthy lumps into another path of movement in accordance with their differential electrical conductivities as identified by the sensing element of said oscillator circuit.

4. Apparatus for separating a mixture of objects into two classes of different electrical conductivity which includes; a V-shaped object conducting and supporting trough extending longitudinally from a receiving area and defined between a pair of transversely inclined object guiding surfaces, sensing means at the other end of said trough which is sensitive to the electrical conductivity of the objects traveling in proximity thereto, said sensing means presenting a sensing face forming substantially an object guiding continuation of at least one of the guide surfaces of said trough, a column of spaced object advancing elements extending from said receiving area to said sensing means along said trough, means for driving said spaced elements to thereby advance the objects in a single column and in individually spaced order across the guide face of said sensing means, an object deflecting means adjacent said sensing means, and means under the control of said sensing means which is operative to selectively manipulate said deflecting means to direct conductive objects in one direction and non-conductive objects in another direction as they leave said trough.

5. Apparatus for separating a mixture of objects into two classes of different inherent characteristics which includes; a V-shaped object conducting and supporting trough extending longitudinally from a receiving area and defined between a pair of transversely inclined object guiding surfaces, sensing means at the other end of said trough which is responsive to differences in the inherent characteristics of objects positioned adjacent thereto, said sensing means presenting a sensing face forming substantially on object guiding continuation of at least one of the guide surfaces of said trough, a column of spaced object advancing elements extending from said receiving area to said sensing means along said trough, means for driving said spaced elements to thereby advance the objects in a single column and individually spaced order across the guide face of said sensing means, an object deflecting means adjacent said sensing means, and means under the control of said sensing means which is operative to selectively manipulate said deflecting means to direct objects of one inherent characteristic in one direction and objects of a different inherent characteristic in another direction as they leave said trough.

6. Apparatus for separating a mixture of objects into two groups of different electrical conductivity which includes; sensing means responsive to objects of higher conductivity but unresponsive to objects of substantial lesser conductivity, an object conducting trough extending from a receiving area to said sending means; a column of linearly spaced object advancing elements extending from said receiving area and along said object conducting trough, means for driving said column of object advancing elements through the receiving area and along said trough to thereby withdraw objects from the receiving area and advance the withdrawn objects along said trough to the opposite end thereof, means for manipulating said trough while the objects are being advanced by said spaced advancing elements to thereby tumble the advanced objects in a manner to effectuate lateral ejection of all but one of the objects from the advancing influence of each object advancing element, and whereby a single column of objects arranged in individually spaced order are advanced into sensing relation to said sensing means, an object deflector adjacent said sensing means, and mechanical means operatively driven in synchronism with the movement of said object advancing elements and under the control of said sensing means which is operative to selectively manipulate said object deflector and direct conductive objects in one direction and non-conductive objects in another direction and thereby classify and separate the objects into two groups.

7. Separating apparatus as defined in claim 6, and wherein said object conducting trough extends in an upwardly inclined direction from the receiving area to the sensing means, and which further includes a correspondingly inclined surface adjacent to said trough for returning objects ejected from said trough to the receiving area for recycle.

8. Separating apparatus as defined in claim 6, and wherein said mechanical means includes an electromechanical device under the control of said sensing means for manipulating said object deflector in synchronism with the movement of said object advancing elements.

9. Separating apparatus as defined in claim 6, and wherein said mechanical means includes a magnetic clutch and brake assembly under the control of said sensing means for manipulating said object deflector in synchronism with the movement of said object advancing elements.

10. Separating apparatus as defined in claim 6, and wherein said electro-mechanical device includes a component continuously driven in synchronism with the movement of said object advancing elements, a clutch designed to be driven from said component and connected to said object deflector, and a brake for said clutch, said clutch and brake being under the operative control of said sensing means.

11. Separating apparatus as defined in claim 6, and wherein a plurality of said object advancing troughs are provided, each trough having a column of said object advancing elements associated therewith, and with one of said sensing means and one of said object deflectors positioned adjacent the terminal end of each of said troughs; said mechanical means including a main driving means common to all of said object deflectors, an electro-mechanical device connecting each of said object deflectors to said main driving means and under the operative control of its associated sensing means, and whereby each of said object deflectors are manipulated in synchronism with the advance movement of its associated object advancing elements.

References Cited by the Examiner

UNITED STATES PATENTS

| | | | |
|---|---|---|---|
| 1,920,701 | 8/1933 | Jenkins | 209—84 X |
| 2,059,038 | 10/1936 | Sala | 209—73 X |
| 2,237,254 | 4/1941 | Broekhuysen | 209—81 |
| 2,504,731 | 4/1950 | Rose | 209—81 |
| 2,819,447 | 1/1958 | Harmon. | |

ROBERT B. REEVES, *Primary Examiner.*